(12) United States Patent
Takito et al.

(10) Patent No.: US 7,824,039 B2
(45) Date of Patent: Nov. 2, 2010

(54) PROJECTOR

(75) Inventors: Koji Takito, Aichi (JP); Seijiiro Kadowaki, Aichi (JP); Takashi Hara, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 379 days.

(21) Appl. No.: 11/856,318

(22) Filed: Sep. 17, 2007

(65) Prior Publication Data

US 2008/0111976 A1     May 15, 2008

Related U.S. Application Data

(63) Continuation-in-part of application No. PCT/JP2006/305242, filed on Mar. 16, 2006.

(30) Foreign Application Priority Data

| Mar. 17, 2005 | (JP) | ............................ 2005-076275 |
| Mar. 28, 2005 | (JP) | ............................ 2005-091654 |
| Mar. 29, 2005 | (JP) | ............................ 2005-095340 |

(51) Int. Cl.
*G03B 21/14* (2006.01)

(52) U.S. Cl. ............................ 353/69; 353/70; 353/79; 353/30; 353/44; 353/85; 353/119; 353/122; 345/156; 345/649; 345/671

(58) Field of Classification Search .................. 353/69, 353/70, 79, 30, 44, 85, 119, 122; 345/156, 345/649, 671
See application file for complete search history.

(56) References Cited

U.S. PATENT DOCUMENTS 6,962,416 B2 *  11/2005  Ohara ........................ 353/70

FOREIGN PATENT DOCUMENTS

| JP | 2-267535 |  | 11/1990 |
| JP | 8-179739 |  | 7/1996 |
| JP | 2002-006397 | A | 1/2002 |
| JP | 2002-268142 |  | 9/2002 |
| JP | 2003-280091 |  | 10/2003 |
| JP | 2003-295310 |  | 10/2003 |
| JP | 2003-324669 |  | 11/2003 |
| JP | 2004-004284 | A | 1/2004 |
| JP | 2005-031561 | A | 2/2005 |

OTHER PUBLICATIONS

International Search Report for PCT/JP2006/305242 mailed Jun. 6, 2006.
JP Office Action dtd May 20, 2010, JP Appln. 2005-095340, English Translation.

* cited by examiner

*Primary Examiner*—Georgia Y Epps
*Assistant Examiner*—Sultan Chowdhury
(74) *Attorney, Agent, or Firm*—Banner & Witcoff, Ltd.

(57) ABSTRACT

There is provided a projector having a projecting unit, a projecting system which projects video onto a projection surface by use of the projecting unit, a projecting direction judgment system which judges a projecting direction of the projecting system, and a menu image generating system which generates a menu image, as video generated in the projector as the video to be projected by the projecting system, so that the menu image suits the projecting direction judged by the projecting direction judgment system.

20 Claims, 35 Drawing Sheets

J

VERTICAL INVERSION
90-DEGREE ROTATION
SPLIT DISPLAY — DIVISION NUMBER — IN-LINE LAYOUT
                          − 2              VERTICAL INVERSION
                          − 3
                          − 4

VERTICAL INVERSION
HORIZONTAL INVERSION
90-DEGREE ROTATION
SPLIT DISPLAY — DIVISION NUMBER — PARALLEL LAYOUT
                          − 2              HORIZONTAL
                        − 4              INVERSION

PROJECTOR

CROSS REFERENCE TO RELATED APPLICATION

This is a Continuation-in-Part of International Application No. PCT/JP2006/305242 filed on Mar. 16, 2006, which claims priority from Japanese Patent Applications No. 2005-076275, filed on Mar. 17, 2005, No. 2005-091654, filed on Mar. 28, 2005, and No. 2005-095340, filed on Mar. 29, 2005. The disclosure of the prior applications is herein incorporated by reference in their entireties.

BACKGROUND

1. Technical Field

Aspects of the present invention relate to a projector.

2. Related Art

Various types of projectors have been proposed so far, such as a projecting device disclosed in Japanese Patent Provisional Publication No. 2003-280091. The projecting device is designed to be set on a table which is used for a meeting, etc. and to project video images onto the table.

As another example of a projector of this type, there has been proposed a projector device in Japanese Patent Provisional Publication No. 2002-268142. The projector device is configured to project images by use of light emitted from a light source installed in the projector device.

In the projector device, when a tilt sensor detects the tilt of the projector device and generates an output signal representing the detected tilt, a judgment is made to determine as to whether change in the output signal has continuously exceeded a predetermined output level for a predetermined time period or longer.

When the change in the output signal does not continuously exceed the predetermined output level for the predetermined time period, the projector device judges that the device is in a stable tilt state and the light source keeps on emitting the light. On the other hand, when the change in the output signal continuously exceeds the predetermined output level for the predetermined time period or longer, the projector device judges that the device is in an unstable tilt state and stops the light emission from the light source.

In the projecting device disclosed in the former publication, contents of the projected image are constant and do not depend on a horizontal position (e.g. on a table) and a vertical position of the screen on which the projector device (e.g. on a wall of a room) is placed.

Therefore, even when a menu image (an image indicating one of various kinds of menus such as an operation menu) is projected by the projecting device as an auxiliary image other than principal (main) video images inputted from an external device, the same menu image is projected irrespective of whether the screen is placed in the horizontal position or in the vertical position.

In such a configuration, the menu image can include an unnecessary menu item, depending on the position of the screen. Therefore, the use of the projector may not necessarily be easy for the user to use when the menu image is in uniform as above with no regard to the screen position.

Further, if the projecting device disclosed in the former publication is used as a wall-mounted projector, the projected image can be upside down or rotated at 90 degrees depending on the position of installation of the projector with respect to the projection surface. Thus, the projected image may not be properly oriented depending on the installation position of the projector.

Meanwhile, the projector device disclosed in the latter publication continues emitting the light from the light source irrespective of the tilt angle of the device, unless the change in the output signal of the tilt sensor continuously exceeds the predetermined output level for the predetermined time period.

In such a state, if the projector device is moved for changing its projecting position, attitude, or orientation, the light from the light source can accidentally enter eyes of people around the projector device and may harm eyes of those people.

SUMMARY

The present invention is advantageous in that a projector configured to project a menu image (subsidiary image) suitable for a condition of the projection surface (i.e., a projecting direction) is provided in order to overcome the above problems regarding the projecting direction, the attitude, and the orientation of the projector.

Further, the present invention is advantageous in that a projector capable of projecting video images on a screen in a correct orientation regardless of the attitude of the projector is provided.

Furthermore, the present invention is advantageous in that a projector (including a built-in light source which emits light from a projecting unit) configured to control and reduce amount of the light emitted from the projecting unit when the projector is not in a correct attitude.

According to an aspect of the invention, there is provided a projector having a projecting unit, a projecting system which projects video onto a projection surface by use of the projecting unit, a projecting direction judgment system which judges a projecting direction of the projecting system, and a menu image generating system which generates a menu image, as video generated in the projector as the video to be projected by the projecting system, so that the menu image suits the projecting direction judged by the projecting direction judgment system.

With the above configuration, the menu image corresponding to the attitude of the projector, which is judged by the installation attitude judging unit, can be generated. Thus, the menu image corresponding to the attitude of the projector (i.e., attitude of the display surface) can be projected.

The projector can be configured such that a menu in the menu image does not include a menu item which is not used in a current operation, and the menu image is easier to be viewed. Therefore, a menu item which is not used in the current operation can be prevented from being erroneously selected by a user, and usage of the projector can be improved.

According to another aspect of the invention, there is provided a projector having a housing which is configured to have an opening facing toward a projection surface, a projecting system which is installed in the housing and optically projects video onto the projection surface via the opening, a projecting direction detecting system which detects a projecting direction of the projecting system, and a video control system which controls an orientation of the video, optically projected by the projecting system, on the projection surface based on the projecting direction detected by the projecting direction detecting system.

With the above configuration, the video projected by the projector can be displayed in a preferable orientation on the display surface, which is easier to be viewed, regardless of the attitude of the projector being installed. Further, the projector can be installed in a rather arbitrary location with respect to the display surface.

According to still another aspect of the invention, there is provided a projector which is configured to emit light from a projecting unit in a projecting direction, having an attitude detecting system which detects an attitude of the projecting unit, and a light amount control system which controls the emission of light from the projecting unit so as to reduce the light emission unless the attitude detected by the attitude detecting system is a targeted attitude.

With the above configuration, the light emitted from the projector can be reduced when the projecting unit is not in the intended attitude. Therefore, the eye health of viewers can be prevented from being damaged by light from the projector, which may otherwise erroneously enter their eyes.

BRIEF DESCRIPTION OF THE ACCOMPANYING DRAWINGS

FIGS. 5A and 5B illustrate a horizontal projection operation menu and a vertical projection operation menu respectively stored in a ROM of the microcomputer of the projector according to the first embodiment of the present invention.

FIG. 18 is a schematic diagram showing storage areas of a video memory of the projector according to the third embodiment of the present invention.

FIG. 19 is a schematic diagram showing an order to store $8^2$ pixels in the video memory of the projector according to the third embodiment of the present invention.

FIG. 22 is a schematic diagram showing an order to read $8^2$ pixels from the video memory of the projector when the angle is 180 degrees according to the third embodiment of the present invention.

FIG. 23 is a schematic diagram showing an order to read $8^2$ pixels from the video memory of the projector when the angle is 90 degrees according to the third embodiment of the present invention.

DETAILED DESCRIPTION

Referring now to the accompanying drawings, embodiments of the present invention will be described.

First Embodiment

Figure 1:
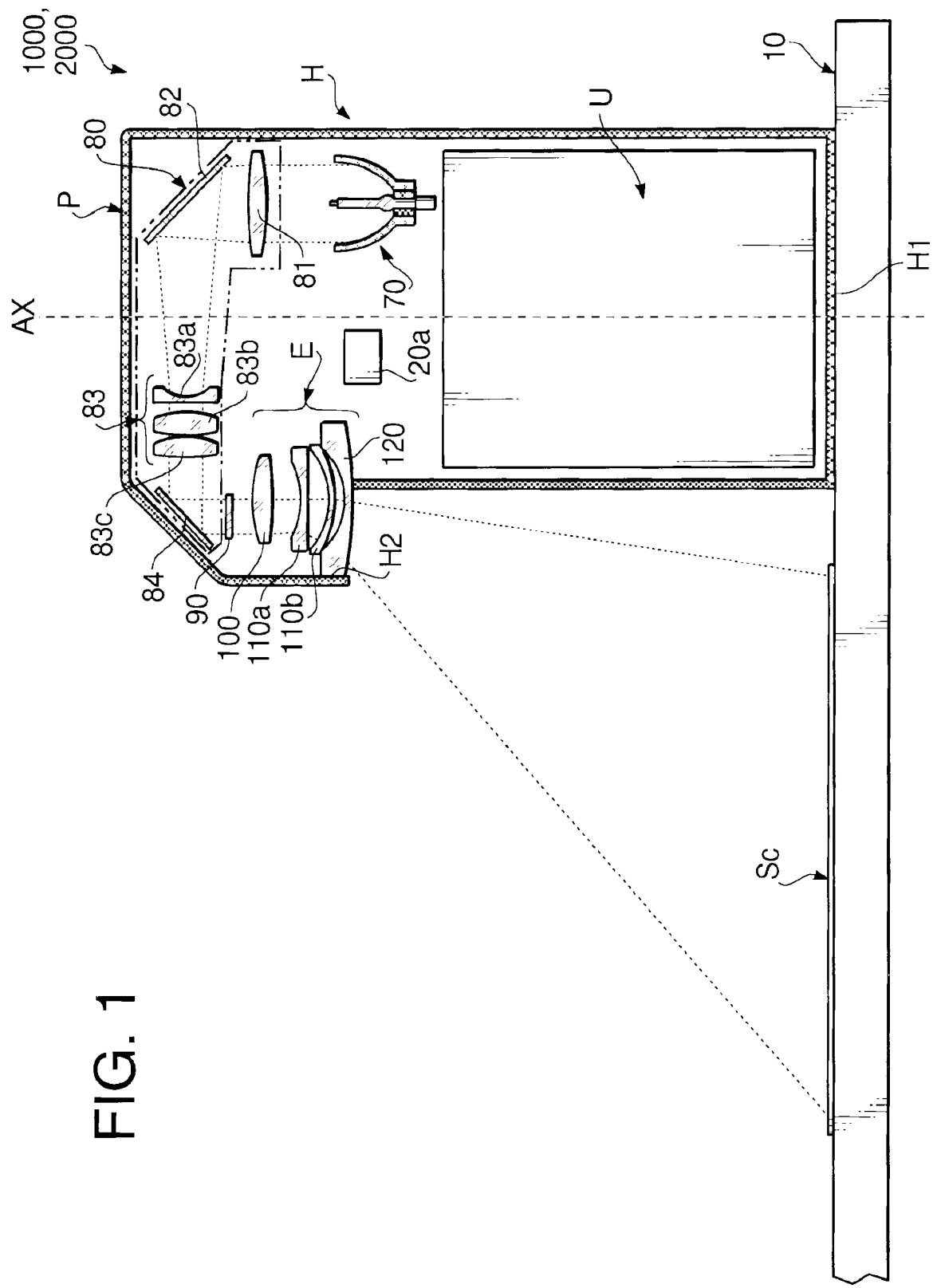
FIG. 1 is a schematic cross-sectional view showing a projector according to a first embodiment of the present invention.
Figure 2:
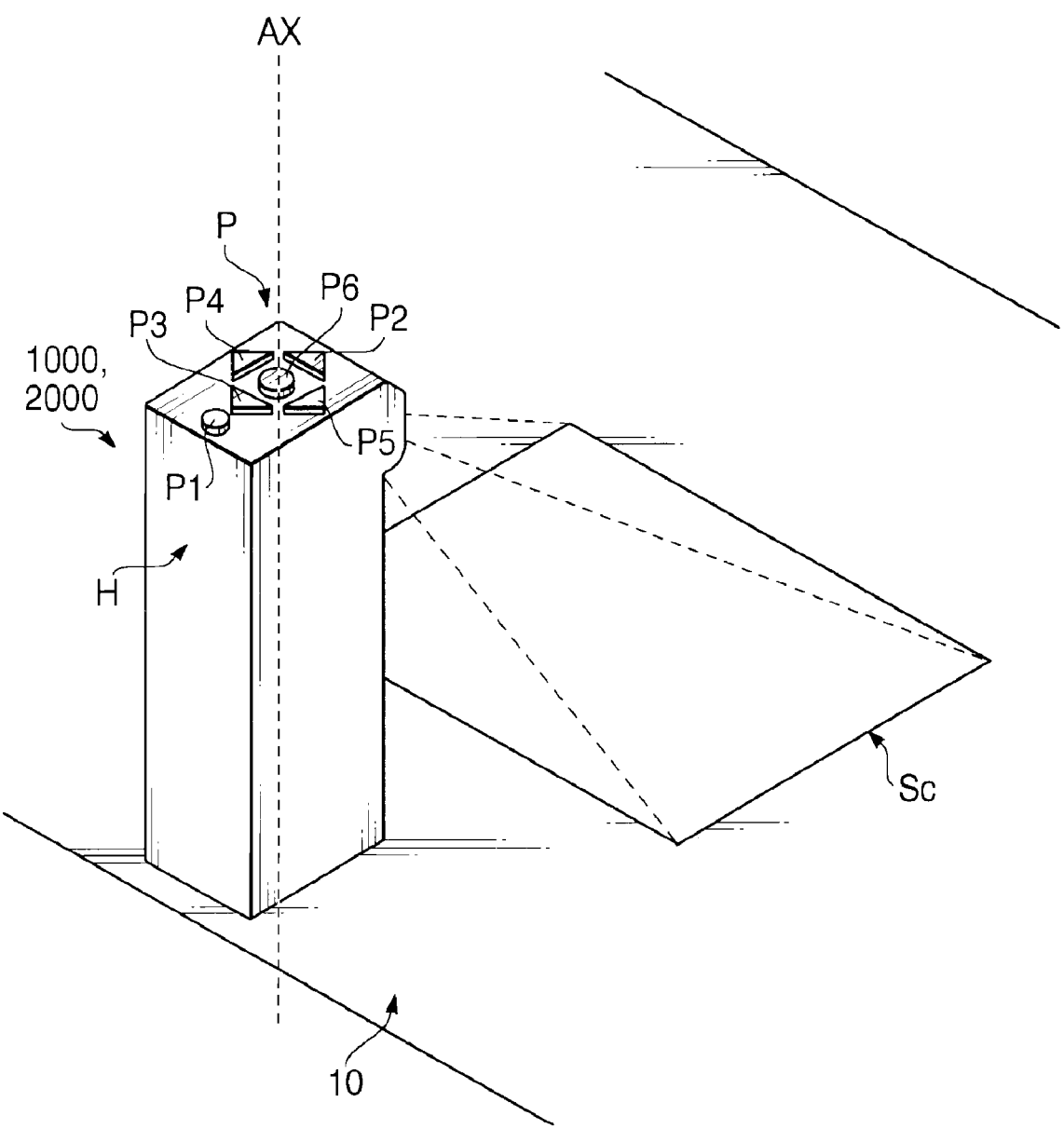
FIG. 2 is a perspective view showing the projector being placed on a table according to the first embodiment of the present invention.

FIG. 1 is a schematic cross-sectional view showing a projector 1000 according to a first embodiment of the present invention. FIG. 2 is a perspective view showing the projector 1000 being placed on a table 10 according to the first embodiment of the present invention. The projector 1000 is a desktop type and has a housing H, which is placed on a table 10 on its bottom H1.

As shown in FIGS. 1 and 2, the projector 1000 includes an operation panel P, a control unit U, a lamp 70, an illuminating optical system 80, a transmissive liquid crystal panel (hereinafter referred to as LCD) 90, and an imaging optical system E.

The operation panel P, which is arranged on an upper surface of the housing H, includes a plurality of push keys. The push keys include an operation menu display key P1, an up key P2, a down key P3, a left key P4, a right key P5, and an enter key P6.

The operation menu display key P1 is pressed by a user for projecting a subsidiary image for an operation menu, which is used for an operation of the projector 1000, onto a screen Sc. In the present embodiment, the screen Sc is placed on top of the table 10 in parallel with the top surface of the table 10. The projector 1000 may also be used for projecting videos directly onto the table 10 without using the screen Sc. Also when videos are projected onto a screen that is placed on a wall (not shown) and a board (not shown), the projector 1000 may also be used for projecting the videos directly onto the wall and the board.

The push keys P2 through P5 in the operation panel P are used for specifying the direction to select an operation to the projector 1000. The user can recognize current status of the selection on the operation panel P, and the selected option (i.e., a menu item) in the operation menu can be distinguished from the other menu items as the selected option is shown in a different color and blinking.

Specifically, the up key P2 is pressed for shifting the option to select to an adjacent menu item that is situated above in the operation menu. Similarly, the down key P3, the left key P4, and the right key P5 are pressed for shifting the option to select to an adjacent menu item that is situated below, left, and right respectively in the operation menu. The enter key P6 is pressed when the selected menu item in the operation menu is determined.

Figure 3:
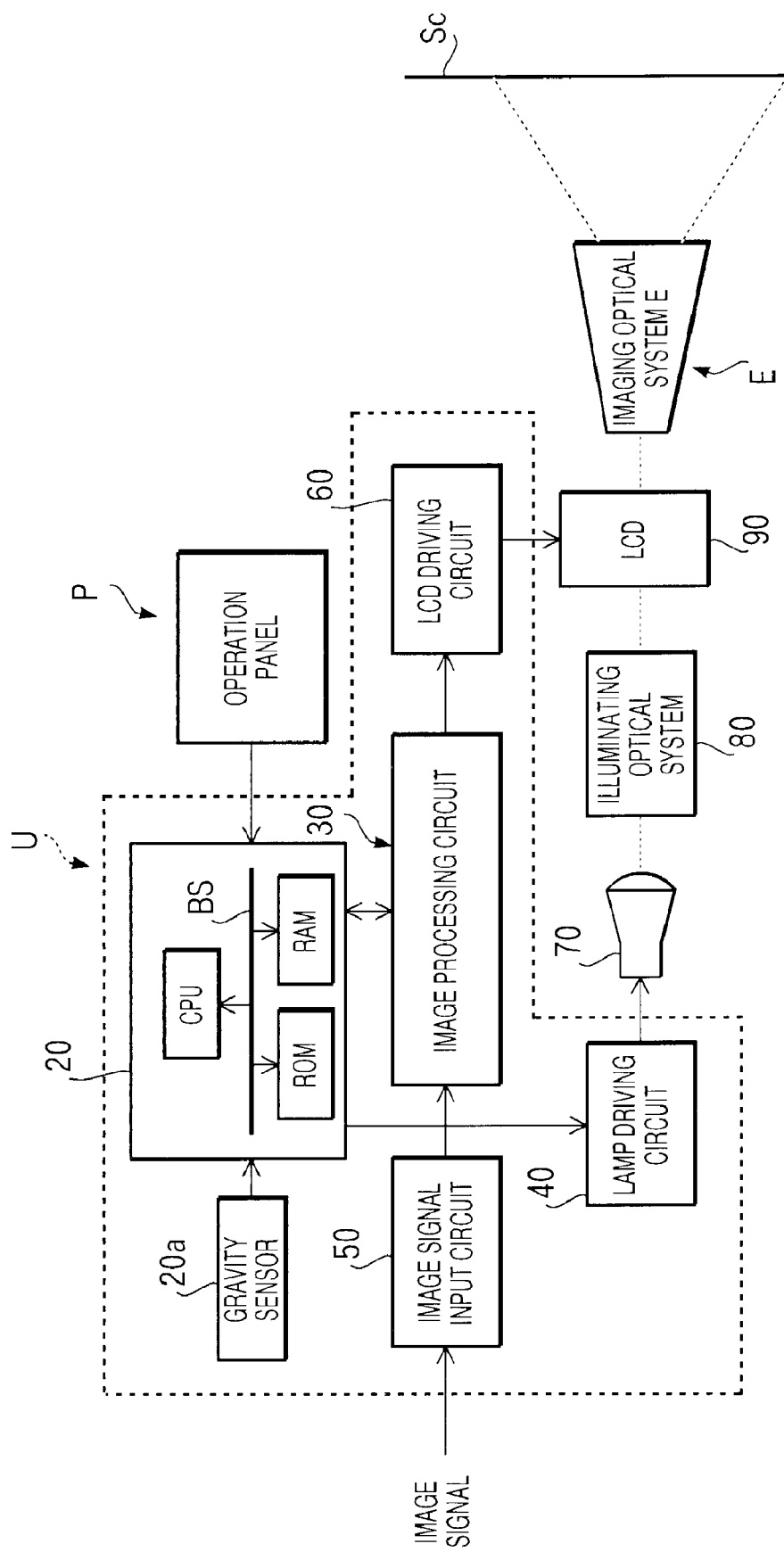
FIG. 3 is a block diagram showing a configuration of a circuit of the projector according to the first embodiment of the present invention.

As shown in FIG. 1, the control unit U is installed in the housing H together with the lamp 70, the illuminating optical system 80, the transmissive liquid crystal panel 90, and the imaging optical system E in a lower part of the housing H. FIG. 3 is a block diagram showing a configuration of a circuit including the control unit U of the projector 1000 according to the first embodiment of the present invention. As shown in FIG. 3, the control unit U is arranged between the operation panel P and the lamp 70 and between the operation panel P and the LCD 90.

The control unit U is equipped with a microcomputer 20 and a gravity sensor 20a. The microcomputer 20 includes a CPU, a ROM, and a RAM which are connected together through a bus line Bs. The CPU of the microcomputer 20 executes programs including a computer program, of which flow is indicated in a flowchart shown in FIG. 4.

In the execution of the computer program, the microcomputer 20 carries out various processes, such as driving control of a lamp driving circuit 40, issuance of an operation menu display instruction according to an operation given by the user on the operation panel P, a projecting direction judgment based on a gravity direction detected by the gravity sensor 20a, and a menu item selection process based on the judgment. Incidentally, the computer program has been previously stored in the ROM of the microcomputer 20 to be readable by the microcomputer 20.

The gravity sensor 20a, which is supported inside the housing H as shown in FIG. 1, detects a direction of gravity at its position being installed inside the projector 1000. Specifically, the gravity direction is detected by the gravity sensor 20a in terms of an angle with respect to a reference axis AX which is set in the projector 1000. The reference axis AX is, in the present embodiment, a central axis of the projector 1000 that extends in parallel with a longitudinal direction of the projector 1000.

A video signal input circuit 50 receives video signals from an external circuit (not shown) and outputs the signals to a video processing circuit 30 as video signals in a predetermined format.

The video processing circuit 30 adds and modifies the video signals supplied from the video signal input circuit 50 according to instructions from the microcomputer 20 and outputs the processed signals to an LCD driving circuit 60.

Further, when the operation menu display instruction is issued by the microcomputer 20, the video processing circuit 30 generates video signals for the operation menu and outputs the operation menu image signals to the LCD driving circuit 60 instead of the video signals supplied from the video signal input circuit 50.

The lamp 70, the illuminating optical system 80, and the LCD 90 are placed in an upper part of the housing H directly above the control unit U as shown in FIG. 1. The lamp 70 is driven by the lamp driving circuit 40 and emits light to the illuminating optical system 80 under the control of the microcomputer 20.

The illuminating optical system 80 includes a condenser lens 81, a reflecting mirror 82, a relay lens system 83, and a reflecting mirror 84. The condenser lens 81 collects the light emitted from the lamp 70 and outputs the collected light toward the reflecting mirror 82.

The reflecting mirror 82, which is placed to face both the condenser lens 81 and the relay lens system 83, reflects the light from the condenser lens 81 and casts the reflected light to the relay lens system 83.

The relay lens system 83 includes a concave lens 83a and biconvex lenses 83b and 83c which are arranged coaxially. The relay lens system 83 guides the reflected light from the reflecting mirror 82 toward the reflecting mirror 84 as a parallel beam by use of the concave lens 83a and the biconvex lenses 83b and 83c. The reflecting mirror 84, which is placed to face both the biconvex lens 83c and the LCD 90, reflects the light from the relay lens system 83 and casts the reflected light to the LCD 90 as beam-like illuminating light.

The LCD 90 is driven by the LCD driving circuit 60 to form the images corresponding to the video signals transmitted from video processing circuit 30 on an image forming surface of the LCD 90 and transmits the beam-like illuminating light from the illuminating optical system 80 therethrough.

The imaging optical system E includes a convex lens 100, biconcave lenses 110a and 110b, and a projection lens 120 as shown in FIG. 1. Approximately a whole left half of the projection lens 120 of the imaging optical system E faces the screen Sc on the table 10 via an opening H2 of the housing H.

The imaging optical system E projects the light transmitted through the LCD 90 onto the screen Sc via the opening H2 of the housing H. Thus, the video images formed on the LCD 90 are projected onto the screen Sc. The opening H2 is formed in the upper part of the housing H as a downward opening.

Hereinafter, operations of the projector 1000 of the first embodiment configured as above will be described below on the basis of installation position of the projector 1000.

The projector 1000 being positioned on the table 10

Figure 4:
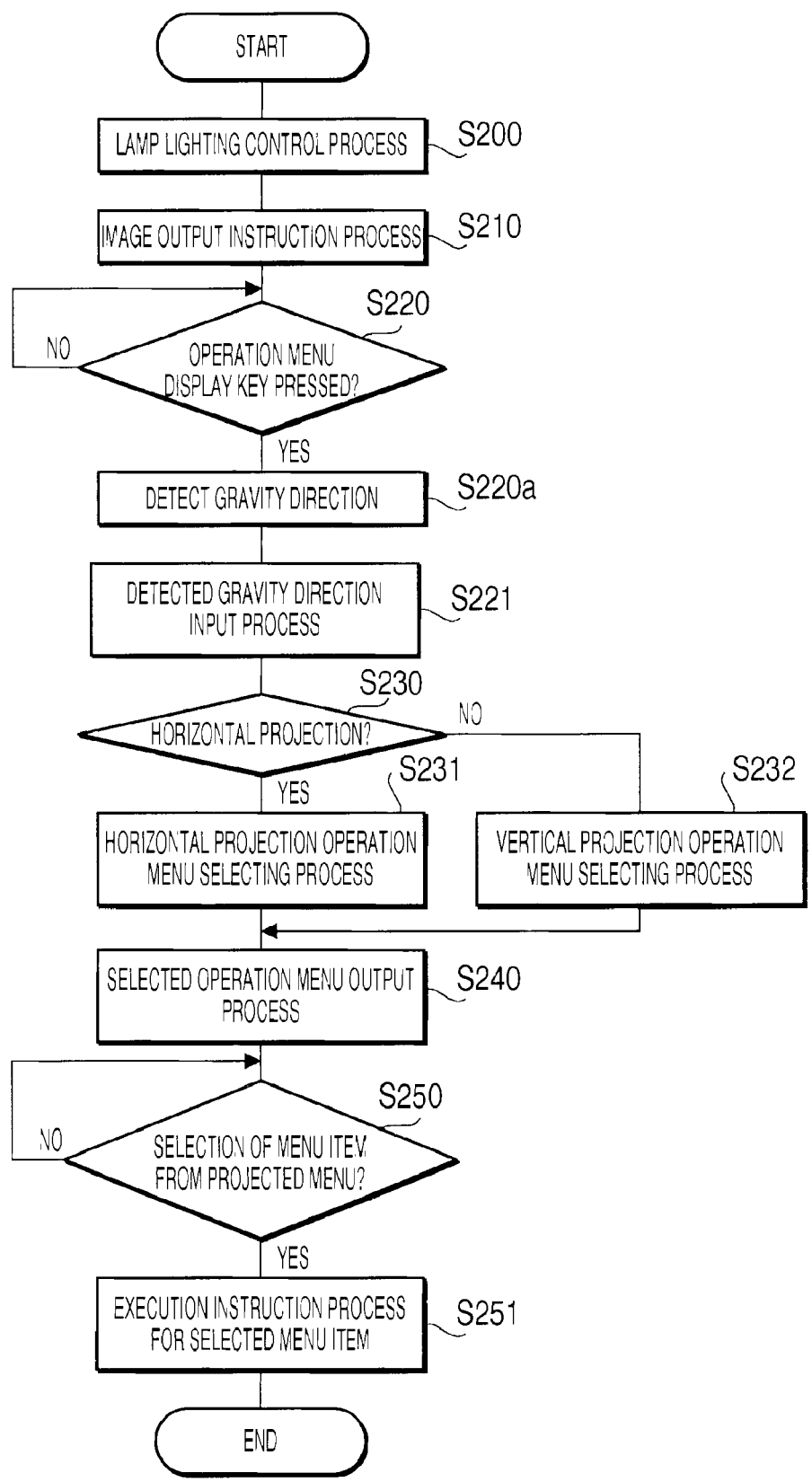
FIG. 4 is a flowchart showing an operation of a microcomputer of the projector according to the first embodiment of the present invention.

When the control unit U enters its operating state, the microcomputer 20 starts executing the computer program according to a flow, which is shown in FIG. 4. FIG. 4 is a flowchart showing an operation of the microcomputer 20 of the projector 1000 according to the first embodiment of the present invention. Incidentally, the video signals from the aforementioned external circuit are converted by the video signal input circuit 50 to a predetermined signal format (e.g. RGB signals) and are inputted to the video processing circuit 30. Meanwhile, the gravity sensor 20a starts detecting a gravity direction in response to the start of the operation of the control unit U.

When the microcomputer 20 starts the computer program, a lighting control process is executed in step S200. According to the lighting control process, the lamp driving circuit 40 is driven and controlled by the CPU of the microcomputer 20 and turns on the lamp 70. Accordingly, the illuminating optical system 80 emits the light from the lamp 70 to the LCD 90. The microcomputer 20 waits for a predetermined period of time so that emission of the light is stabled.

Next, in S210, an image output instruction process for the video processing circuit 30 is executed. According to the image output instruction process, the video processing circuit 30 generates image display data representing the video, which is alphabets "AF" in the present embodiment, to be projected (main video) based on the video signals from the video signal input circuit 50 and outputs the image display data to the LCD driving circuit 60.

According to the video signals being output, the LCD 90 is driven by the LCD driving circuit 60 and outputs the image display data to form corresponding images on the image forming surface. The light from the illuminating optical system 80 is transmitted through the LCD 90.

Figure 6:
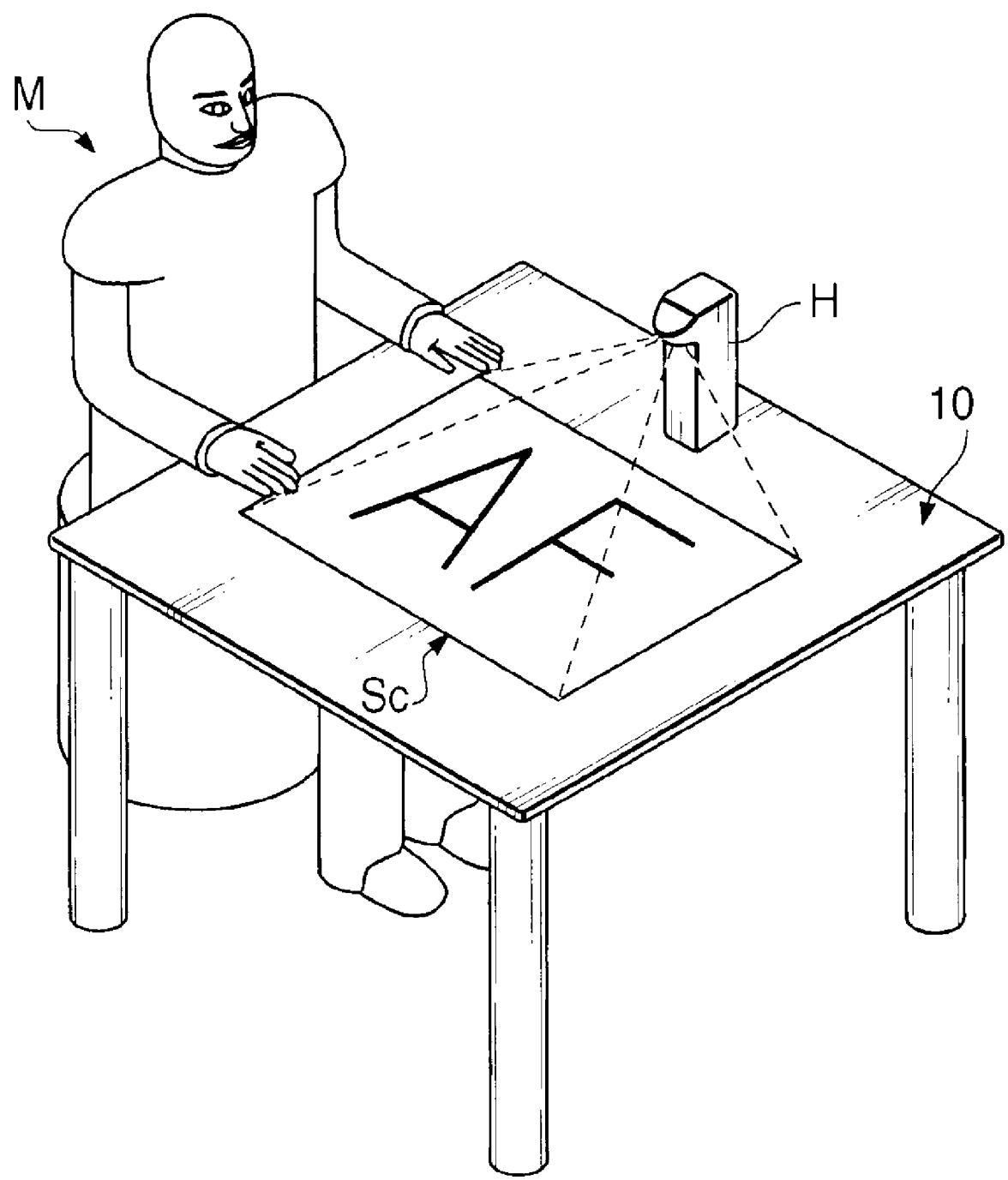
FIG. 6 is an illustration of horizontal projection on a screen according to the first embodiment of the present invention.

As the light transmitted through the LCD 90 is projected by the imaging optical system E onto the screen Sc via the opening H2 of the housing H, the image "AF" is projected on the screen Sc (see FIG. 6). FIG. 6 is an illustration of horizontal projection on the screen Sc according to the first embodiment of the present invention. Incidentally, at this stage, the image "AF" is assumed to be projected in an orientation to be rotated at 90 degrees counterclockwise from a viewing direction for an operator M facing the table 10).

In this orientation, in S220, when the operation menu display key P1 of the operation panel P is pressed by the operator M (S220: YES), the process proceeds to S220a, wherein a direction of gravity is detected. Thereafter, the process proceeds to S221, wherein a detected gravity direction input process is executed. In the detected gravity direction input process, the gravity direction detected by the gravity sensor 20a in S220a is inputted in the microcomputer 20 to be stored in the RAM of the microcomputer 20. In S220, when the operation menu display key P1 is not pressed (S220: NO), the process repeats S220.

Incidentally, when the output of the gravity sensor 20a is analog output, the analog output is converted to digital signals by an analog-to-digital converter (not shown). The gravity direction is then detected by comparing the digital signal with preset reference values, and the detected gravity direction is stored in the RAM.

Next, in S230, a judgment is made as to whether the projector 1000 is performing horizontal projection. That is, it is judged as to whether an attitude of the screen Sc to be projected is horizontal. Specifically, the attitude is judged based on the gravity direction detected by the gravity sensor 20a of the control unit U.

In the present embodiment, as shown in FIGS. 1 and 2, the projector 1000 is postured on top of the table 10 with the reference axis AX oriented vertically and projecting the image on the screen Sc horizontally placed on the table 10 (horizontal projection). It is noted, on the other hand, when the projector 1000 is postured on a wall surface with the reference axis AX oriented horizontally and projecting the image on the screen Sc vertically placed on the wall surface, it is referred that the projector 1000 is performing vertical projection.

In the first embodiment, the projector 1000 is performing the horizontal projection (S230: YES). According to this judgment, in S231, data representing a horizontal projection operation menu J (see FIG. 5A) is selectively read out from operation menu data previously stored in the ROM of the microcomputer 20.

In the first embodiment, the data representing the horizontal projection operation menu J has previously been stored in the ROM of the microcomputer 20 together with data representing a vertical projection operation menu K (see FIG. 5B), as the operation menu data. FIGS. 5A and 5B illustrate the horizontal projection operation menu J and the vertical projection operation menu K to be viewed by the operator M respectively according to the first embodiment of the present invention.

As shown in FIG. 5A, the horizontal projection operation menu J has multiple menu items including "VERTICAL INVERSION", "90-DEGREE ROTATION", and "SPLIT DISPLAY". The menu item "SPLIT DISPLAY" includes subitems, which are display options of "DIVISION NUMBER—2, 3, 4", "IN-LINE LAYOUT" and "VERTICAL INVERSION" for specifying a method of the horizontally split display.

In 231, as the horizontal projection operation menu J is selectively read, next, in S240, an output process for the selected operation menu is executed. In the output process in S240, the data representing the horizontal projection operation menu J is output to the video processing circuit 30. The video processing circuit 30 generates operation menu display data representing the horizontal projection operation menu J and outputs the generated operation menu display data to the LCD driving circuit 60, by which the image represented by the horizontal projection operation menu J is formed on the LCD 90 together with the image "AF".

Figure 7:
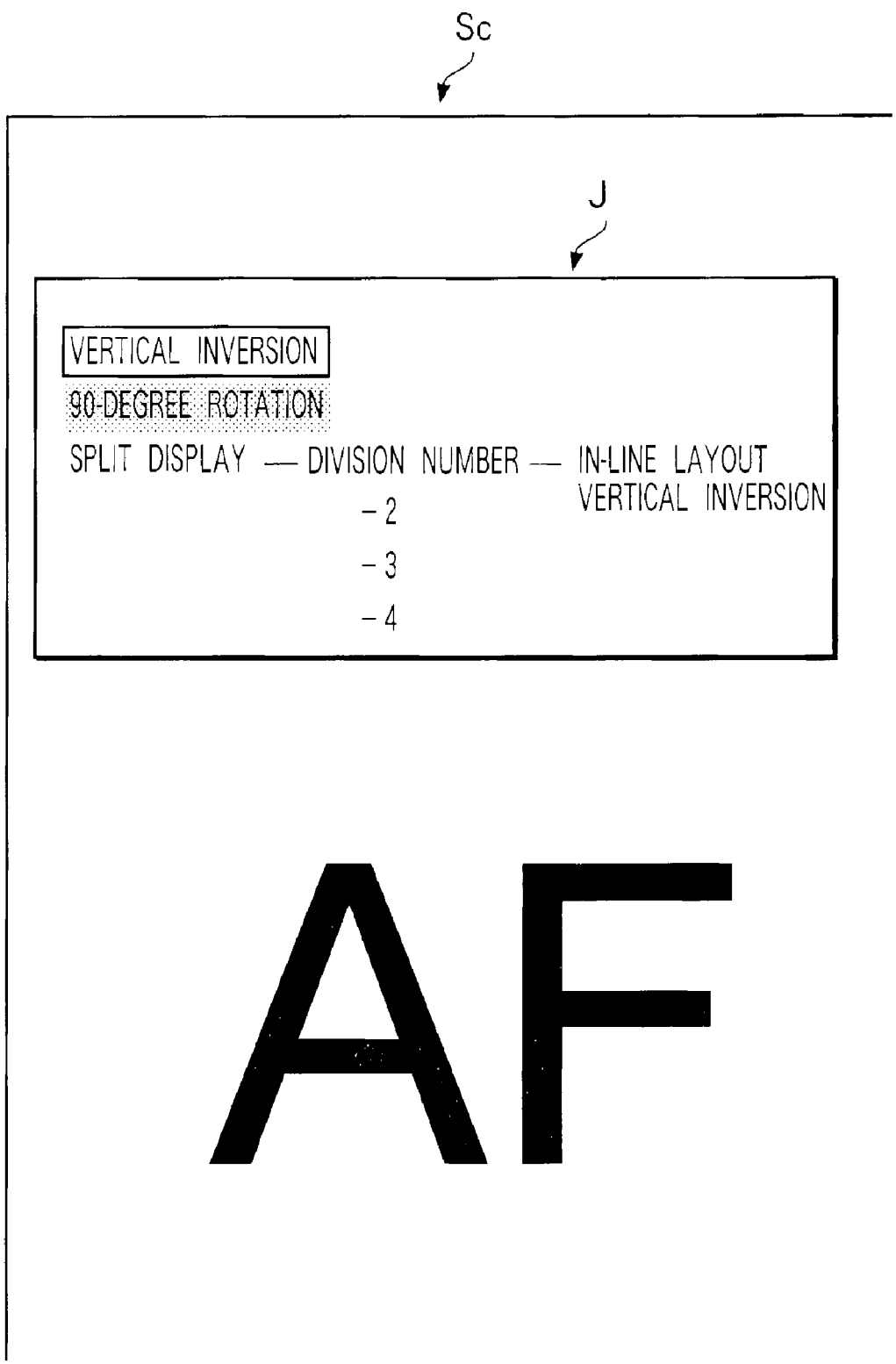
FIG. 7 shows an example of the horizontal projection operation menu projected on a screen according to the first embodiment of the present invention.

When the horizontal projection operation menu J is formed on the LCD 90, and the beam-like illuminating light from the illuminating optical system 80 transmits through the LCD 90, the image including the horizontal projection operation menu J and "AF" is projected by the imaging optical system E onto the screen Sc via the opening H2 of the housing H (see FIG. 7). FIG. 7 shows the horizontal projection operation menu J projected on the screen Sc according to the first embodiment of the present invention. It is noted, however, that the horizontal projection operation menu J may not necessarily be projected together with the image "AF".

Next, in S250, a judgment is made as to whether a menu item in the projected operation menu J has been selected. In this step, a menu item in the horizontal projection operation menu J projected on the screen Sc can be selected by the operator M by using the operation panel P.

For example, if the menu item "DIVISION NUMBER—2" has been previously selected among the menu items in the horizontal projection operation menu J projected, and if the operator M operates the operation panel P to select the menu item "90-DEGREE ROTATION", the menu item to be selected, indicated by a cursor, in the projected horizontal projection operation menu J is shifted from "VERTICAL INVERSION" (a boxed area in the horizontal projection operation menu J) to "90-DEGREE ROTATION" (a shaded area in the horizontal projection operation menu J). As the enter key P6 is pressed, it is determined that the menu item in the projected operation menu J is selected (S250: YES).

In this step, it is noted that the horizontal projection operation menu J projected on the screen Sc includes only menu items that are used when the horizontal projection is performed on the screen Sc being horizontally placed. Therefore, the operation on the operation panel P during the horizontal projection can be performed without erroneous operations for the vertical projection.

Next, in S251, an execution instruction process in regard to the menu item selected in S250 is executed to the video processing circuit 30.

In the execution instruction process, a process to instruct the projected image "AF" to be rotated at 90 degrees is executed to the video processing circuit 30, when the menu item "90-DEGREE ROTATION" is selected. It is noted that the image "AF" is currently in an orientation to be rotated at 90 degrees counterclockwise with respect to the operator M as shown in FIG. 6, and the image "AF" is further rotated at 90 degrees with respect to the current position with the execution instruction process. In the execution instruction process of the present embodiment, the rotation is performed in the clockwise direction, however, the rotation may be performed in the other direction, i.e., the counterclockwise direction.

According to the execution instruction process, the video processing circuit 30 rotates the image display data and outputs the rotated image display data to the LCD driving circuit 60, by which the image "AF" is projected through the LCD 90 onto the screen Sc in a direction allowing the operator M to squarely view the image.

Figure 8:
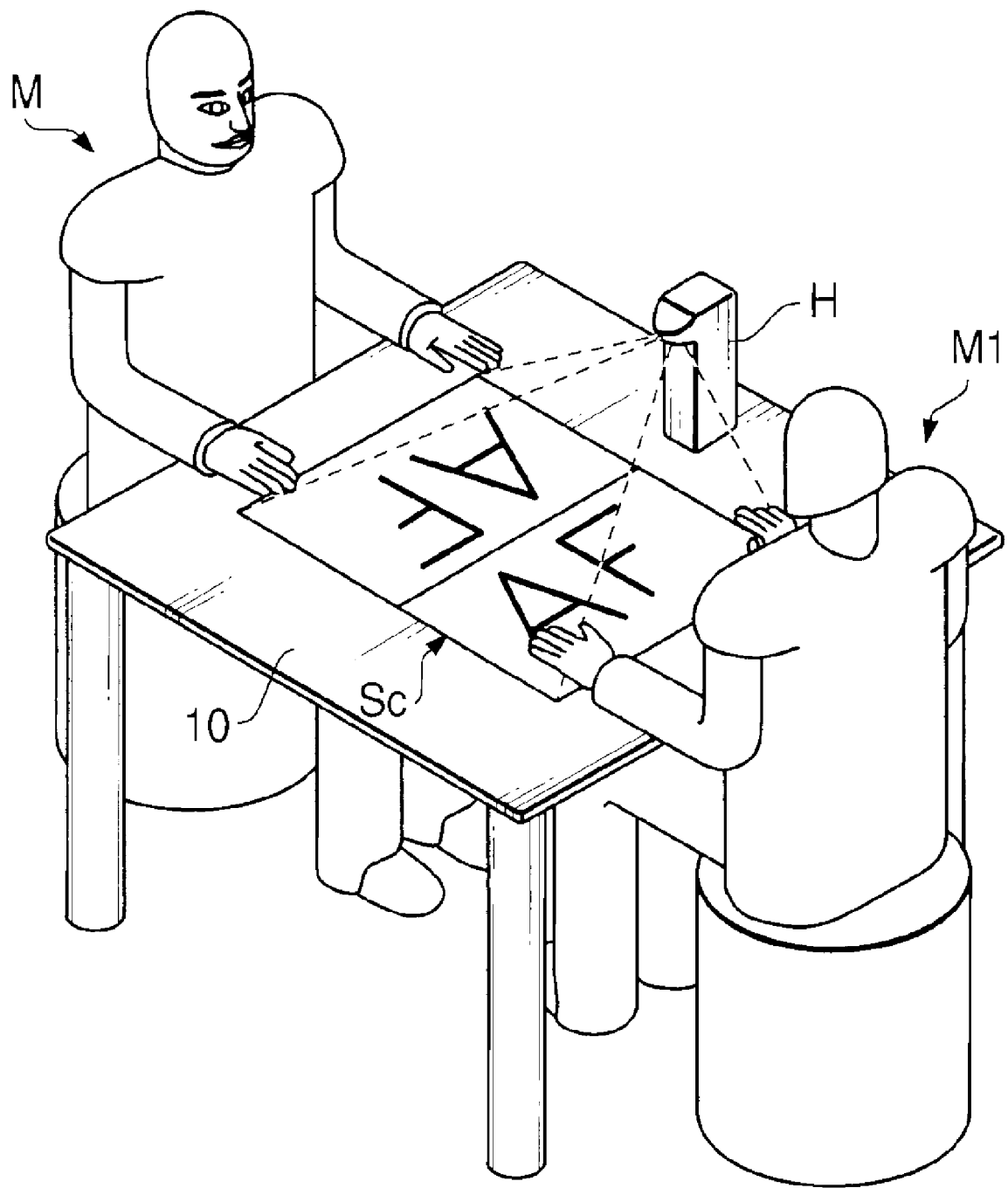
FIG. 8 is an illustration of horizontally split projection displayed on the screen according to the first embodiment of the present invention.

In S250, if the operator M selects the menu item "SPLIT DISPLAY", the user is allowed to further select one of division numbers "2", "3" and "4" in the horizontal projection operation menu J by shifting the cursor through the operation panel P. It is noted in the present embodiment when the menu item "SPLIT DISPLAY" is selected, the image is duplicated and projected in each split part of the screen Sc. However, different images can be projected in each split part of the screen Sc when the menu item "SPLIT DISPLAY" is selected. FIG. 8 is an illustration of horizontally split projection displayed on the screen Sc according to the first embodiment of the present invention. It is noted that when another operator M1 is at the table 10 to face the operator M as shown in FIG. 8, an even number, such as "2", is desirable as the division number to be selected so that each operator can view one of the duplicated images squarely.

As the division number "2" is selected, the operator M is allowed to further select one of display options indicated in the horizontal projection operation menu J for the split display. In the present embodiment, one of the display options "IN-LINE LAYOUT", wherein the duplicated images are vertically aligned with their ups and downs coincided and "VERTICAL INVERSION", wherein the duplicated images are vertically inverted with respect to each other, can be selected.

It is noted that the split display of the horizontal projection operation menu J projected on the screen Sc includes only menu items that are available for the split display in the horizontal projection (with the screen Sc placed in the horizontal position), therefore the operation on the operation panel P to select the split display options in the horizontal projection can be performed without erroneous operations, with ease and with reliability.

Thus, the execution instruction process is executed to the video processing circuit 30 according to the selected menu item "SPLIT DISPLAY", the selected division number "2" and the selected menu option.

In the present embodiment, the division number "2" is selected as an example in the execution instruction process, and the image "AF" is duplicated and projected by the projector 1000 so that the duplicated images are displayed in the viewing directions for each of the operators M and M1 as shown in FIG. 8.

As explained above, the horizontal projection operation menu J includes menu items and display options that are available for the horizontal projection. The horizontal projection operation menu J, not including menu items that are available only for the vertical projection, is easy to view and operate for the operator M. Therefore, the selection of menu items from the horizontal projection operation menu J by operating the operation panel P can be made easily and correctly while preventing erroneous operations on the operation panel P (e.g. erroneously selecting a menu item that is available only for the vertical projection). Thus, the usage of the projector can be improved.

Figure 9:
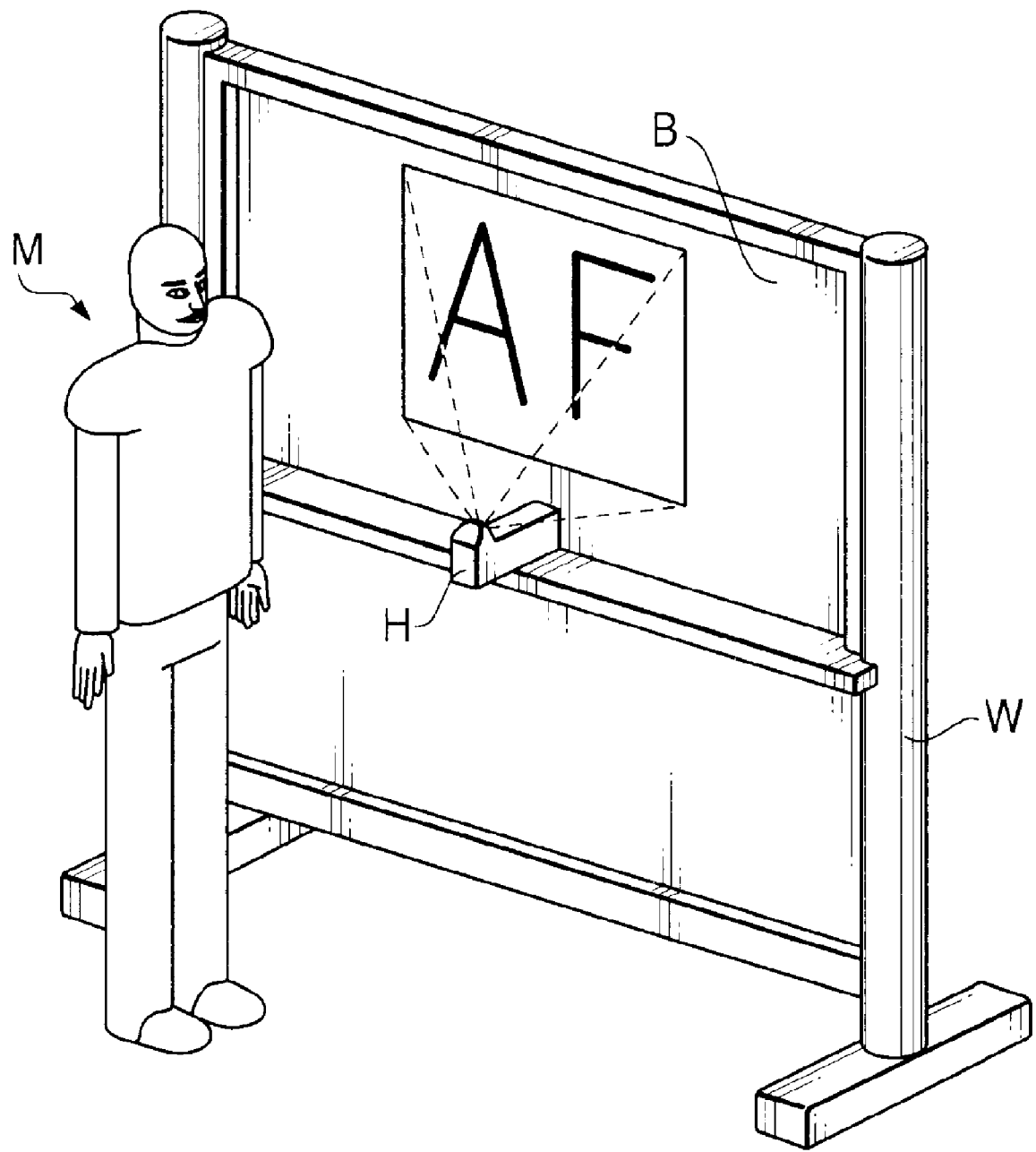
FIG. 9 is an illustration of vertical projection according to the first embodiment of the present invention.

The projector 1000 being positioned on a board B perpendicular to a horizontally flat floor FIG. 9 is an illustration of vertical projection according to the first embodiment of the present invention. As shown in FIG. 9, the screen Sc is fixed on and in parallel with a surface of a transparent board B, and the projector 1000 is arranged on the board B with a bottom surface thereof fixed onto the board B. The board B is supported by a frame W to be perpendicular to the floor.

The computer program for the projector 1000 being positioned on the board B as shown in FIG. 9 is executed according to the flow shown in FIG. 4. As the computer program advances to S221, the gravity direction detected by the gravity sensor 20a in S220a is inputted to the RAM of the microcomputer 20.

Next, in S230, a judgment is made as to whether the projector 1000 is performing horizontal projection. That is, it is judged as to whether an attitude of the screen Sc to be projected is horizontal. Specifically, the attitude is judged based on the gravity direction detected by the gravity sensor 20a of the control unit U in S220a. As the reference axis AX of the projector 1000 is in a horizontal direction to project the video image on the vertically setup screen Sc as shown in FIG. 9, it is judged that the projector 1000 is performing vertical projection (S230: NO), and the judgment result "NO" is inputted to the RAM. According to the judgment in S230, in S232, data representing the vertical projection operation menu K is selectively read out from the operation menu data previously stored in the ROM of the microcomputer 20.

For vertical projection, as shown in FIG. 5B, the vertical projection operation menu K has multiple menu items including "VERTICAL INVERSION", "HORIZONTAL INVERSION", "90-DEGREE ROTATION", and "SPLIT DISPLAY". The menu item "SPLIT DISPLAY" includes subitems, which are options of "DIVISION NUMBER—2, 4", "PARALLEL LAYOUT", and "HORIZONTAL INVERSION" for specifying a method of the vertically split display.

During vertical projection, the menu item "HORIZONTAL INVERSION" can be selected when the video image projected on the projection surface of the screen Sc is viewed from back of the screen Sc.

As the data representing the vertical projection operation menu K is read out, in S240, the data representing the vertical projection operation menu K is output to the video processing circuit 30. The video processing circuit 30 generates operation menu display data representing the vertical projection operation menu K and outputs the generated operation menu display data to the LCD driving circuit 60, by which the image represented by the vertical projection operation menu K is formed on the LCD 90 together with the image "AF"

Figure 10:
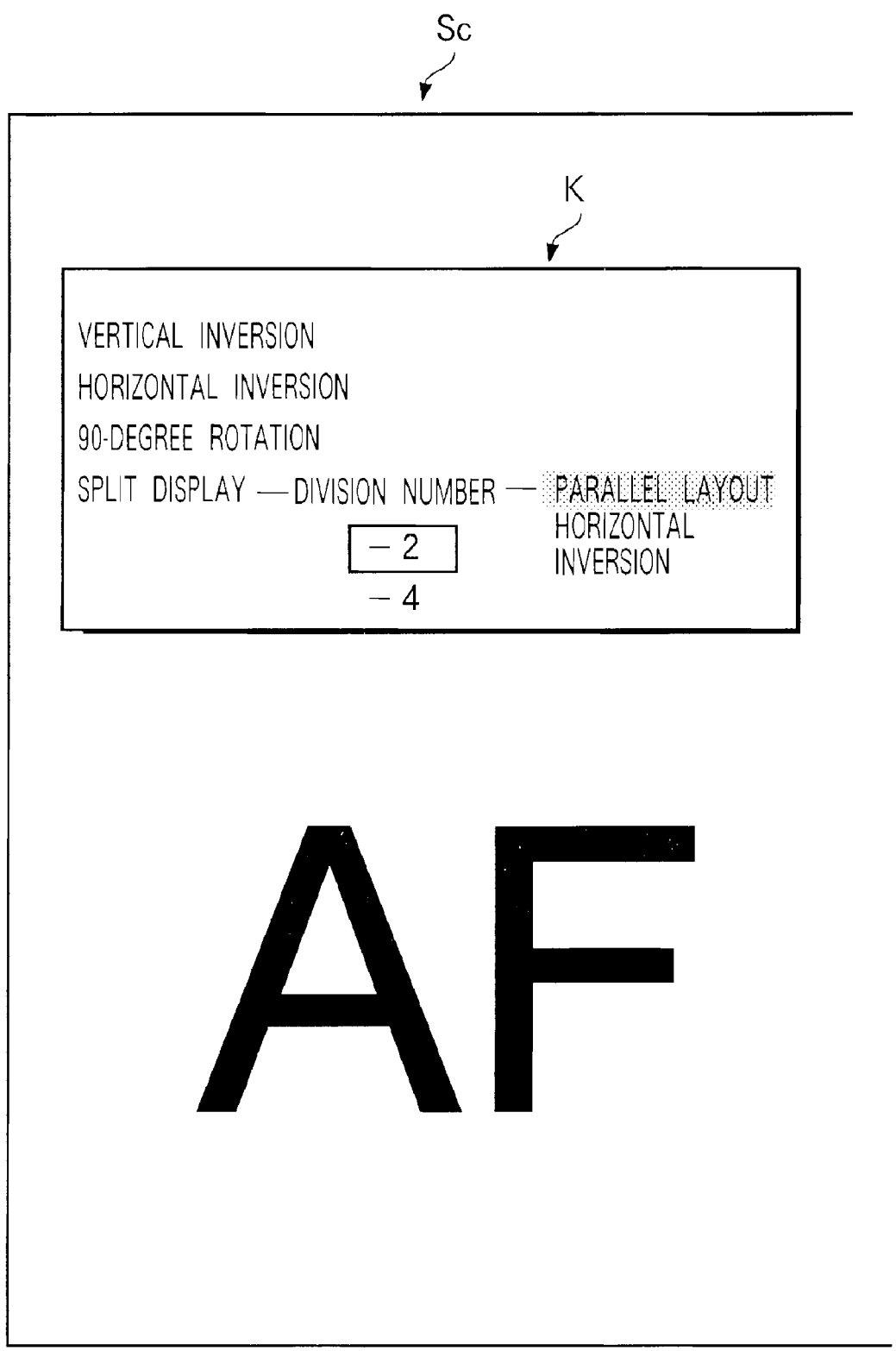
FIG. 10 shows an example of a vertical projection operation menu projected on the screen according to the first embodiment of the present invention.

When the vertical projection operation menu K is formed on the LCD 90, and the beam-like illuminating light from the illuminating optical system 80 transmits through the LCD 90, the image including the vertical projection operation menu K and "AF" is projected by the imaging optical system E onto the screen Sc via the opening H2 of the housing H (see FIG. 10). FIG. 10 shows an example of the vertical projection operation menu K projected on the screen Sc according to the first embodiment of the present invention. It is noted, however, that the horizontal projection operation menu J may not necessarily be projected together with the image "AF".

It is noted that the vertical projection operation menu K projected on the screen Sc includes only menu items that are available for vertical projection (with the screen Sc placed in the vertical position), therefore the operation on the operation panel P to select the display options in the vertical projection can be performed without erroneous operations, with ease and with reliability.

Next, in S250, a judgment is made as to whether a menu item in the projected operation menu K has been selected. As the enter key P6 is pressed, it is determined that the menu item in the projected operation menu K is selected (S250: YES). Next, in S251, an execution instruction process in regard to the menu item selected in S250 is executed to the video processing circuit 30.

It is noted that currently the image "AF" is projected in a state allowing the operator M to squarely view the image, as shown in FIG. 9. However, in other words, the image "AF" is recognized in a horizontally inverted state when it is viewed from the back of the board B, which may be inconvenient.

In such a case, the menu item "HORIZONTAL INVERSION" can be selected so that an instruction process for horizontally inverting the image "AF" is executed to the video processing circuit 30. According to the execution instruction process, the video processing circuit 30 horizontally inverts the image display data and outputs the inverted image display data, by which the image "AF" is projected onto the screen Sc in a direction allowing the operator M to view the image from the back of the board B squarely.

In S250, if the operator M selects the menu item "SPLIT DISPLAY", the user is allowed to further select one of division numbers "2" and "4", for example, in the vertical projection operation menu K by shifting the cursor through the operation panel P. Subsequently, a menu item in the vertical projection operation menu K for the split display, such as the "PARALLEL LAYOUT" (a shaded area in the vertical projection operation menu K), can be selected by the operator M through the operation panel P.

As the division number "2" is selected, the operator M is allowed to further select one of display options indicated in the vertical projection operation menu K for the split display. In the present embodiment, one of the display options "PARALLEL LAYOUT", wherein the duplicated images are horizontally aligned with their ups and downs coincided and "HORIZONTAL INVERSION", wherein the duplicated images are horizontally inverted with respect to each other, can be selected.

It is noted that the split display of the vertical projection operation menu K projected on the screen Sc includes only menu items that are available for the split display in the vertical projection (with the screen Sc placed in the vertical position), therefore the operation on the operation panel P to select the split display options in the vertical projection can be performed without erroneous operations, with ease and with reliability.

Next, in S251, the execution instruction process in regard to the menu item selected in S250 is executed to the video processing circuit 30.

According to the execution instruction process, the video processing circuit 30 rotates the image display data and outputs the rotated image display data to the LCD driving circuit 60, by which the image "AF" is projected through the LCD 90 onto the screen Sc in a direction allowing the operator M to squarely view the image.

In the present embodiment, as the division number "2" for split display is selected as a display option, and the selected menu item is the "PARALLEL LAYOUT" in the execution instruction process in S251, the image "AF" is duplicated in two and projected by the projector according to the process by the video processing circuit 30 so that the two "AF"s are displayed side by side.

As explained above, the vertical projection operation menu K includes menu items and display options that are available for vertical projection. The vertical projection operation menu K, not including menu items that are available only for horizontal projection, is easy to view and operate for the operator M. Therefore, the selection of menu items from the vertical projection operation menu K by operating the operation panel P can be made easily and correctly while preventing erroneous operations on the operation panel P (e.g. erroneously selecting a menu item that is available only for the horizontal projection). Thus, the usage of the projector can be improved.

In the present embodiment, the screen Sc is fixed onto the transparent board B, however, the screen Sc may be fixed onto a board having a plane such as a white board and a black board. Further, the screen Sc can be a nontransparent screen that cannot be seen through from the opposite side (from the back).

Second Embodiment

Figure 11:
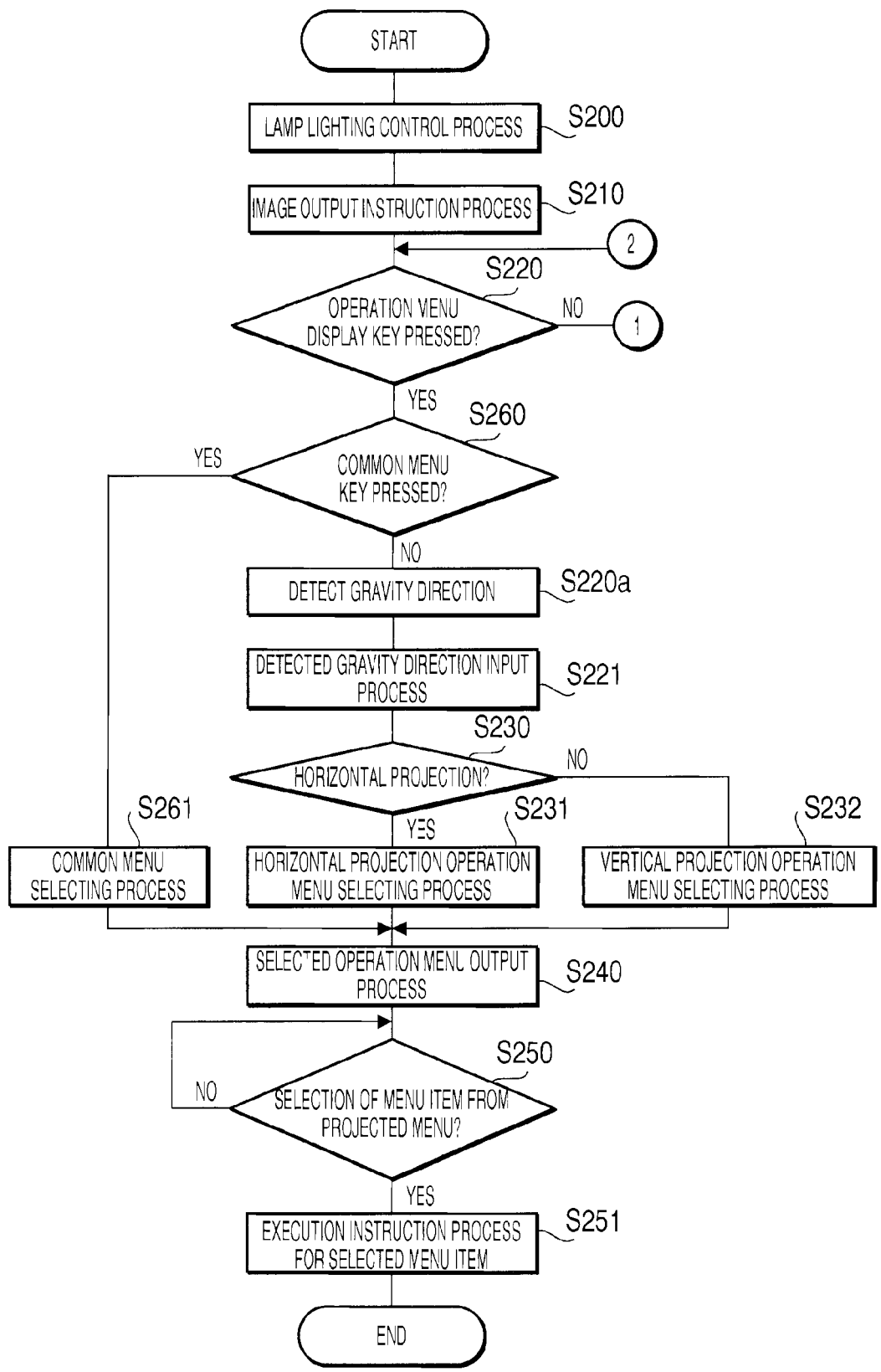
FIG. 11 shows a first part of a flowchart showing an operation of a microcomputer of the projector according to a second embodiment of the present invention.
Figure 12:
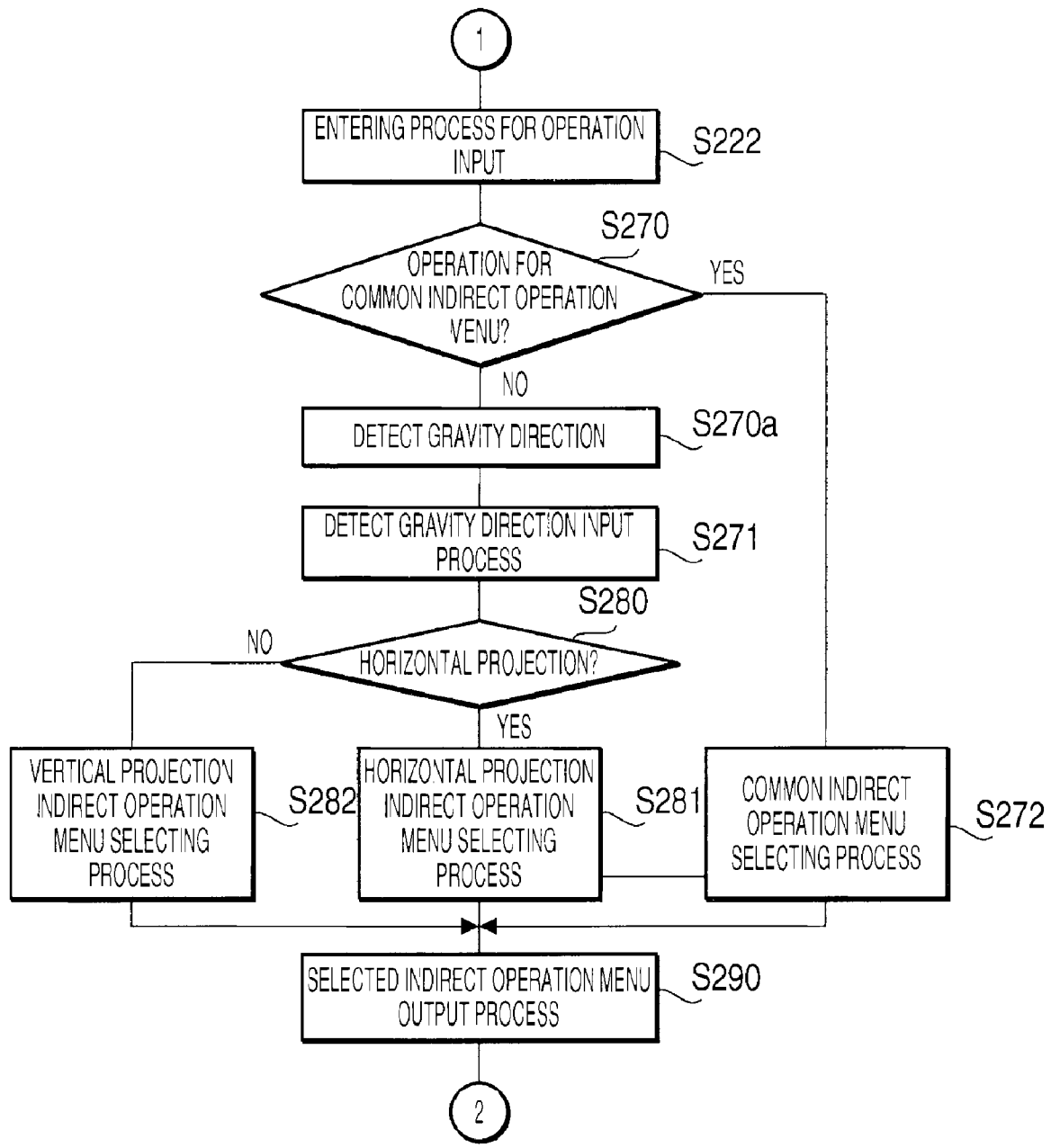
FIG. 12 shows a second part of the flowchart showing the operation of the microcomputer of the projector according to the second embodiment of the present invention.
Figure 13A:
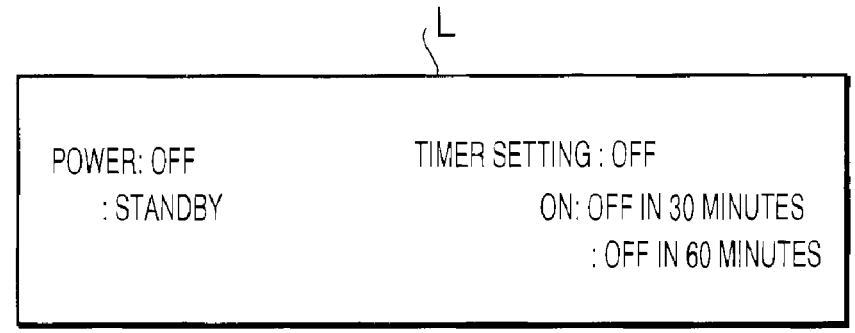
FIGS. 13A-13C illustrate a common menu, a horizontal projection operation menu, and a vertical projection operation menu stored in a ROM of the microcomputer of the projector according to the second embodiment of the present invention.
Figure 13B:
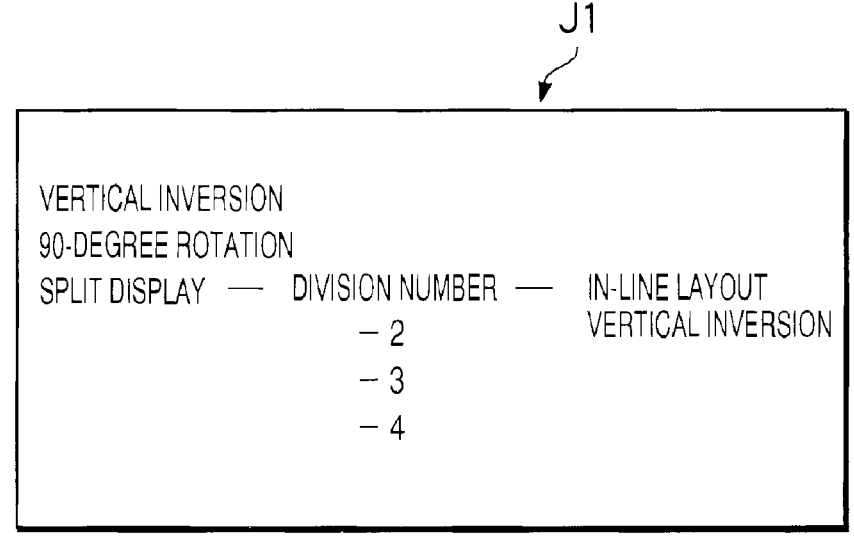
Figure 13C:
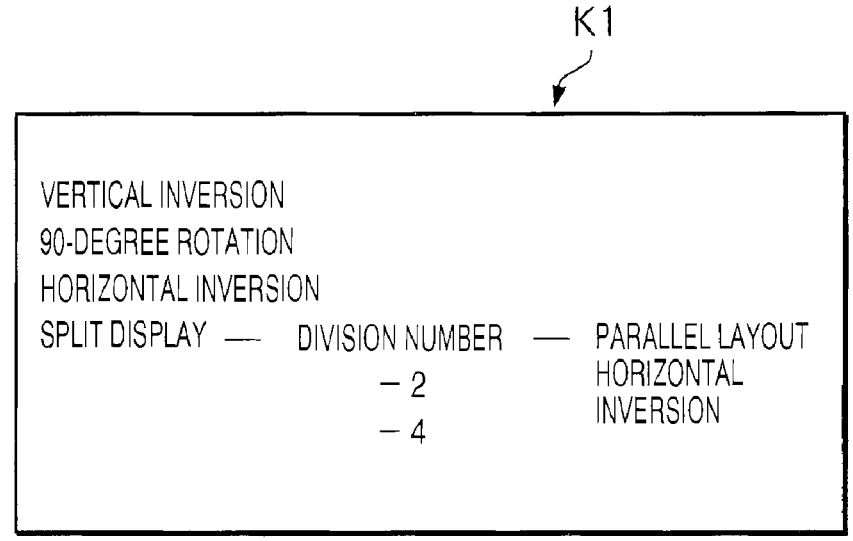

FIG. 11 shows a first part of a flowchart showing an operation of the microcomputer 20 of the projector 2000 according to the second embodiment of the present invention. FIG. 12 shows a second part of the flowchart showing the operation of the microcomputer 20 of the projector 2000 according to the second embodiment of the present invention. FIGS. 13A-13C illustrate a common menu, a horizontal projection operation menu, and a vertical projection operation menu stored in a ROM of the microcomputer 20 of the projector 2000 according to the second embodiment of the present invention. In the present and the following embodiments, a configuration similar to that of the first embodiment is referred to by an identical reference numeral, and description of that will be omitted. It is noted in the second embodiment that operation shown in FIG. 4 in the first embodiment is replaced with the operations shown in FIGS. 11, 12.

In the second embodiment, a common menu key (not shown) and a confirmation key (not shown) are additionally provided to the operation panel P. The common menu key is pressed for selecting a common operation menu included in operation menu data which will be explained below. The confirmation key is pressed for confirming operations and various settings given by the operator M.

Further, in the second embodiment, the operation menu data representing the horizontal projection operation menu J and the vertical projection operation menu K in the first embodiment is replaced with operation menu data representing a common menu L (FIG. 13A), a horizontal projection operation menu J1 (FIG. 13B) and a vertical projection operation menu K1 (FIG. 13C).

The common menu L in the second embodiment includes menu items that are independent of the method of projection (i.e., horizontal projection and vertical projection). Specifically, the common menu L includes menu items that are available regardless of the projecting method such as "POWER OFF", "POWER STANDBY", "TIMER: OFF", "TIMER: OFF IN 30 MINUTES", and "TIMER: OFF IN 60 MINUTES", as shown in FIG. 13A.

The horizontal projection operation menu J1 includes a menu to be used in horizontal projection. Specifically, the horizontal projection operation menu J1 has a plurality of menu items including "VERTICAL INVERSION", "90-DEGREE ROTATION" and "SPLIT DISPLAY", together with "DIVISION NUMBER—2, 3, 4", "PARALLEL LAYOUT" and "VERTICAL INVERSION" for the split display as shown in FIG. 13B.

The vertical projection operation menu K1 includes a menu to be used in vertical projection. Specifically, the vertical projection operation menu K1 has a plurality of menu items including "VERTICAL INVERSION", "90-DEGREE ROTATION", "HORIZONTAL INVERSION" and "SPLIT DISPLAY", together with "DIVISION NUMBER—2, 4", "PARALLEL LAYOUT" and "HORIZONTAL INVERSION" for the split display as shown in FIG. 13C. Incidentally, the common menu data and the operation menu data in the second embodiment have previously been stored in the ROM of the microcomputer 20.

In the projector 2000 configured as above, the operation of the microcomputer 20 is executed in accordance with the flow shown in FIG. 11. As the flow starts, steps S200 through S220 are executed similarly to the flow shown in FIG. 4.

In S220, when the operation menu display key P1 of the operation panel P is pressed by the operator M (S220: YES), the process proceeds to S260, wherein a judgment is made as to whether the common menu key is pressed.

In S220, when the operation menu display key P1 is not pressed (S220: NO), the process proceeds to S222 (see FIG. 12), which will be described later. When the common menu key is pressed (S260: YES), the process proceeds to S261, wherein a common menu selecting process is executed.

In S261, in the common menu selecting process, the common menu L is selectively read out from the menu data previously stored in the ROM of the microcomputer 20 and inputted to the RAM of the microcomputer 20.

In S260, if it is judged that the common menu key is not pressed (S260: NO), the process proceeds to S220a and the steps following S220 (S220a-S221-S230-S231-S240, or S220a-S221-S230-S232-S240) as described in the first embodiment.

In the above process, when the step S240 is executed following S231, the horizontal projection operation menu J1 is selectively read out from the operation menu data previously stored in the ROM of the microcomputer 20 and inputted to the RAM of the microcomputer 20.

In the above process, when the step S240 is executed following S232, the vertical projection operation menu K1 is selectively read out from the operation menu data previously stored in the ROM of the microcomputer 20 and inputted to the RAM of the microcomputer 20.

Thus, data representing one of the horizontal projection operation menu J1 and the vertical projection operation menu K1 is output as data to the video processing circuit 30. Accordingly, one of the horizontal projection operation menu J1 and the vertical projection operation menu K1, which corresponds to the previous data output, is projected onto the screen Sc according to the process by the video processing circuit 30 similarly to the first embodiment.

Next, in S250, the execution instruction process in regard to the menu item selected in S250 is executed to the video processing circuit 30. Next, in S251, an execution instruction process in regard to the menu item selected in S250 is executed to the video processing circuit 30.

In S250, the menu item "90-DEGREE ROTATION", for example, is selected by the user M (S250: YES), the image rotated at 90 degrees is projected onto the screen Sc according to the process by the video processing circuit 30 (S251).

Meanwhile, in S220, when the operator M presses the confirmation key and does not press the operation menu display key P1 (S220: NO), an entering process for operation input is executed in step S222 (see FIG. 12). In this step, an operation input made by the operator M to the projector 2000 through the keys on the operation panel P other than the keys P1-P6 is entered. In the second embodiment, the operation input through the keys other than the keys P1-P6 is referred to as an "indirect operation menu"). The indirect operation menu includes a common menu for indirect operation (a common indirect operation menu), a menu for horizontal projection indirect operation (a horizontal projection indirect operation menu), and a menu for vertical projection indirect operation (a vertical projection indirect operation menu). Data representing the indirect operation menus has previously been stored in the ROM of the microcomputer 20. Incidentally, the indirect operation menu refers to, for example, alarm menus, which indicate directions for use, operational instructions, urgent notification in case of an error, and the like. The alarm menus are provided to each of the indirect operation menus (common indirect operation menu, horizontal projection indirect operation menu, and vertical projection indirect operation menu).

Next, in S270, it is judged as to whether the operation input made by the operator M and entered in S222 is, for example, the common alarm menu in the common indirect operation menu. If the operation input is the common alarm menu (S270: YES), in S272, a selecting process for common indirect operation menu is executed.

In S272, data representing the common alarm menu is selectively read out from the indirect operation menu data previously stored in the ROM of the microcomputer 20 and inputted in the RAM of the microcomputer 20.

Meanwhile, in S270, when the operation input entered in S222 is not a common indirect operation menu (S270: NO), the process proceeds to S270a, wherein a direction of gravity is detected. Thereafter, the process proceeds to S271, wherein a detected gravity direction input process is executed. In the detected gravity direction input process, the gravity direction detected by the gravity sensor 20a in S270a is inputted in the microcomputer 20 to be stored in the RAM of the microcomputer 20.

Next, in S280, a judgment is made as to whether the projector 2000 is performing horizontal projection. That is, it is judged as to whether an attitude of the screen Sc to be projected is horizontal.

In S280, if it is judged that the projector 2000 is performing horizontal projection (S280: YES), in S281, data representing the horizontal projection alarm menu is selectively read out from the indirect operation menu data previously stored in the ROM of the microcomputer 20 and inputted in the RAM of the microcomputer 20.

In S280, if it is judged that the projector 2000 is not performing horizontal projection (S280: NO), in S282, data representing the vertical projection alarm menu is selectively read out from the indirect operation menu data previously stored in the ROM of the microcomputer 20 and inputted in the RAM of the microcomputer 20.

Thus, data representing one of the horizontal projection alarm menu and the vertical projection alarm menu is output to the video processing circuit 30. Accordingly, in S290, one of the horizontal projection alarm menu and the vertical projection alarm menu, which corresponds to the previous data output, is projected onto the screen Sc according to the process by the video processing circuit 30.

Thereafter, the microcomputer 20 waits for a predetermined period and returns to S220.

As described above, in the second embodiment, the common operation menu L as well as the horizontal projection operation menu J1 and the vertical projection operation menu K1 can be projected on the screen Sc. Therefore, the operation menus, more preferably projected according to the state (attitude) of installation of the projector, which is easier to view and easier to operate, becomes available.

Further, in the second embodiment, the horizontal projection indirect operation menu and the vertical projection indirect operation menu as well as the common indirect operation menu in the indirect operation menus can be displayed. Therefore, indirect operation menus still more preferably projected according to the state (attitude) of installation of the projector, which is user-friendly, becomes available.

The present invention can be implemented in various ways without restricting it to the above embodiments, and various other modifications as described below, for example, are also available.

The present invention is applicable to various types of projectors such as ceiling-mounted projectors as well as the tabletop projectors as described above.

Various display elements, such as a DMD (Digital Micromirror Device) and a reflective LCOS (Liquid Crystal On Silicon), as well as the LCD 90, may be employed for a projector according to the present invention.

The menu images as auxiliary images in the present invention are not restricted to the images regarding the operation menus of the projector, but application of the present invention to various kinds of images is possible. The menu images may include, for example, notation concerning the usage of the projector, a logotype, and a commercial message provided by the projector maker that may be projected side-by-side to display a normal image or a horizontally inverted image in vertical projection or a horizontally inverted image in horizontal projection. The menu image can be any image which can be generated in the projector as described above and of which display content varies depending on the projecting direction or the direction of installation of the projector with respect to the gravity direction. The menu images to be projected can include current date, elapsed time, information indicating which input is being displayed, thumbnail images of slides, previously displayed images, textual information. In the above embodiments, the menu image is switched (alternated) with the externally inputted image (the main image), however, various display styles, such as overlaying (combining) display letting the inputted images be seen through the menu image, are possible.

In the second embodiment, the indirect operation menu is called in response to the confirmation key being pressed by the operator M presses, however, it can be configured such that the indirect operation menu is called automatically when a predetermined criteria is fulfilled. For example, the process may be configured such that the indirect operation menu can be projected immediately after image display becomes available in S200. In such a configuration, projecting directions for use, etc. may be effective. In this case, direction of the gravity is detected after the projector is turned on and before the image display becomes available, and a notation corresponding to the detected gravity direction may be displayed. The notation refers to, for example, a message to warn the operator M that luminance on the screen surface tends to drop in vertical projection and instruct the operator M to raise the luminance of the projection and reduce external light, and a message instructing the operator M to reduce the luminance (as the luminance is higher in horizontal projection) and raise luminance of external light in horizontal projection, etc.

The projector may also be configured to successively execute the lamp lighting control process (S200), the image output instruction process (S210), the detected gravity direction input process (S221), the horizontal/vertical projection judgment process (S230), a process for displaying a corresponding menu image (S240), and a process to stop displaying the menu image after a predetermined period of time and displaying the inputted main image, and thereafter advance to S220 in FIG. 4 in response to an operation input by the operator M. Incidentally, the display of the horizontal projection menu and vertical projection menu may also be made after displaying the common menu. Similarly, the display of the horizontal projection indirect operation menu and vertical projection indirect operation menu may also be made after displaying the common indirect operation menu.

The common menu key which are mentioned in the second embodiment may be any key that is designed to be operated for calling a menu, which is independent of the projecting direction. Examples of the common menu key may include the key for specifying the on/off/standby of the power (power key), a timer setting key, etc. The common menu key may either be placed on the operation panel P or in another position.

The judgment on the projecting direction of the projector is made based on the detected gravity direction in the above embodiments. However, there are various relation patterns between the gravity direction and the reference axis of the projector when the projector is equipped with a means for rotating its projecting unit, laid down on a table, and used by changing its projecting direction when the projector is fixed onto a holding means which can hold the projector in an arbitrary orientation. Therefore, it is desirable to judge the projecting direction in consideration of the positional relation between the viewer and the projector's projecting direction In the above described projectors 1000, 2000, it is noted that the menu image representing the operation menu does not include the menu items which are not used in the current operation. Therefore, the user can be prevented from being confused by an unnecessary menu item, and the usage of the projectors 1000, 2000 can be improved.

Meanwhile, the operation menu is generated according to the attitude of the projectors 1000, 2000, which is s detected based on the direction of the gravity detected by the gravity sensor 20a. Thus, the operation menu can be configured to exclude the menu items which are not used in the current operation.

Further, through the video processing circuit 30 and the steps S231, S232, S240, S250, S251, S261, S272, S281 and S282, data representing the menu image, which corresponds to one of a horizontal projection menu and a vertical horizontal menu, can be generated.

Furthermore, data representing the menu image, which corresponds to one of a horizontal menu used exclusively for projecting the main image on a horizontal display surface of the screen Sc, a vertical projection menu used exclusively for projecting the main image on a vertical display surface of the screen Sc, and a common menu used for projecting the video image on either of the horizontal display surface and the vertical display surface, can be generated.

Third Embodiment

Figure 14:
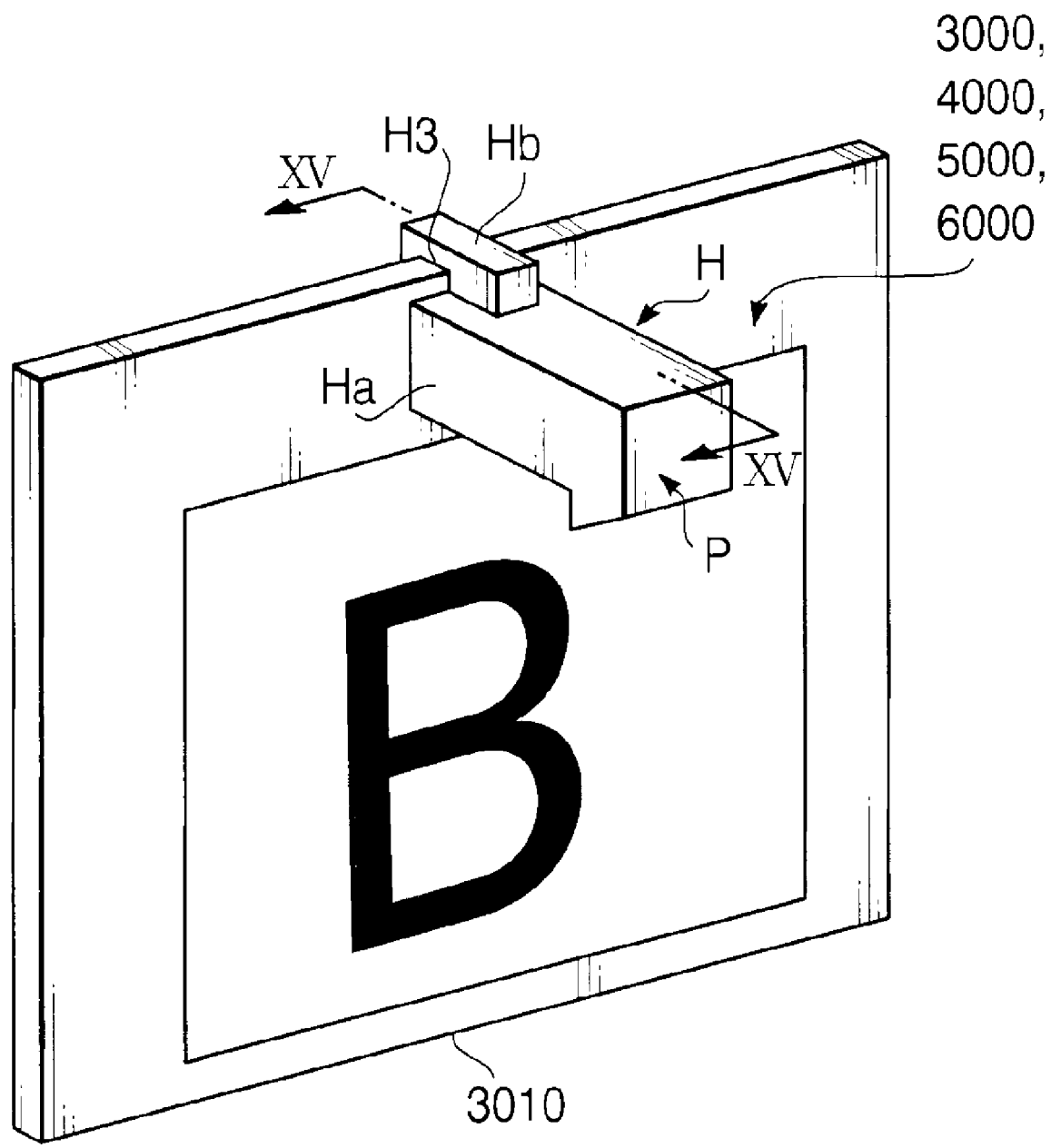
FIG. 14 is a perspective view of video projected on a board and a projector supported on an upper edge part of the board according to a third embodiment of the present invention.
Figure 15:
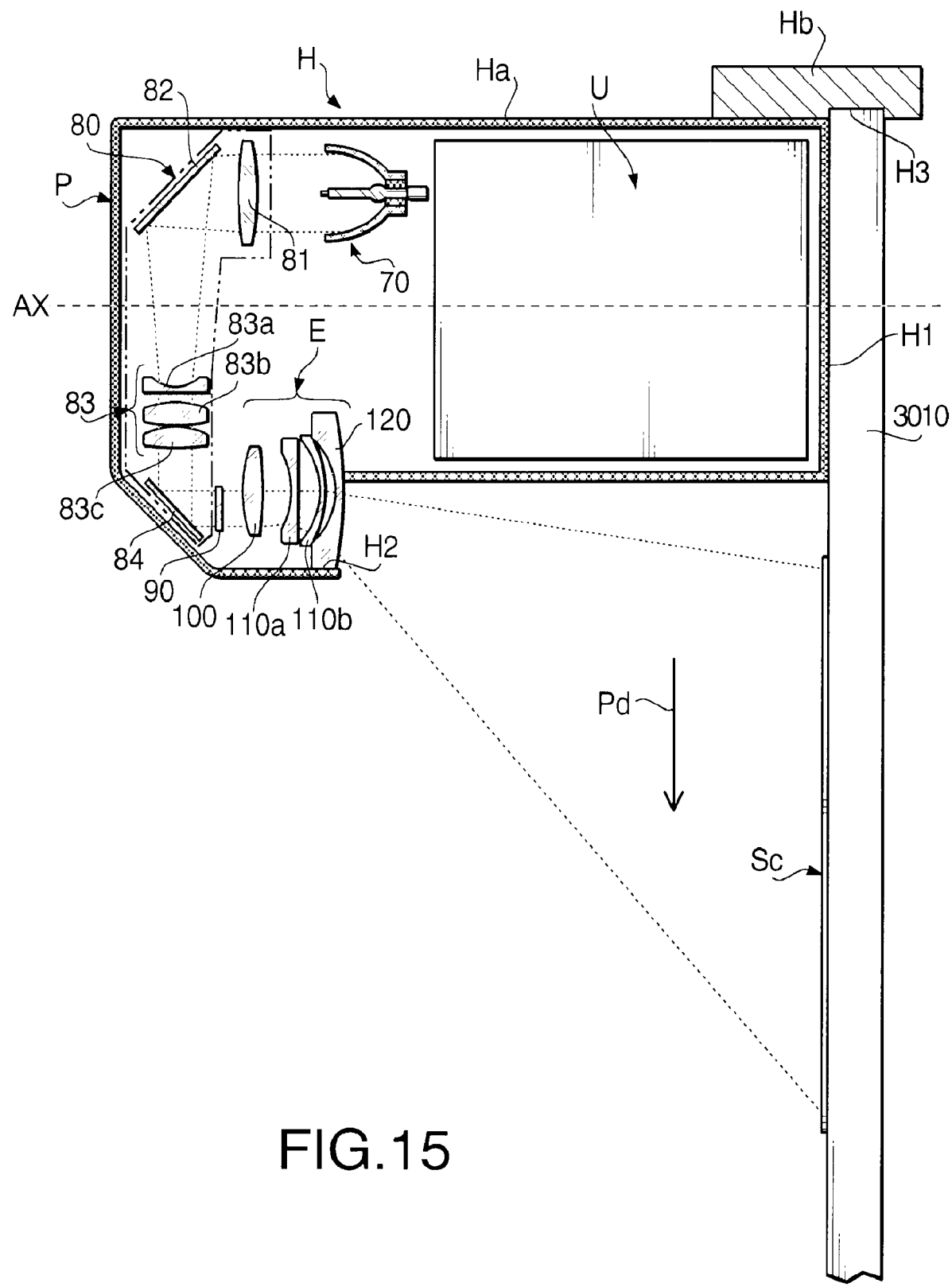
FIG. 15 is a cross-sectional view of the projector taken along the line XV-XV in FIG. 14 according to the third embodiment of the present invention.

FIG. 14 is a perspective view of an image projected on a vertically oriented board 3010 and a projector 3000 supported on an upper edge part of the board according to a third embodiment of the present invention. FIG. 15 is a cross-sectional view of the projector 3000 taken along the line XV-XV in FIG. 14 according to the third embodiment of the present invention. A configuration of a circuit of the projector 3000 according to the third embodiment of the present invention is similar to that of projector 1000, which is shown in FIG. 3. The projector 3000 has a housing H, which horizontally extends from an upper edge part of the board 3010 toward the front of the board 3010 as shown in FIG. 14. Incidentally, the board 3010 is supported by a frame (not shown) to be oriented in an upright position.

The housing H includes a housing body Ha and a fixing member Hb. The housing body Ha is fixed onto the surface of the upper edge part of the board 3010, with its bottom H1 contacting the board 3010. The fixing member Hb is firmly fixed onto a rear surface of the housing body Ha as shown in FIG. 15, and a concave portion H3 of the fixing member Hb is engaged with the upper edge of the board 3010 from above, by which the housing H (housing body Ha) is detachably attached to the upper edge part of the board 3010.

Figure 16:
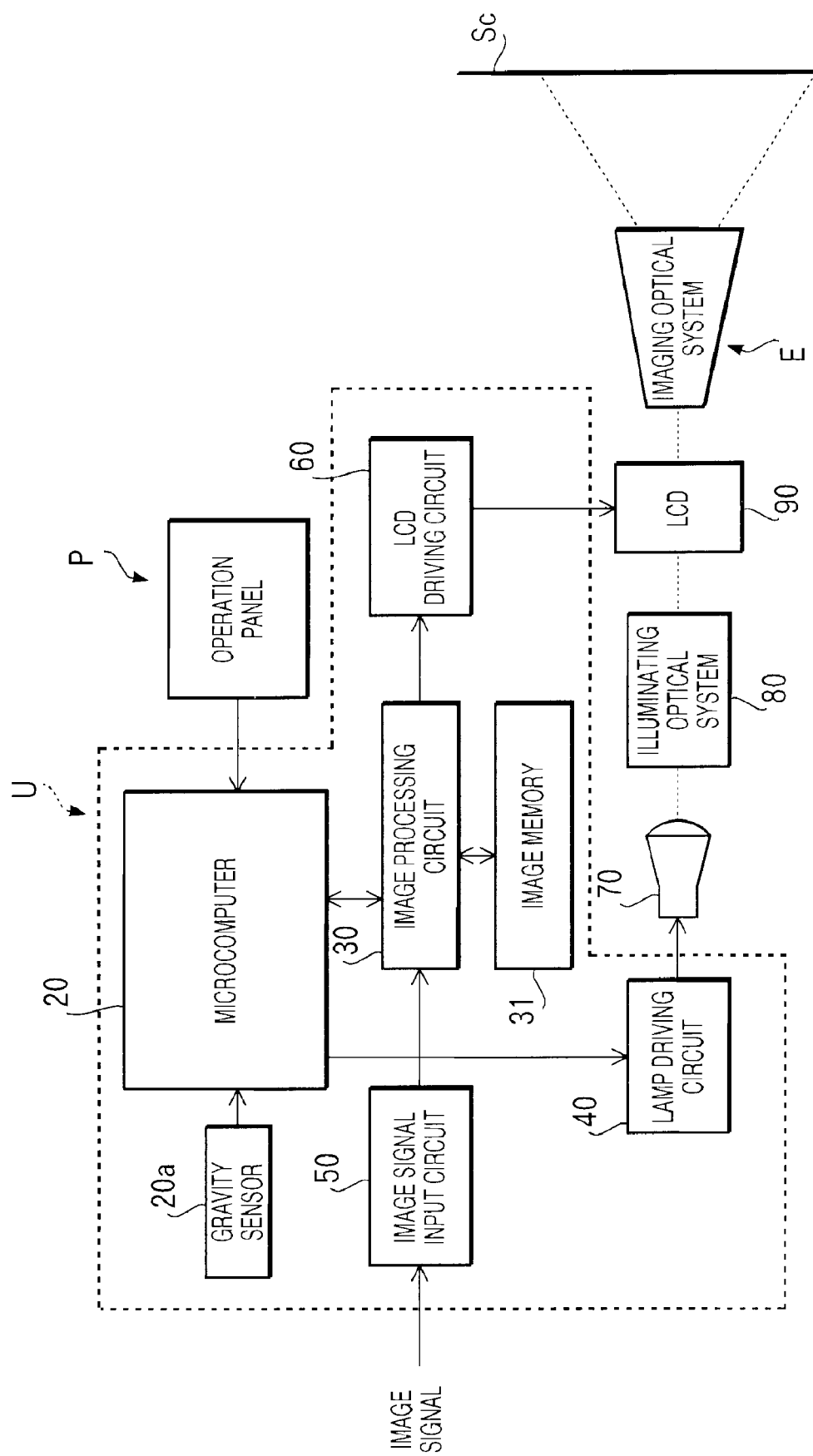
FIG. 16 is a block diagram showing a configuration of a circuit of the projector 3000 according to the third embodiment of the present invention.

As shown in FIGS. 15 and 16, the projector 3000 includes an operation panel P, a control unit U, a lamp 70, an illuminating optical system 80, an LCD 90, and an imaging optical system E. The operation panel P, which is arranged on an upper surface of the housing body Ha, includes a plurality of push keys.

As shown in FIG. 15, the control unit U is installed in the housing body Ha along with the lamp 70, the illuminating optical system 80, the LCD 90, and the imaging optical system E.

FIG. 16 is a block diagram showing a configuration of a circuit of the projector 3000 according to the third embodiment of the present invention.

As shown in FIG. 16, the control unit U is arranged between the operation panel P and the lamp 70 and between the operation panel P and the LCD 90. The control unit U is equipped with a microcomputer 20 and a gravity sensor 20a.

Figure 17:
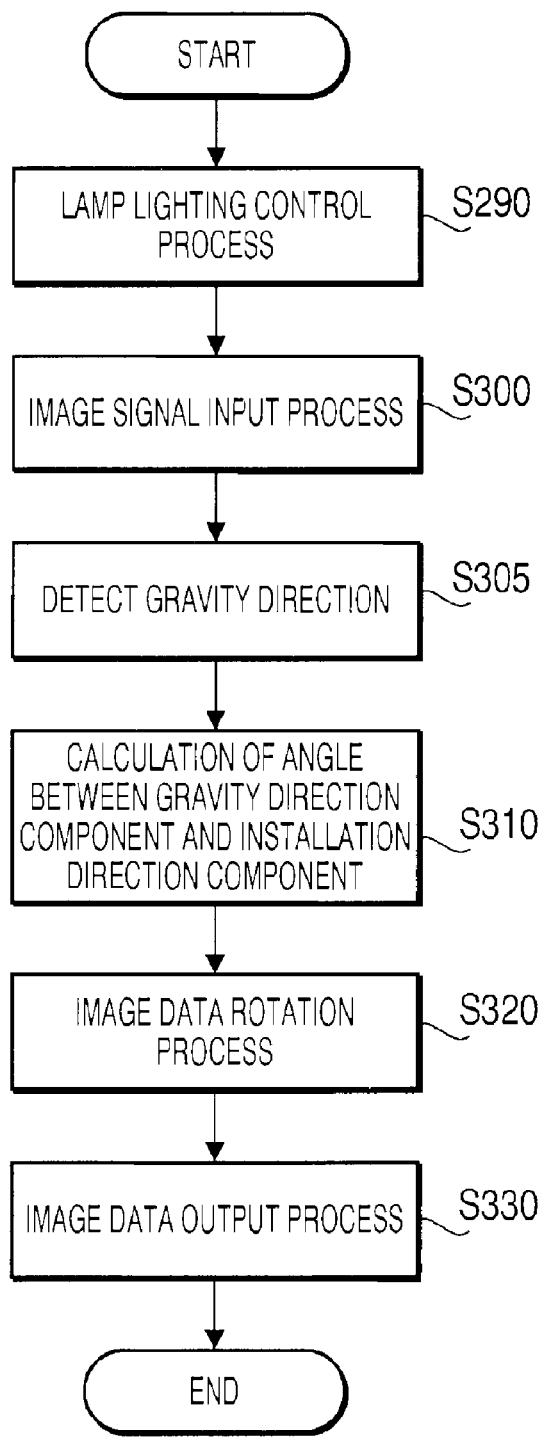
FIG. 17 is a flowchart showing an operation of the microcomputer of the projector according to the third embodiment of the present invention.

A CPU of the microcomputer 20 executes programs including a computer program, of which flow is indicated in a flowchart shown in FIG. 17. FIG. 17 is a flowchart showing an operation of the microcomputer 20 of the projector 3000 according to the third embodiment of the present invention.

Figures 18, 19:
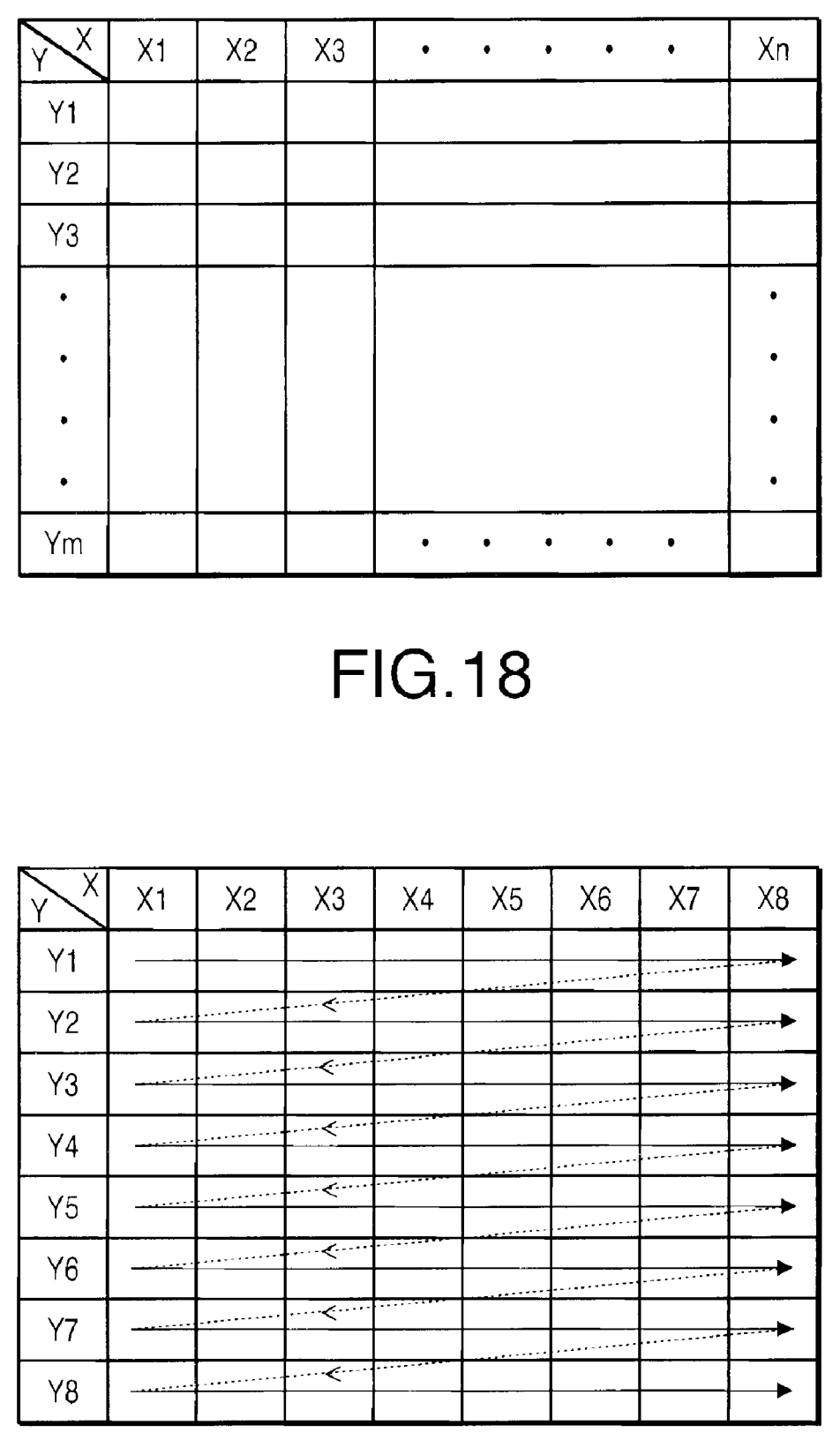

A video memory 31, having m-by-n storage areas arranged in a matrix of rows and columns as schematically shown in FIG. 18, is used for temporarily storing the video data processed by the video processing circuit 30. FIG. 18 is a schematic diagram showing storage areas of the video memory 31 of the projector 3000 according to the third embodiment of the present invention. The reading/writing of data from/to the video memory 31 is executed by the video processing circuit 30. As shown in FIG. 18, each of the m-by-n storage areas is named "YmXn" (m=1, 2 . . . , n=1, 2 . . . ).

The video signal input circuit 50 receives a video signal transmitted from an external device (not shown), converts the video signal to a predetermined signal format, and outputs the converted signal to the video processing circuit 30 as digitized video data. As an example of the predetermined signal format, an RGB signal (component signal) format, using signals corresponding to the three primary colors (red, green, blue) as the basis of color display, may be used.

The imaging optical system E includes a convex lens 100, biconcave lenses 110a and 110b, and a projection lens 120 as shown in FIG. 15. Approximately a whole right half of the projection lens 120 of the imaging optical system E faces the screen Sc on the board 3010 via an opening H2 of the housing H.

The imaging optical system E projects the light transmitted through the LCD 90 onto the screen Sc via the opening H2 of the housing H along a projecting direction Pd. Thus, the images formed on the LCD 90 are projected onto the screen Sc being in the upright orientation. It is noted that the image on the screen Sc is in an erecting orientation when it is viewed by a user positioning in front of the board 3010, and the image on the LCD 90 is formed in a vertically inverted orientation with respect to the image on the LCD 90 of the projector 2000 according to the second embodiment.

In projector 3000 as above, when the control unit U enters its operating state, the microcomputer 20 starts executing the control program according to the flow shown in FIG. 17. The microcomputer 20 first executes a lamp driving process (S290), by which the lamp 70 is driven by the lamp driving circuit 40 and the light emitted by the lamp 70 is guided by the illuminating optical system 80 to the LCD 90 as illuminating light.

Subsequently, in S300, a video signal input process is executed. According to the video signal input process, status of input of video data as inputted to the video processing circuit 30 from the video signal input circuit 50 is transmitted to the microcomputer 20.

In this step, a video data storing process is executed by the video processing circuit 30, in which the video data as the input video signal is stored in the video memory 31.

In the present embodiment, the video data is configured with data representing an image of an alphabet "B" having $8^2$ pixels, for example, and the pixels of the image data are successively stored in the storage areas Y1X1-Y8X8 of the video memory 31 as video data, respectively.

FIG. 19 is a schematic diagram showing an order to store the $8^2$ pixels in the video memory 31 of the projector 3000 according to the third embodiment of the present invention. Specifically, when a write address is indicated as "AWmn", write addresses AW11, ..., AW18, AW21, ..., AW28, ..., AW81, ..., AW88 are successively generated by the video processing circuit 30. The $8^2$ pixels forming the aforementioned image data are successively stored in the storage areas Y1X1, ..., Y1X8, Y2X1, ..., Y2X8, Y3X1, ..., Y3X8, ..., Y8X1, ..., Y8X8 of the video memory 31 as indicated by solid and broken arrows in FIG. 19, as designated by the write addresses AW11, ..., AW18, AW21, ..., AW28, ..., AW81, ..., AW88 successively generated as above. Incidentally, each write address AWmn corresponds to and designates each storage area YmXn.

Figure 20:
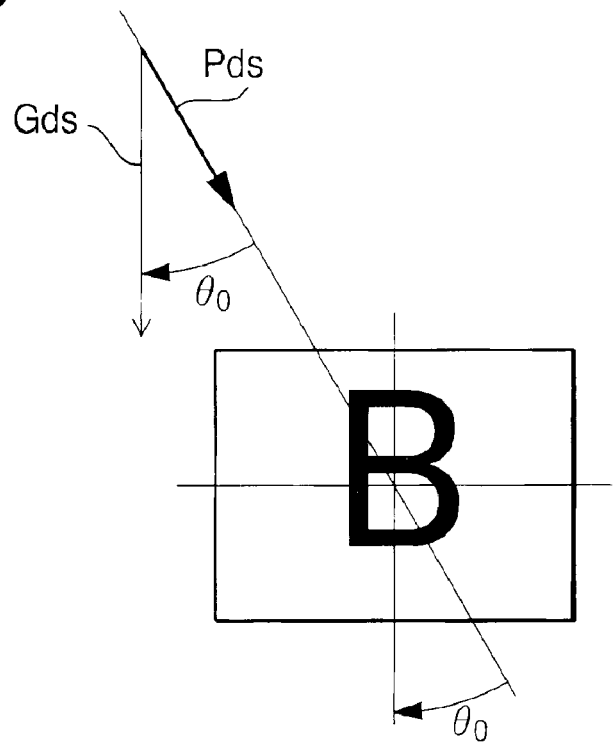
FIG. 20 is a schematic diagram showing a relation between video projected on the screen and an angle between a gravity component direction and a projecting direction according to the third embodiment of the present invention.

Next, in S305, a direction of the gravity component Gd is detected by the gravity sensor 20a. Further, in S310, an angle between a direction Gd of the gravity component along the screen Sc (hereinafter also referred to as a "gravity component direction Gds") and a projecting direction Pd of the projector along the screen Sc (hereinafter also referred to as a "projecting component direction Pds") is calculated (see FIG. 20). The calculated angle is hereinafter also referred to as an "angle $\Theta_0$". FIG. 20 is a schematic diagram showing a relation between the image projected on the screen Sc and the angle $\Theta_0$ according to the third embodiment of the present invention. Incidentally, in FIG. 20, the image "B" is shown in an upright state (rotated from the installation component direction Pds by the angle $\Theta_0$).

Figure 21:
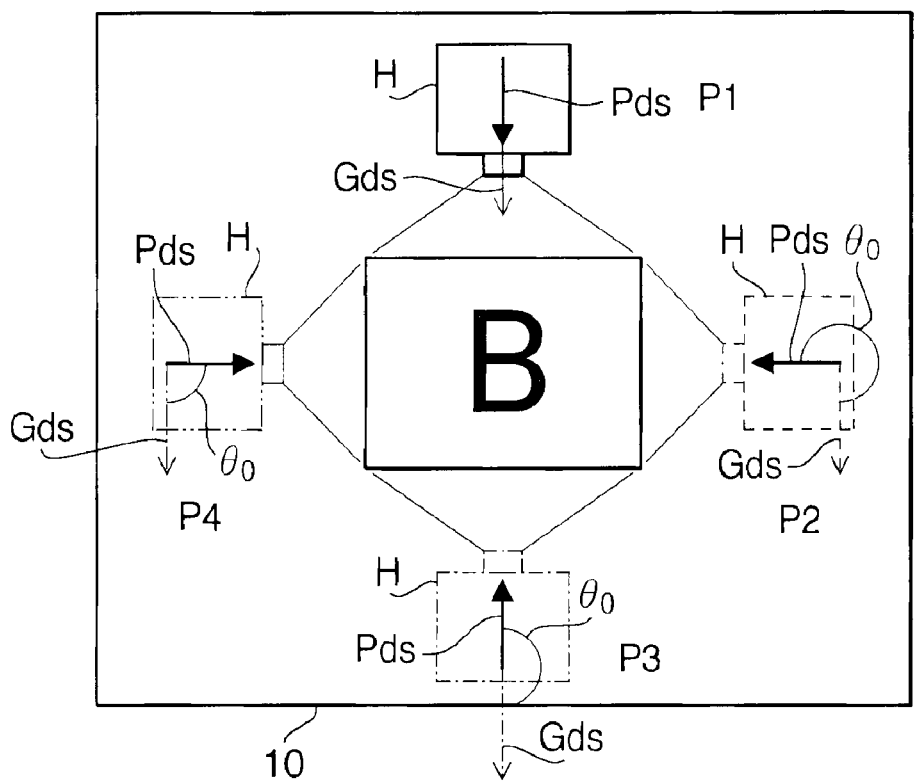
FIG. 21 is a schematic diagram showing angular relation between the gravity component direction and the projecting direction when a supporting position of the projector with respect to the screen is changed according to the third embodiment of the present invention.

Next, in S320, a video data rotating process, wherein the microcomputer 20 instructs the video processing circuit 30 to rotate the image to be projected at the angle $\Theta_0$ obtained in S310, is executed. For example, when the angle $\Theta_0$ is 0 degree (with the projector 3000 arranged in a position P1 in vicinity to the upper edge of the board 3010 as shown in FIG. 14 and indicated in a solid line in FIG. 21), a process for rotating the image represented by the video signal from the video signal input circuit 50 at the angle $\Theta_0$=0 degree is executed since the image of the "B" is to be projected in the upright state when viewed from the lower edge of the board 3010 (see FIGS. 14 and 21). FIG. 21 is a schematic diagram showing angular relation between the gravity component direction Gds and the projecting component direction Pds when a supporting position of the projector with respect to the screen is changed according to the third embodiment of the present invention. That is, no rotation of the image is necessary.

Therefore, when a read address is indicated as "ARmn", read addresses AR11, ..., AR18, AR21, ..., AR28, ..., AR81, ..., AR88 are successively generated by the video processing circuit 30 according to the instructions from the microcomputer 20. Accordingly, the $8^2$ pixels forming the aforementioned image are successively read out from the storage areas Y1X1, ..., Y1X8, ..., Y2X1, ..., Y2X8, ..., Y8X1, ..., Y8X8 of the video memory 31 as designated by the read addresses AR11, ..., A18, ..., AR21, ..., AR28, ..., AR81, ..., AR88 successively generated as above, and are formed as rotation image data (data of the image to be rotated). Incidentally, each read address ARmn corresponds to and designates each storage area YmXn.

On the other hand, when the angle $\Theta_0$ calculated in S310 is not 0 degree in the image rotation process, the image "B" is to be projected in an rotated orientation with respect to the upright state. Therefore, a process for rotating the image represented by the video signal from the video signal input circuit 50 at the angle $\Theta_0$ is executed by the video processing circuit 30 according to the instructions from the microcomputer 20.

For example, when the projector 3000 is arranged in a position P3 in vicinity to the lower edge of the board 3010 as indicated by a dash-and-dot line in FIG. 21, the angle $\Theta_0$ is 180 degrees. Since the image "B" is to be projected in a vertically inverted state when viewed from the lower edge of the board 3010 if no rotation is made to the image, the microcomputer 20 instructs the video processing circuit 30 to rotate the image represented by the signal from the video signal input circuit 50 at 180 degrees.

Figures 22, 23:
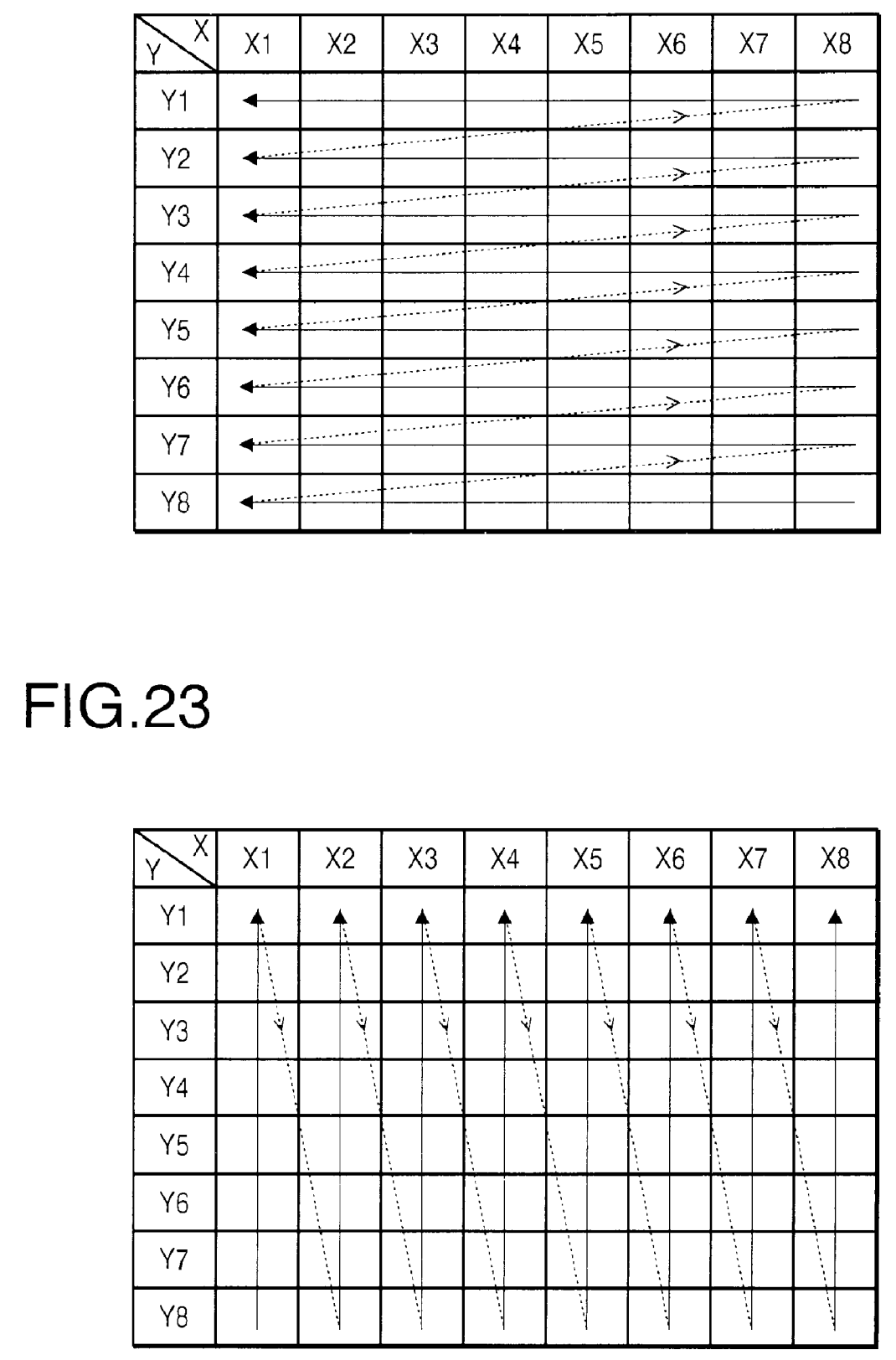

FIG. 22 is a schematic diagram showing an order to read the $8^2$ pixels from the image memory 31 of the projector 3000 when the angle $\Theta_0$ is 180 degrees according to the third embodiment of the present invention. Specifically, read addresses AR88, ..., AR81, AR78, ..., AR71, ..., AR18, ..., AR11 are successively generated by the video processing circuit 30. Accordingly, the $8^2$ pixels forming the aforementioned image are successively read out from the storage areas Y8X8, ..., Y8X1, Y7X8, ..., Y7X1, Y3X8, ..., Y3X1, Y2X8, ..., Y2X1, Y1X8, ..., Y1X1 of the video memory 31 as indicated by solid and broken arrows in FIG. 22, as designated by the read addresses AR88, ..., AR81, AR78, ..., AR71, ..., AR18, ..., AR11 successively generated as above, and are formed as the video data representing the image to be rotated at 180 degrees with respect to the inputted image.

When the projector 3000 is arranged in a position P4 in vicinity to the left edge of the board 3010 as indicated by a dash-and-two-dot line in FIG. 21, the angle $\Theta_0$ is 90 degrees. In this arrangement, the image "B" is to be projected in the upright state when viewed from the right edge of the board 3010 in FIG. 21, and thus the microcomputer 20 instructs the video processing circuit 30 to rotate the image represented by the video signal from the video signal input circuit 50 clockwise at 90 degrees.

FIG. 23 is a schematic diagram showing an order to read the $8^2$ pixels from the video memory 31 of the projector 3000 when the angle $\Theta_0$ is 90 degrees according to the third embodiment of the present invention. Specifically, read addresses AR81, ..., AR11, AR82, ..., AR12, ..., AR88, ..., AR18 are successively generated by the video processing circuit 30. Accordingly, the $8^2$ pixels forming the aforementioned image "B" are successively read out from the storage areas Y8X1, ..., Y1X1, Y8X2, ..., Y1X2, Y8X3, ..., Y1X1, ..., Y8X8, ..., Y1X8 of the video memory 31 as indicated by solid and broken arrows in FIG. 23, as designated by the read addresses AR81, ..., AR11, AR82, ..., AR12, ..., AR88, ..., AR18 successively generated as above, and are formed as video data representing the image to be rotated clockwise at 90 degrees with respect to the inputted image.

When the projector 3000 is arranged in a position P2 in vicinity to the right edge of the board 3010 as indicated by a broken line in FIG. 21, the angle $\Theta_0$ is 270 degrees. In this arrangement, the image "B" is to be projected in the upright state when viewed from around the left edge of the board 3010 in FIG. 21, and thus the microcomputer 20 similarly instructs the video processing circuit 30 to rotate the image represented by the video signal from the video signal input circuit 50 clockwise but at 270 degrees.

Specifically, read addresses AR18, ..., AR88, AR17, ..., AR87, ..., AR11, ..., AR81 are successively generated by the video processing circuit 30. Accordingly, the $8^2$ pixels forming the aforementioned image are successively read out from the storage areas Y1X8, ..., Y8X8, Y1X7, ..., Y8X7, ..., Y1X1, ..., Y8X1 of the video memory 31 as designated by the read addresses AR18, ..., AR88, AR17, ..., AR87, ..., AR11, ..., AR81 successively generated as above, and are formed as video data representing the image to be rotated clockwise at 270° with respect to the inputted image. A schematic diagram to show an order to read the $8^2$ pixels from the video memory 31 of the projector 3000 in the above described order is omitted.

Following S320, in S330, a rotation image data output process is executed. In the rotation image data output process, the rotation image data generated as above in S320 is output by the video processing circuit 30 to the LCD driving circuit 60.

Then, the LCD 90, which is driven by the LCD driving circuit 60 according to the rotation image data, forms a rotated image, and the beam supplied from the illuminating optical system 80 transmits therethrough. The beam is thus projected onto the screen Sc via the opening H2 of the housing H, by which the image specified by the rotation image data is projected onto the screen Sc.

In the present embodiment, the image specified by the rotation image data is an image obtained by rotating the data represented by the video signal supplied from the video signal input circuit 50 at the angle $\Theta_0$, which is determined by the orientation of the projector 3000, irrespective of the position of the projector 3000 (one of the upper edge, lower edge, left edge, and the right edge of the board 3010).

Therefore, irrespective of the position of the projector 3000 on the board 3010, the image of "B" specified by the rotation image data generated in S320 can still be projected onto the screen Sc as an upright image without being vertically inverted or rotated when it is viewed from the lower edge of the board 3010. Thus, the video image can be effectively projected and easily viewed. In other words, the projector 3000 can be arranged in an arbitrary position with respect to the screen Sc, and the position of the projector 3000 is not limited to the positions P1-P4 shown in FIG. 21.

Further, as the upright image can be effectively projected on the screen Sc, extra components such as an operation switch and additional tasks to operate the extra components can be omitted so that operation of the projector 3000 can be simplified.

Fourth Embodiment

Figure 24:
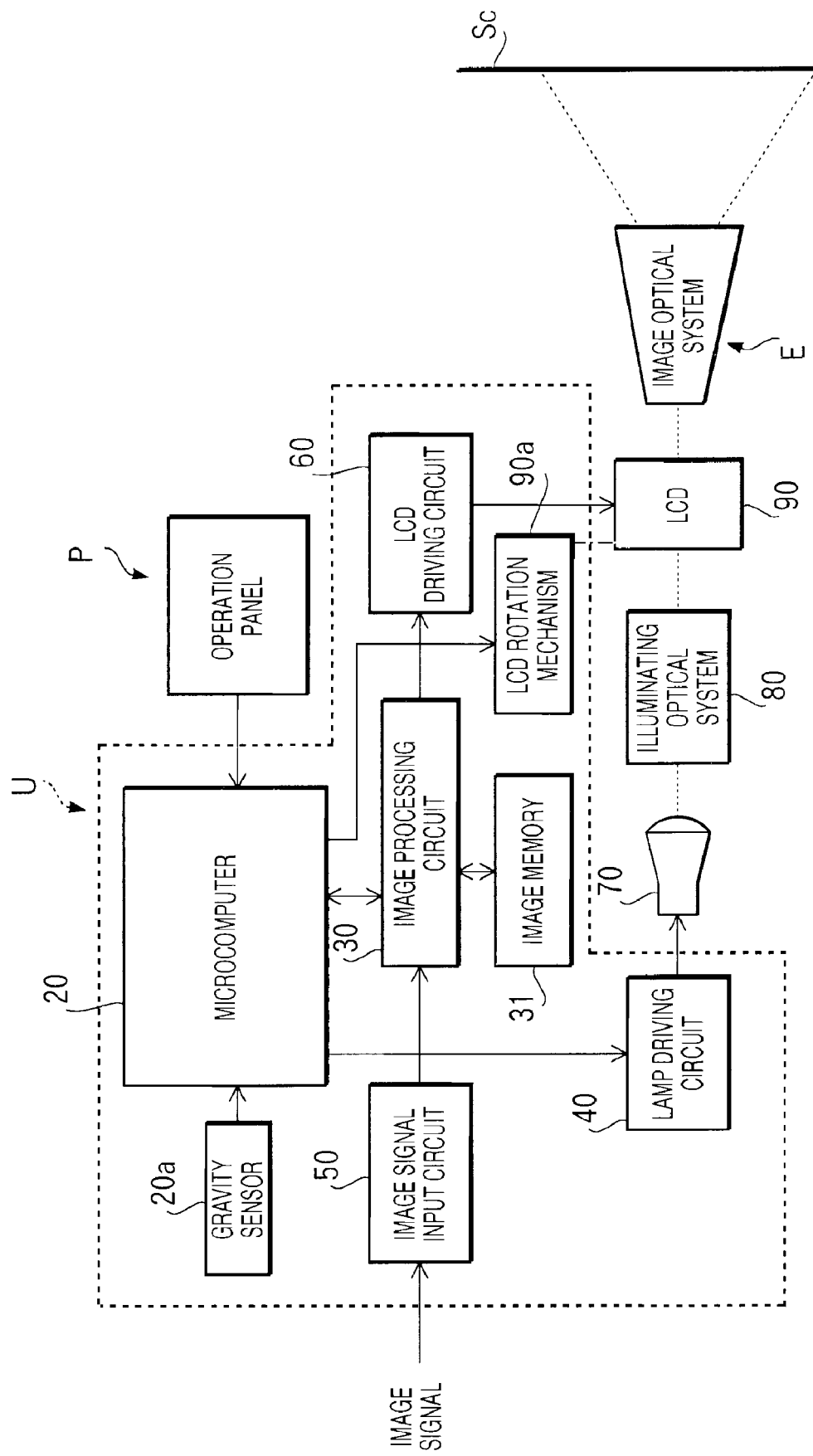
FIG. 24 is a block diagram showing a configuration of a circuit of the projector according to a fourth embodiment of the present invention.
Figure 25:
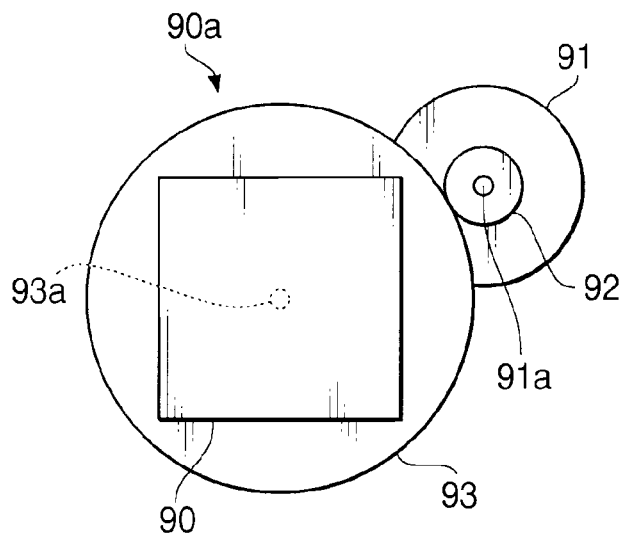
FIG. 25 is a front view showing a configuration of an LCD rotation mechanism in relation with an LCD according to the fourth embodiment of the present invention.
Figure 26:
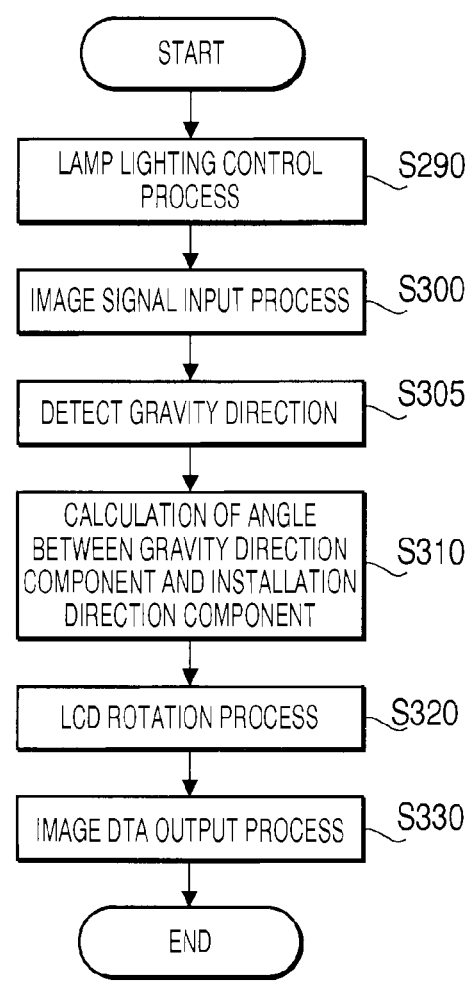
FIG. 26 is a flowchart showing an operation of the microcomputer of the projector according to the fourth embodiment of the present invention.

FIG. 24 is a block diagram showing a configuration of a circuit of the projector 4000 according to a fourth embodiment of the present invention. FIG. 25 is a front view showing a configuration of an LCD rotation mechanism 90a in relation with the LCD 90 according to the fourth embodiment of the present invention. FIG. 26 is a flowchart showing an operation of the microcomputer 20 of the projector 4000 according to the fourth embodiment of the present invention. As shown in FIG. 24, in the projector 4000 according to the fourth embodiment, the LCD rotation mechanism 90a is added to the control unit U between the microcomputer 20 and the LCD 90.

It is noted, in the fourth embodiment, that the operations shown in FIG. 17 in the previous embodiment is replaced with the operation shown in FIG. 26. Specifically, the flowchart shown in FIG. 26 is provided with an LCD rotation process (S340) instead of the image data rotation process (S320) in the flowchart of FIG. 17.

The LCD rotation mechanism 90a in the present embodiment is configured to rotatably support the LCD 90 about a rotation axis, which is parallel to the optical axis, inside the housing body Ha.

As shown in FIG. 25, the LCD rotation mechanism 90a includes a stepping motor 91, a pinion gear 92 having a smaller diameter, and a spur gear 93 having a larger diameter and made of a transparent material. The stepping motor 91 is supported on the inner wall of the housing body Ha via a supporting member (not shown). The stepping motor 91 rotates the LCD 90 in a normal and a reverse directions under the control of the microcomputer 20. The pinion gear 92 is coaxially held by a rotating shaft 91a of the stepping motor 91.

A rotating shaft 93a of the spur gear 93 is supported on the inner wall of the housing body Ha via a supporting member (not shown). The spur gear 93 is engaged with the pinion gear 92. Thus, as the pinion gear 92 is rotated by the stepping motor 91, the spur gear 93 rotates at a reduced speed accordingly. The LCD 90 is coaxially attached to the spur gear 93 to be in parallel with the front surface of the spur gear 93. With this configuration, the LCD 90 is coaxially rotated according to the rotation of the spur gear 93. The remaining configuration of the projector 4000 is similar to that of the projector 3000 in the third embodiment.

In the fourth embodiment, following the steps S290 through S310 (see FIG. 26), the aforementioned LCD rotation process is executed in S340. In the LCD rotation process, the LCD 90 is not rotated when the angle $\Theta_0$ is 0 degree (i.e., when the projector 4000 is arranged on the upper edge of the board 3010 (see FIG. 14). Meanwhile, when the angle $\Theta_0$ calculated in S310 is not 0 degree, the LCD 90 is rotated at the angle $\Theta_0$ so that the "B" is to be projected in an rotated orientation with respect to the upright state.

For example, when the projector is arranged in the position P3 on the lower edge, P4 on the left edge, or P2 on the right edge of the board 3010 (see FIG. 21), the angle $\Theta_0$ is 180 degrees, 90 degrees, or 270 degrees respectively in the clockwise direction. Thus, a process for rotating the LCD 90 clockwise at 180 degrees, 90 degrees, or 270 degrees is executed respectively.

When the angle $\Theta_0$ is 180 degrees, a driving signal representing the angle 180 degrees is output to the stepping motor 91 of the LCD rotation mechanism 90a. According to the driving signal, the LCD rotation mechanism 90a rotates the stepping motor 91, rotates the pinion gear 92 in the same direction, reversely rotates the spur gear 93 at a reduced speed, and thereby rotates the LCD 90 at 180 degrees.

When the angle $\Theta_0$ is 90 degrees, a driving signal representing the angle 90 degrees is output to the stepping motor 91. According to the driving signal, the LCD rotation mechanism 90a rotates the stepping motor 91, rotates the spur gear 93 at a reduced speed via the pinion gear 92, and thereby rotates the LCD 90 at 90 degrees.

Similarly, when the angle $\Theta_0$ is 270 degrees, the LCD 90 is rotated at 270 degrees.

Following S340, the image data output process is executed in S330, by which the video data stored in the video memory 31 is output by the video processing circuit 30 to the LCD driving circuit 60. Then, the LCD 90, which is driven by the LCD driving circuit 60 according to the video data, forms an image specified by the video data, and the beam supplied from the illuminating optical system 80 transmits therethrough. At this point, the image formed on the LCD 90 is in the vertically inverted state. The beam transmitted through the LCD 90 being rotated as above is projected onto the screen Sc via the opening H2 of the housing H.

In the present embodiment, irrespective of the position of the projector 4000 (one of the upper edge, lower edge, left edge, and the right edge) on the board 3010, the LCD 90 is in an orientation rotated by the angle $\Theta_0$, which is determined by the orientation of the projector 4000.

Therefore, irrespective of the position of the projector 4000 on the board 3010, the image of "B" specified by the video data inputted in S300 is still projected onto the screen Sc as an upright image without being vertically inverted or rotated when it is viewed from the lower edge of the board 3010. Thus, the video image can be effectively projected and easily viewed. In other words, the projector 4000 can be arranged in an arbitrary position with respect to the screen Sc, and the position of the projector 4000 is not limited to the positions P1-P4 shown in FIG. 21.

Fifth Embodiment

Figure 27:
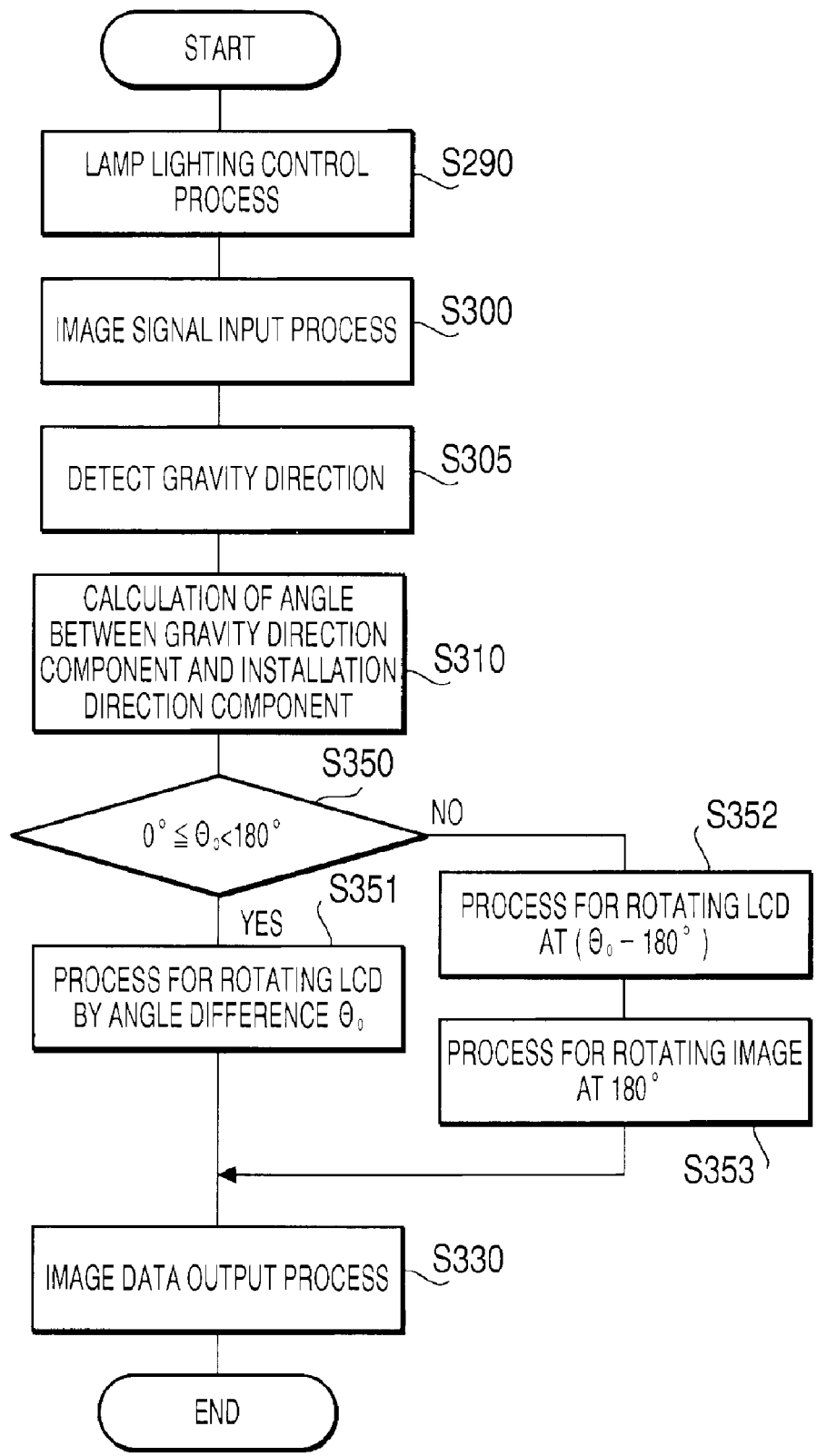
FIG. 27 is a flowchart showing an operation of the microcomputer of the projector according to a fifth embodiment of the present invention.

FIG. 27 is a flowchart showing an operation of the microcomputer 20 of the projector 5000 according to a fifth embodiment of the present invention. In the fifth embodiment, the operation shown in FIG. 26 in the fourth embodiment is replaced with the operations shown in FIG. 27.

In the fifth embodiment, following the steps S290 through S310, in S350, it is judged as to whether the angle $\Theta_0$ calculated in the step S310 is greater than or equal to 0 degree and smaller than 180 degrees.

If the angle $\Theta_0$ is greater than or equal to 0 degree and smaller than 180 degrees (S350:YES), in S351, a process for rotating the LCD 90 at the angle $\Theta_0$ as calculated in S310 is performed. Accordingly, the LCD rotation mechanism 90a rotates the stepping motor 91, reversely rotates the spur gear 93 at a reduced speed via the pinion gear 92, and thereby the LCD 90 is rotated clockwise at the angle $\Theta_0$.

Thereafter, in S330, the image data output process is executed. In the image data output process, the video data stored in the video memory 31 is output by the video processing circuit 30 to the LCD driving circuit 60. Then, the LCD 90, which is driven by the LCD driving circuit 60 according to the video data, forms an image specified by the video data, and the beam supplied from the illuminating optical system 80 transmits therethrough. At this point, the image formed on the LCD 90 is in the vertically inverted state on the LCD 90 being rotated as above and is projected onto the screen Sc via the opening H2 of the housing H.

In the present embodiment, the LCD 90 is in the orientation being rotated at the angle $\Theta_0$, which is determined by the position of the projector 5000 on the board 3010 and is in the range 0 degree$\leq \Theta_0 <$180 degrees.

Thus, the image "B" specified by the video data can still be projected on the screen Sc as an upright image without being vertically inverted image or rotated when it is viewed from the lower edge of the board 3010.

In S350, on the other hand, when the angle $\Theta_0$ is greater than or equal to 180 degrees (S350: NO), in S352, a process for rotating the LCD 90 at an angle of ($\Theta_0$–180) degrees is executed.

For example, when the angle $\Theta_0$ is 210 degrees, the angle for the LCD 90 to be rotated is 30 degrees (210 degrees–180 degrees=30 degrees). Accordingly, the LCD rotation mechanism 90a rotates the stepping motor 91, reversely rotates the spur gear 93 at a reduced speed via the pinion gear 92, and thereby the LCD 90 is rotated clockwise at 30 degrees.

Following S352, in S353, a process for rotating the video data at 180 degrees is executed. Specifically, similarly to the example described in the third embodiment, the $8^2$ pixels forming the aforementioned image "B" are successively read out by the video processing circuit 30 from the storage areas Y8X8, . . . , Y8X1, Y7X8, . . . , Y7X1, Y3X8, . . . , Y3X1, Y2X8, . . . , Y2X1, Y1X8, . . . , Y1X1 of the video memory 31 (see FIG. 22), as designated by the read addresses AR88, . . . , AR81, AR78, . . . , AR71, . . . , AR18, . . . , AR11 successively generated as described above, and are formed as the rotation image data.

Subsequently, in S330, a rotation image data output process is executed, that is, the rotation image data formed in S353 as above is output by the video processing circuit 30 to the LCD driving circuit 60. Then, the LCD 90, which has been rotated at the angle ($\Theta_0$–180 degrees) as above and driven by the LCD driving circuit 60 according to the rotation image data, forms an image specified by the rotation image data as a vertically inverted image, and the beam supplied from the illuminating optical system 80 transmits therethrough. The beam is thus projected onto the screen Sc via the opening H2 of the housing H, by which the image specified by the rotation image data is projected on the screen Sc In the present embodiment, even when the projector 5000 is arranged on the board 3010 to form an angle $\Theta_0$ which is greater than or equal to 180 degrees, the image of "B" specified by the video data can still be projected on the screen Sc as an upright image without being vertically inverted or rotated when it is viewed from the lower edge of the board 3010, since the LCD 90 has been rotated at the angle ($\Theta_0$–180) degrees and the image has been rotated at 180 degrees.

Sixth Embodiment

Figure 28:
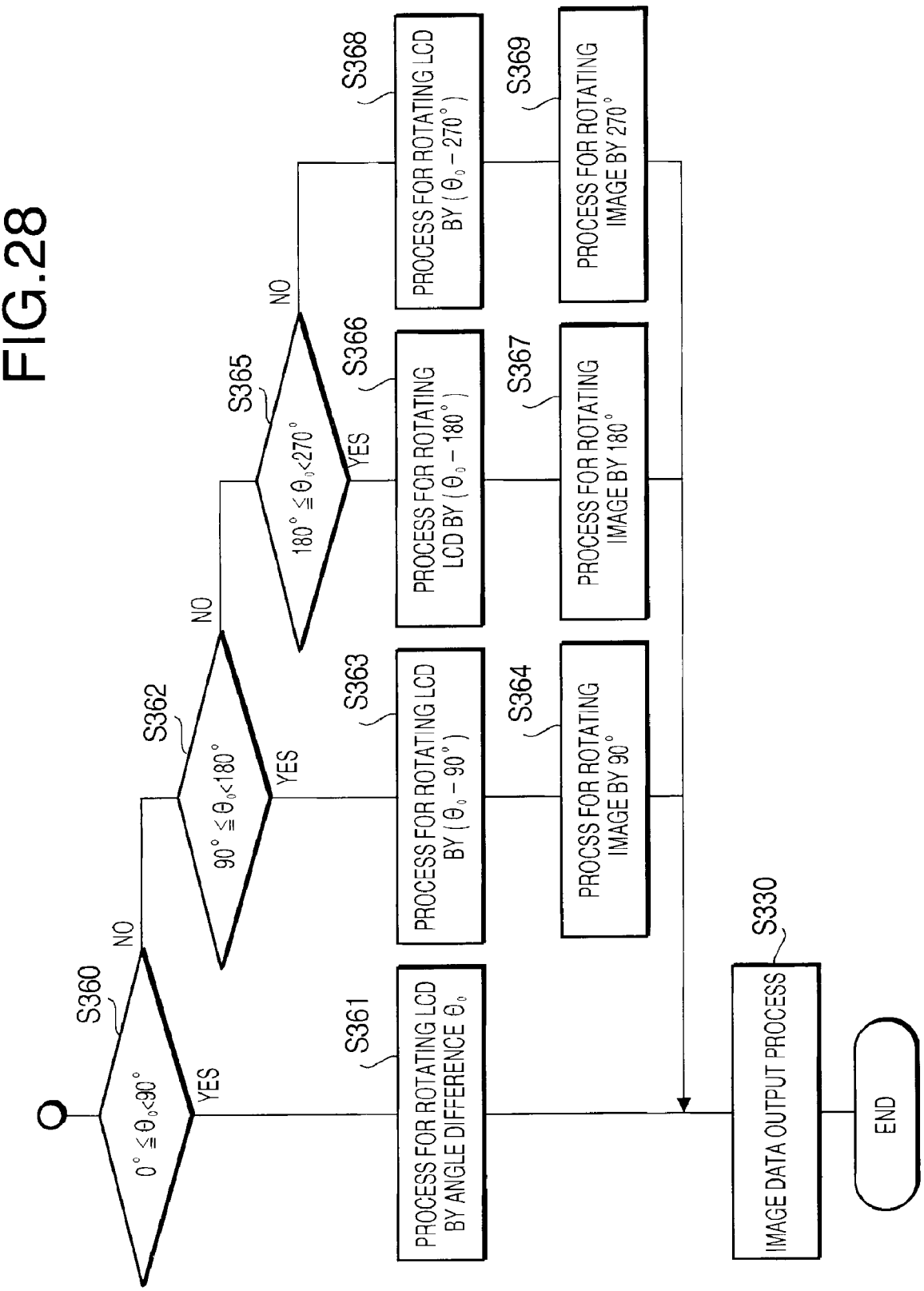
FIG. 28 is a flowchart showing an operation of the microcomputer of the projector according to a sixth embodiment of the present invention.

FIG. 28 is a flowchart showing an operation of the microcomputer 20 of the projector 6000 according to a sixth embodiment of the present invention. In the sixth embodiment, the operation shown in FIG. 27 in the fifth embodiment is replaced with the operations shown in FIG. 28.

In the sixth embodiment, following the steps S290 through S310, in S360, it is judged as to whether the angle $\Theta_0$ is greater than or equal to 0 degree and smaller than 90 degrees.

If the angle $\Theta_0$ is greater than or equal to 0 degree and smaller than 90 degrees (S360: YES), in S361, a process for rotating the LCD 90 at the angle $\Theta_0$ as calculated in S310 is executed. Accordingly, the LCD rotation mechanism 90a rotates the stepping motor 91, reversely rotates the spur gear 93 at a reduced speed via the pinion gear 92, and thereby the LCD 90 is rotated clockwise at the angle $\Theta_0$.

Thereafter, in S330, the image data output process is executed. In the image data output process, the image data stored in the image memory 31 is output by the video processing circuit 30 to the LCD driving circuit 60. Then, the LCD 90, which is driven by the LCD driving circuit 60 according to the video data, forms an image specified by the video data, and the beam supplied from the illuminating optical system 80 transmits therethrough. At this point, the image formed on the LCD 90 is in the vertically inverted state on the LCD 90 being rotated as above and is projected onto the screen Sc.

In the present embodiment, the LCD 90 is in the state rotated at the angle $\Theta_0$, which is determined by the position of the projector 6000 on the board 3010 and is in the range 0 degree$\leq \Theta_0 <$90 degrees. Therefore, the image of "B" specified by the video data can still be projected on the screen Sc as an upright image without being vertically inverted or rotated when it is viewed from the lower edge of the board 3010.

In S360, on the other hand, when the angle $\Theta_0$ is greater than or equal to 90 degrees (S360: NO), in S362, it is judged as to whether the angle $\Theta_0$ is greater than or equal to 90 degrees and smaller than 180 degrees. When the angle $\Theta_0$ is greater than or equal to 90 degrees and smaller than 180 degrees (S362: YES), in S363, a process for rotating the LCD 90 at an angle of ($\Theta_0$–90) degrees is executed. Accordingly, the LCD rotation mechanism 90a rotates the stepping motor 91, reversely rotates the spur gear 93 at a reduced speed via the pinion gear 92, and thereby the LCD 90 is rotated clockwise at the angle ($\Theta_0$–90) degrees.

Thereafter, in S364, a process for rotating the image at 90 degrees is executed. Specifically, similarly to the example described in the third embodiment, the $8^2$ pixels forming the image of "B" are successively read out by the video processing circuit 30 from the storage areas Y8X1, ..., Y1X1, Y8X2, ..., Y1X2, ..., Y8X8, ..., Y1X8 of the video memory 31 as designated by the read addresses AR81, ..., AR11, AR82, ..., AR11, ..., AR88, ..., AR18 successively generated as described above, and are formed as the rotation image data.

In S362, on the other hand, when the angle $\Theta_0$ is greater than or equal to 180 degrees (S362: NO), in S365, it is judged as to whether the angle $\Theta_0$ is greater than or equal to 180 degrees and smaller than 270 degrees. When the angle $\Theta_0$ is greater than or equal to 180 degrees and smaller than 270 degrees (S365: YES), in S366, a process for rotating the LCD 90 at an angle of ($\Theta_0$–180) degrees is executed. Accordingly, the LCD rotation mechanism 90a rotates the stepping motor 91, reversely rotates the spur gear 93 at a reduced speed via the pinion gear 92, and thereby the LCD 90 is rotated at the angle ($\Theta_0$–180) degrees.

Thereafter, in S367, a process for rotating the image at 180 degrees is executed. Specifically, similarly to the example described in the fifth embodiment, the $8^2$ pixels forming the image of "B" are successively read out by the video processing circuit 30 from the storage areas Y8X8, ..., Y8X1, Y7X8, ..., Y7X1, Y3X8, ..., Y3X1, Y2X8, ..., Y2X1, Y1X8, ..., Y1X1 of the video memory 31 as designated by the successively generated read addresses AR88, ..., AR81, AR78, ..., AR71, ..., AR18, ..., AR11, and are formed as the rotation image data.

In S365, on the other hand, when the angle $\Theta_0$ is greater than or equal to 270 degrees (S365: NO), in S368, a process for rotating the LCD 90 at an angle of ($\Theta_0$–270) degrees is executed. Accordingly, the LCD rotation mechanism 90a rotates the stepping motor 91, reversely rotates the spur gear 93 at a reduced speed via the pinion gear 92, and thereby the LCD 90 is rotated clockwise at the angle ($\Theta_0$270) degrees.

Following S368, in S369, a process for rotating the image clockwise at 270 degrees is executed. Specifically, similarly to the example described in the third embodiment, the $8^2$ pixels forming the image of "B" are successively read out by the video processing circuit 30 from the storage areas Y1X8, ..., Y8X8, Y1X7, ..., Y8X7, ..., Y1X1, ..., Y8X1 of the video memory 31 as designated by the successively generated read addresses AR18, ..., AR88, AR17, ..., AR87, ..., AR1, ..., AR81, and are formed as the rotation image data.

When the image rotation process is executed in any one of S364, S367, and S369, a rotation image data output process is executed in S330, by which the rotation image data formed in one of S364, S367, and S369 is output by the video processing circuit 30 to the LCD driving circuit 60.

Then, the LCD 90, which is driven by the LCD driving circuit 60 according to the rotation image data formed in one of S364, S367, and S369, forms an image specified by the rotation image data as a vertically inverted image, and the beam supplied by the illuminating optical system 80 is projected onto the screen Sc.

As described above, in the sixth embodiment, the angle $\Theta_0$ is classified into four ranges ($\Theta_0$<90 degrees, 90 degrees$\leq\Theta_0$<180 degrees, 180 degrees$\leq\Theta_0$<270 degrees, 270 degrees$\leq\Theta_0$), unlike the classifying method in the fifth embodiment, wherein the angle $\Theta_0$ is classified based on the criteria of 180 degrees (see S350 in FIG. 27). Based on the classification, only the LCD 90 is rotated at the angle $\Theta_0$ with the non-rotated image when $\Theta_0$ is smaller than 90 degrees, and the LCD 90 is rotated at the angle ($\Theta_0$–90) degrees with the image formed on the LCD 90 rotated at 90 degrees when the angle $\Theta_0$ is greater than or equal to 90 degrees and smaller than 180 degrees. Further, the LCD 90 is rotated at the angle ($\Theta_0$–180) degrees with the image formed on the LCD 90 rotated at 180 degrees when the angle $\Theta_0$ is greater than or equal to 180 degrees and smaller than 270 degrees. Furthermore, the LCD 90 is rotated at the angle ($\Theta_0$–270) degrees with the image formed on the LCD 90 rotated at 270 degrees when the angle $\Theta_0$ is greater than or equal to 270 degrees.

In the projector 6000 according to the sixth embodiment configured as above, the angle of the LCD 90 to be rotated is limited to at most 90 degrees, thus the rotation angle of the LCD 90 can be reduce compared to that of the LCD 90 in the fifth embodiment, which is at most 180 degrees.

Figure 29:
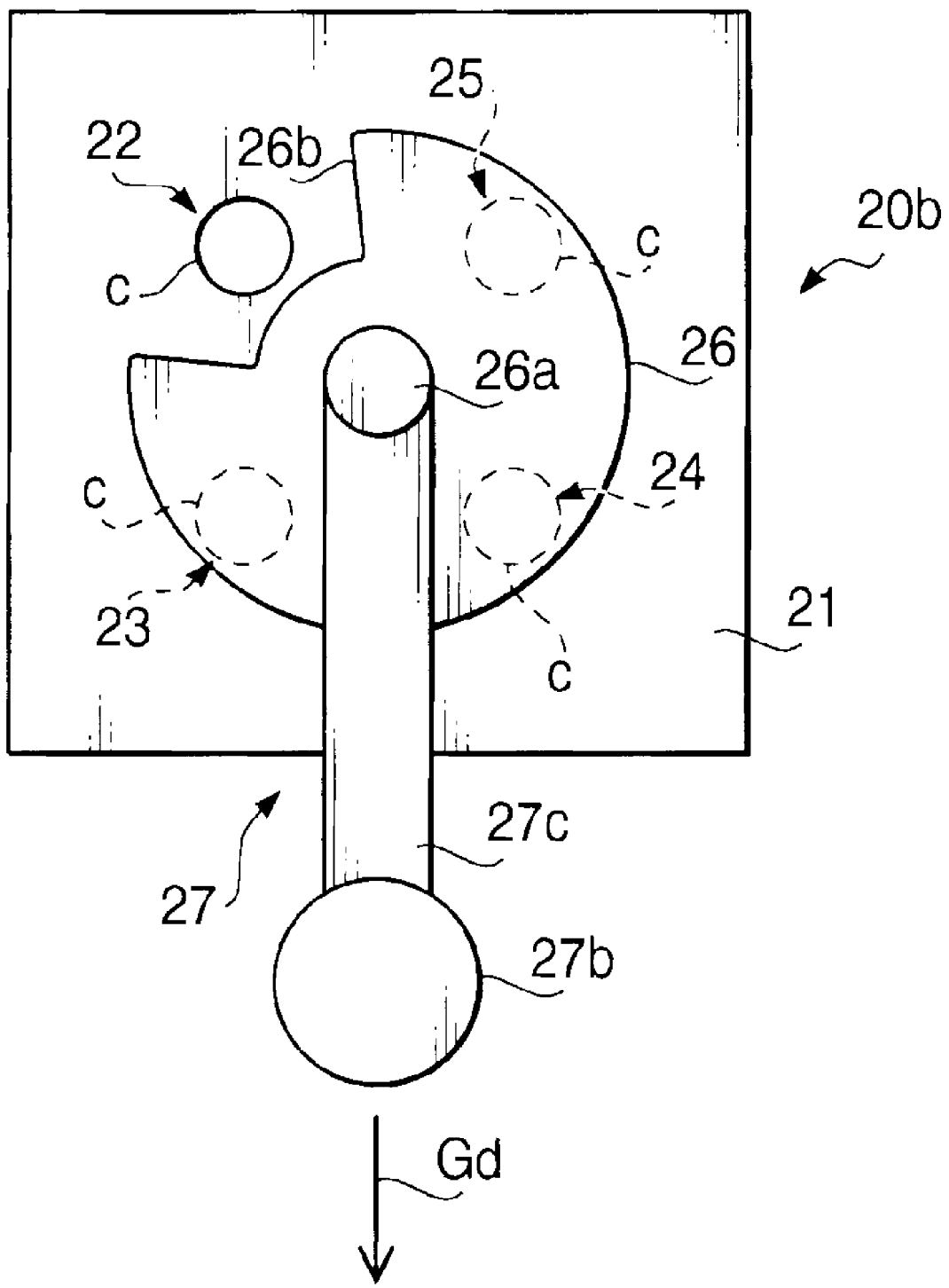
FIG. 29 is a schematic diagram illustrating a gravity sensor according to the embodiments of the present invention.

It is noted that the present invention can be modified in various ways without restricting it to the above embodiments. For example, the gravity sensor 20b can be a simplified gravity sensor like the one shown in FIGS. 29 and 30. FIG. 29 is a schematic diagram illustrating the gravity sensor according to an embodiment of the present invention. The gravity sensor 20b, installed in the housing body Ha, is supported by a substrate 21, which is in parallel with the operation panel P (see also FIG. 15). When the projector 6000 is in the position P2 on the board 3010, the substrate 21 stays in the orientation as shown in FIG. 29.

Figure 30:
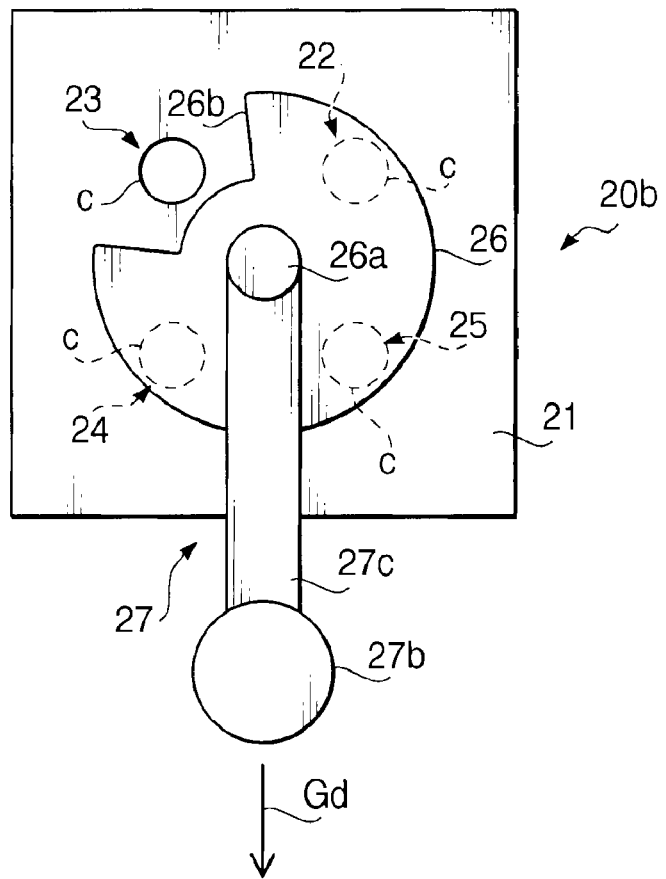
FIG. 30 is a schematic diagram illustrating the gravity sensor of FIG. 29 in a state in which the projector is arranged in a position P2 according to the embodiments of the present invention.

It is noted that the gravity sensor 20b is equipped with four photo couplers 22-25. The four photo couplers 22-25 are placed on the surface of the substrate 21, with their light emitting elements "c" situated at four points which substantially forms a square as shown in FIGS. 29 and 30. Specifically, the light emitting elements "c" of the photo couplers 22 and 25 are placed side by side (on a left-hand side and a right-hand side) in FIG. 29, respectively. The light emitting elements "c" of the photo couplers 23 and 24 are placed side by side, at positions under the light emitting elements "c" of the photo couplers 22 and 25, respectively.

Photoreceptor elements (not shown) of the photo couplers 22-25 are placed on the surface of an opposing board (not shown), which is held to face the substrate 21 to be in parallel therewith, so as to face the light emitting elements "c" of the photo couplers 22-25, respectively. With this configuration, the photoreceptor element of each photo coupler 22-25 receives light emitted by the corresponding light emitting element "c".

The gravity sensor 20b further includes a cam 26 and a weight 27. The cam 26 is supported on the substrate 21 by its rotating shaft 26a, to be rotatable together with the rotating shaft 26a and to be situated between the light emitting elements "c" and the photoreceptor elements of the photo couplers 22-25. The cam 26 has a fan-shaped cutout portion 26b. The cutout portion 26b is formed as a part of the cam 26 spanning at an angle of 90 degrees is removed.

The weight 27 is held by the rotating shaft 26a at its proximal end of an extended portion 27a, to rotate together with the cam 26. The weight 27 further includes a weight portion 27b, which is fixed to a distal end of the extended portion 27a.

With the above configuration, when the projector 6000 is arranged on the board 3010 at the position P1, the weight 27 is situated under the rotating shaft 26a as shown in FIG. 29. In this state, the gravity direction is in the direction indicated by the arrow Gd, and the photoreceptor element of the photo coupler 22 receives the light emitted by the light emitting element "c" through the cutout portion 26b of the cam 26, whereas the light from the other light emitting elements "c" is blocked by the cam 26, thus the gravity sensor 20b detects the gravity direction Gd based on the photoreception by the photoreceptor element of the photo coupler 22.

FIG. 30 is a schematic diagram illustrating the gravity sensor 20b of FIG. 29 in a state in which the projector 6000 is arranged in the position P2 in FIG. 21 according to the embodiment of the present invention. In this position, the photoreceptor element of the photo coupler 23 receives the light emitted by the light emitting element "c" through the cutout portion 26b of the cam 26, whereas the light from the other light emitting elements "c" is blocked by the cam 26, thus the gravity sensor 20b detects the gravity direction Gd based on the photoreception by the photoreceptor element of the photo coupler 23.

For another example of modification. the gravity sensor 20a may be replaced with a tilt sensor (not shown) employing an acceleration sensor. In this configuration, a tilt angle detected by the tilt sensor, instead of the gravity direction detected by the gravity sensor 20a, can be used for the calculation of the angle $\Theta_0$.

Further, for example, in the LCD rotation mechanism 90a, the stepping motor 91 may be replaced with a motor of a different type (DC motor, AC motor, etc.). In such a configuration, the rotation of the LCD 90 is controlled as the rotation angle of the motor with a rotary encoder, for example, is detected, and the detected rotation angle is fed back to the microcomputer 20.

Furthermore, for example, the LCD 90 may be replaced with a display element of a different type such as DMD, LCOS, etc.

Still furthermore, it is noted that the gravity direction is detected with the gravity sensor 20a also when the projector 6000 is arranged on a horizontal plane such as a tabletop to project the video images onto a horizontal surface on the table. Therefore, in such cases, the projector 6000 may be configured to control the means for rotating the image so that the image can be prevented from being rotated.

With the projectors configured as above, the gravity direction is detected by the gravity sensor 20a, and the projecting detection is obtained through S310 based on the detected gravity direction Gd. The orientation of the video image to be projected with respect to the projection surface of the screen Sc via the control unit U, the imaging optical system E, the lamp 70, the illuminating optical system 80, and the LCD 90 can be controlled by the microcomputer 20, the video processing circuit 30, the video memory 31, and S320. The image thus projected on the projection surface can be controlled to be in a desirable orientation regardless of the position of the projector with respect to the projection surface.

In the above described projectors 3000 through 6000, the projection surface may be defined by a plane which is substantially perpendicular to the horizontal plane, and the housing H may be arranged on a plane which substantially coincides with the projection surface. However, the projection surface may not necessarily be perpendicular to the horizontal plane, but may be a plane which is inclined to intersect with the horizontal plane, as long as the projection direction can be detected by the gravity sensor 20a.

In the projectors configured as above, the orientation of the image to be projected on the projection surface of the screen Sc can be controlled by the microcomputer 20, the video processing circuit 30, the video memory 31, and S320 according to the direction component of the detected projecting direction Pd on the projecting surface. Additionally, the orientation of the image to be projected can be controlled in a predetermined direction.

Thus, the orientation of the image projected on the projection surface of the screen Sc can be controlled regardless of the arrangement of the projectors with respect to the projection surface so that the image can be effectively projected to the viewers.

In the above projectors, the LCD 90 modulates a beam of light according to the video signal and thereby the image to be optically projected onto the projection surface is output. The video data, generated according to the video signal, is processed through the microcomputer 20, the video processing circuit 30, the video memory 31, and the steps S320, S353, S364, S367, and S369 so that the rotation video signal representing the image being rotated according to the direction component of the projection direction Pd on the projection surface can be generated, and the generated rotation video signal can be supplied to the LCD 90. Thus, the beam transmitted through the LCD 90 is modulated according to the rotated image formed based on the rotation image data.

As the beam is transmitted through the LCD 90, the rotated image formed on the LCD 90 is output to be projected on the projection surface in the controlled orientation. Therefore, regardless of the arrangement of the projectors with respect to the projection surface, the image formed on the projection surface can be controlled in an effective orientation to be viewed.

In the above projectors, the image projected on the projection surface of the screen Sc can be rotated by the LCD rotation mechanism 90a, which controls the rotation of the LCD 90 so that the direction of the beam transmitting therethrough can be controlled. Also with this configuration, the image formed on the projection surface can be controlled in an effective orientation to be viewed regardless of the arrangement of the projectors with respect to the projection surface.

Further, the image formed on the projection surface can be controlled in an effective orientation to be viewed when the rotation video signal is generated, and simultaneously the rotation of the LCD 90 is controlled according to the direction component of the detected projection direction Pd on the projection surface of screen Sc.

Seventh Embodiment

Figure 31:
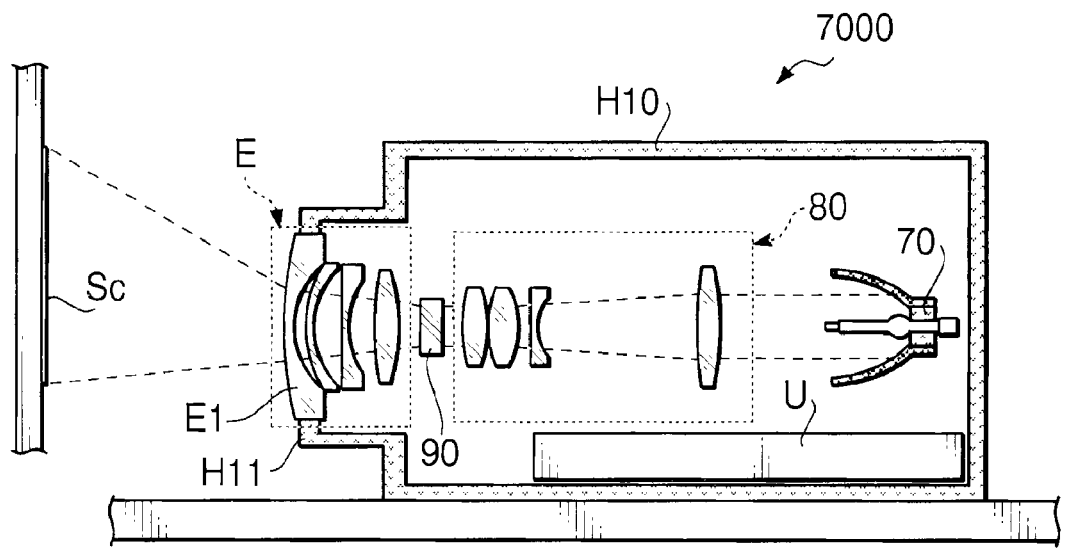
FIG. 31 is a schematic cross-sectional view showing a projector according to a seventh embodiment of the present invention.
Figure 32:
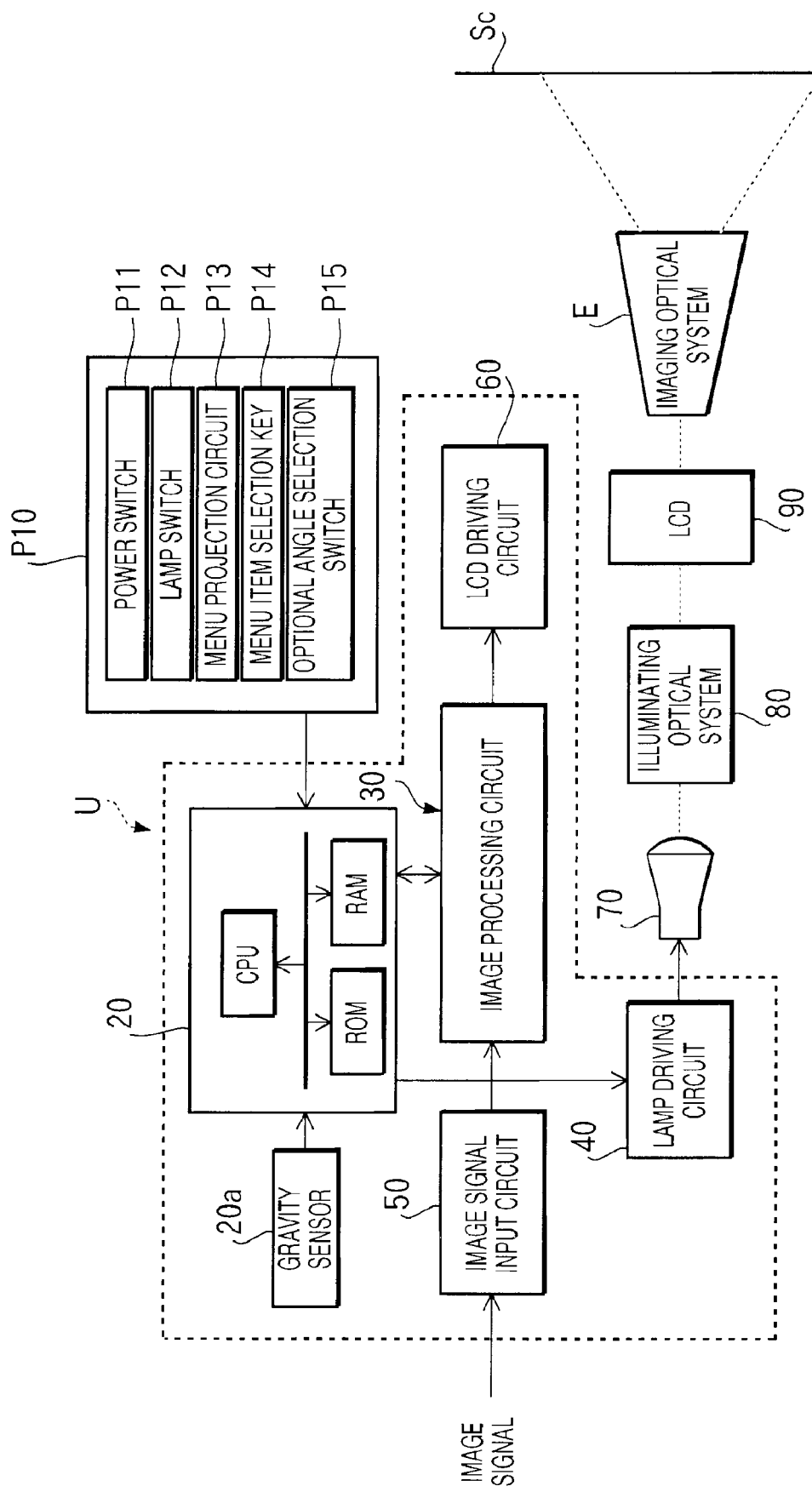
FIG. 32 is a block diagram showing a configuration of a circuit of the projector according to the seventh embodiment of the present invention.

FIG. 31 is a schematic cross-sectional view showing a projector 7000 according to a seventh embodiment of the present invention. FIG. 32 is a block diagram showing a configuration of a circuit of the projector 7000 according to the seventh embodiment of the present invention. In the present embodiment, the projector 7000 is used on a tabletop 7010. The projector 7000 has a housing H10 and an operation panel P10, which is formed on an exterior of the housing H10. The tabletop 7010 is in parallel with a horizontal plane.

As shown in FIG. 32, the operation panel P10 includes a power switch P11, a lamp switch P12, a menu projection switch P13, an optional angle selection switch P15, which are normally open, and a menu item selection key P14.

The power switch P11 closes when it is operated for feeding electric power to the projector 7000. The lamp switch P12 closes when it is operated by the operator M for feeding electric power to the lamp 70.

The menu projection switch P13 closes when it is operated by the operator M for projecting a menu onto the screen Sc. The menu item selection key P14 is operated by the operator M for selecting one of items in the menu projected on the screen Sc, such as "OPTIONAL ANGLE SELECT MODE" and "SPECIFIC ANGLE SELECT MODE", which will be described later. The menu item selection key P14 is also operated by the operator M for selecting one of predetermined angles of projection of the projector 7000 shown in a menu projected on the screen Sc. The specific angles have previously been stored in a ROM of a microcomputer 20 to be readable by the microcomputer 20.

The optional angle selection switch P15 closes when it is operated by the operator M for selecting a desired projection angle of the projector 7000. In the present embodiment, the "projection angle" refers to an angle between an optical axis (which will be described later) and the tabletop.

The projector further includes a control unit U which is installed in the housing H10 as shown in FIG. 31. The control unit U includes a microcomputer 20, a gravity sensor 20a, a video processing circuit 30, a lamp driving circuit 40, a video signal input circuit 50, and an LCD driving circuit 60.

Figure 33:
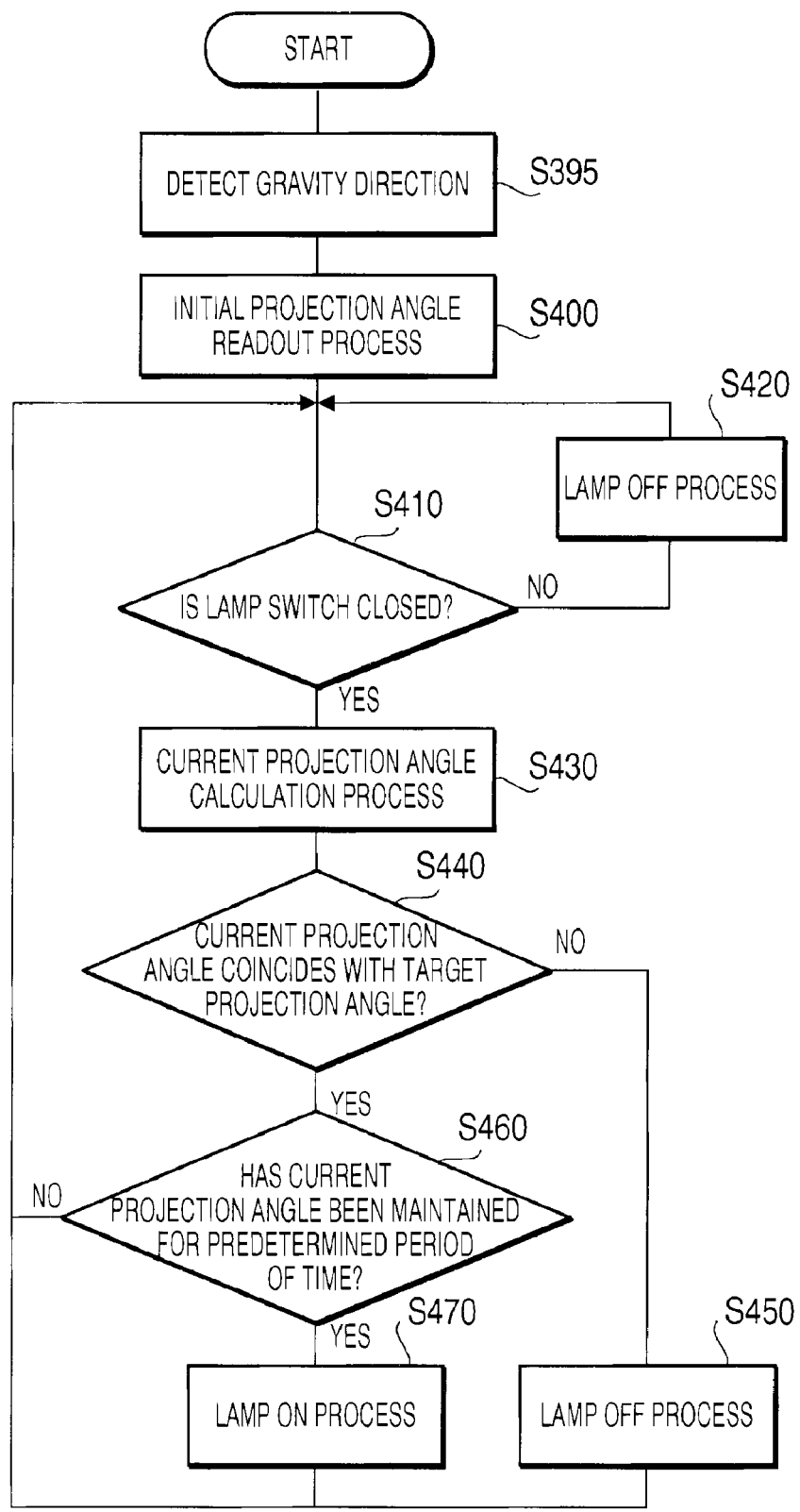
FIG. 33 is a flowchart showing a main control program of the projector according to the seventh embodiment of the present invention.

The microcomputer 20 includes a CPU, a ROM and a RAM. The CPU of the microcomputer 20 executes a main control program according to a flow shown in FIG. 33. FIG. 33 is a flowchart showing the main control program of the projector 7000 according to the seventh embodiment of the present invention. In the main control program, the microcomputer 20 controls the video processing circuit 30 and the lamp driving circuit 40 based on the operation output of the operation panel P10 and the gravity direction detected by the gravity sensor 20a.

Figure 34:
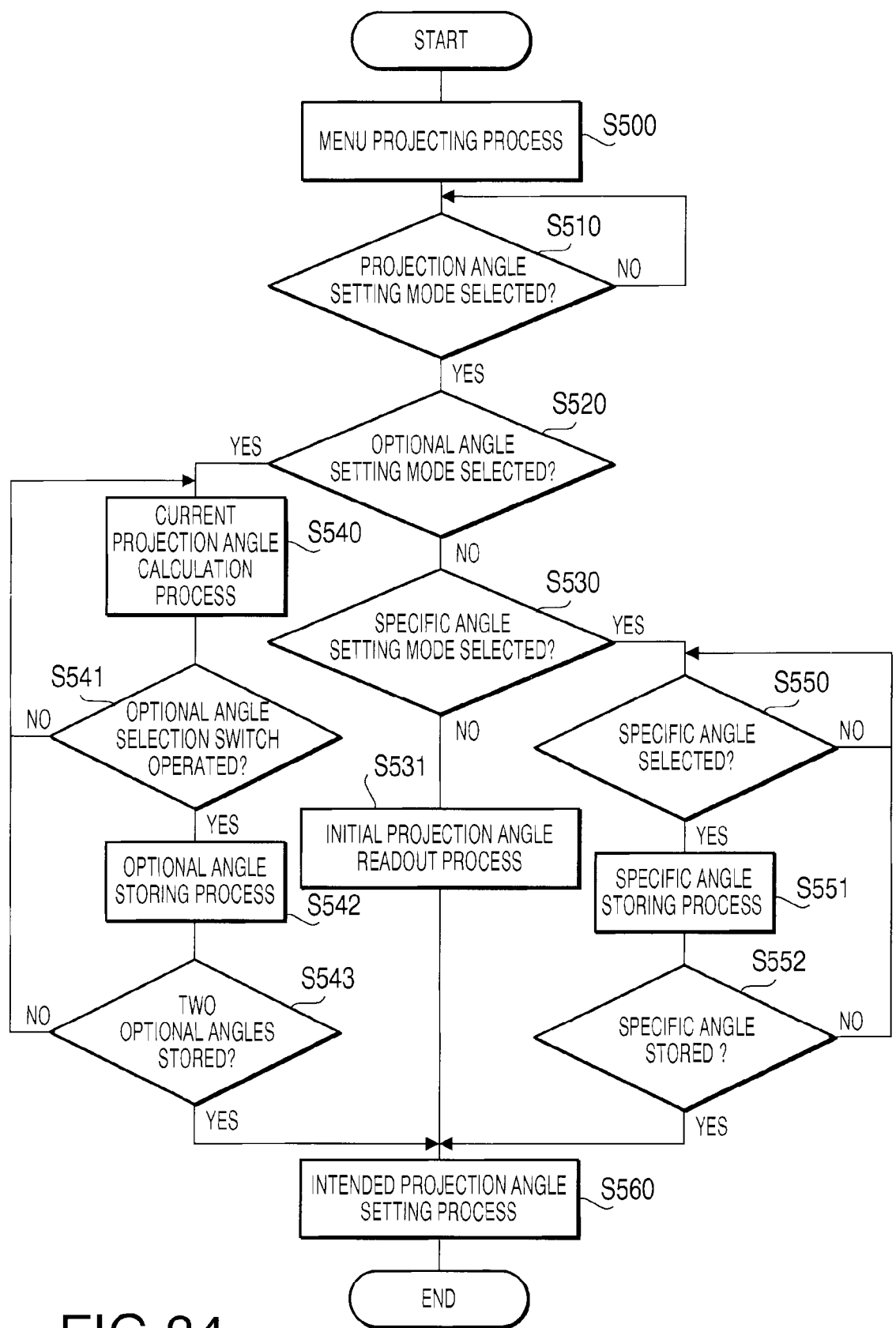
FIG. 34 is a flowchart showing an interrupting control program of the projector according to the seventh embodiment of the present invention.

The microcomputer 20 also executes an interrupting control program according to a flowchart shown in FIG. 34. FIG. 34 is a flowchart showing the interrupting control program of the projector 7000 according to the seventh embodiment of the present invention. In the interrupting control program, the microcomputer 20 sets an intended projection angle. The intended projection angle is an angle of the projection direction of the projector 7000 which can be determined based on the operation output of the operation panel P0 and the gravity direction detected by the gravity sensor 20a.

In the seventh embodiment, as the power switch P11 is closed, the microcomputer 20 is supplied with electric power, enters its operating state, and starts executing the main control program. When the menu projection switch P13 is closed, the microcomputer 20 stops the main control program and starts the interrupting control program. The main control program and the interrupting control program have previously been stored in the ROM of the microcomputer 20 to be readable by the microcomputer 20.

As show in FIG. 31, in the present embodiment, the lamp 70, the illuminating optical system 80, the LCD 90 and the imaging optical system E inside the housing H10 are arranged along the optical axis.

In the projector 7000 configured as above, when the power switch P11 is operated, the microcomputer 20 starts the main control program according to the flowchart shown in FIG. 33. The lamp 70 is OFF at this stage.

As the main control program starts, in S395, a direction of gravity is detected by the gravity sensor 20a. Next, in S400, an initial projection angle readout process is executed. In this process, a predetermined projection angle (e.g. 30 degrees) is read out from the ROM of the microcomputer 20 as an initial projection angle. The initial projection angle has previously been stored in the ROM of the microcomputer 20 to be readable by the microcomputer 20.

Next, in S410, it is judged as to whether the lamp switch P12 is closed. When the lamp switch P12 is open (S410: NO), in S420, a lamp off process is executed, by which the OFF state of the lamp 70 is maintained.

In S410, when the lamp switch P12 is operated to be closed (S410: YES), in S430, a current projection angle calculation process is executed. In the seventh embodiment, the gravity direction as detected in S395 and the tabletop (i.e., the horizontal plane) are perpendicular to each other, therefore, an angle between a normal line in the gravity direction to the optical axis and the direction of the gravity is equal to the angle between the optical axis and the tabletop (which is referred to as a current projection angle) at all time. Based on the angular relation, in the calculation process, the current projection angle is obtained according to the detected gravity direction.

In the present embodiment, the projector 7000 is arranged in the orientation (inclination) wherein the optical axis is in parallel with the tabletop at this stage, therefore, the current projection angle is determined to be 0 degree in S430.

Next, in S440, it is judged as to whether the current projection angle obtained in S430 coincides with the intended projection angle. At this stage, the intended projection angle is the initial projection angle (i.e., 30 degrees) which has been read out in S400. In the present embodiment, the current projection angle (i.e., 0 degree) obtained in S430 does not coincide with the intended projection angle (S440: NO).

Next, in S450, a lamp off process is executed so that the OFF state of the lamp 70 is maintained. With this step, no light is emitted and projected by the projector 7000 so that the light from the projector 7000, which may be harmful, can be prevented from erroneously entering the eyes of the viewers around the projector 7000.

While the OFF state of the lamp 70 is maintained, if the menu projection switch P13 is operated by the operator M, the microcomputer 20 stops the main control program and starts the interrupting control program according to the flowchart shown in FIG. 34.

In the interrupting control program, in S500, a menu projecting process is executed. Specifically, the menu projecting process includes a process for turning the lamp 70 ON and a menu data readout process, irrespective of the attitude and stability conditions of the projector 7000. In the process for turning the lamp 70 ON, the lamp driving circuit 40 is controlled by the microcomputer 20 and thereby drives the lamp 70. Accordingly, the lamp 70 is turned ON and emits the illuminating light toward the LCD 90 via the illuminating optical system 80.

Subsequently, in the menu data readout process, menu data is read out from the ROM of the microcomputer 20. In the seventh embodiment, the menu data has previously been stored in the ROM of the microcomputer 20 as data representing a menu including a plurality of menu items (e.g. "OPTIONAL ANGLE SELECT MODE" and "SPECIFIC ANGLE SELECT MODE").

The menu data read out as above is output by the microcomputer 20 to the video processing circuit 30. The video processing circuit 30 processes the menu data from the microcomputer 20 and outputs the processed menu data to the LCD driving circuit 60 as a video processing signal.

Accordingly, the LCD 90 is driven by the LCD driving circuit 60 based on the video processing signal to form the image represented by the menu data, and the beam supplied from the illuminating optical system 80 transmits therethrough. As the beam exits the LCD 90, the image of the menu formed on the LCD 90 is projected through the opening H11 of the housing H10 by use of the projection lens E1 on the screen Sc.

Subsequently, in S510, it is judged as to whether a projection angle setting mode has been selected. When the projection angle setting mode (displayed in the menu projected on the screen Sc) has not been selected (S510: NO), the process returns and S510 is repeated.

When the menu item selection key P14 is operated by the operator M, and the projection angle setting mode in the projected menu is selected (S510: YES), in S520, it is judged as to whether the optional angle select mode is selected.

When the optional angle select mode in the projected menu is not selected (S520: NO), in S530, it is judged as to whether the specific angle select mode is selected. When the specific angle select mode in the projected menu is not selected (S530: NO), the process proceeds to S531.

In 531, an initial projection angle readout process is executed. In this process, the aforementioned initial projection angle, which is 30 degrees, is read out from the ROM of the microcomputer 20.

Next, in S560, an intended projection angle setting process is executed. In this setting process, the initial projection angle (30 degrees) which has been read out in S531 is set to be the intended projection angle.

Figure 35:
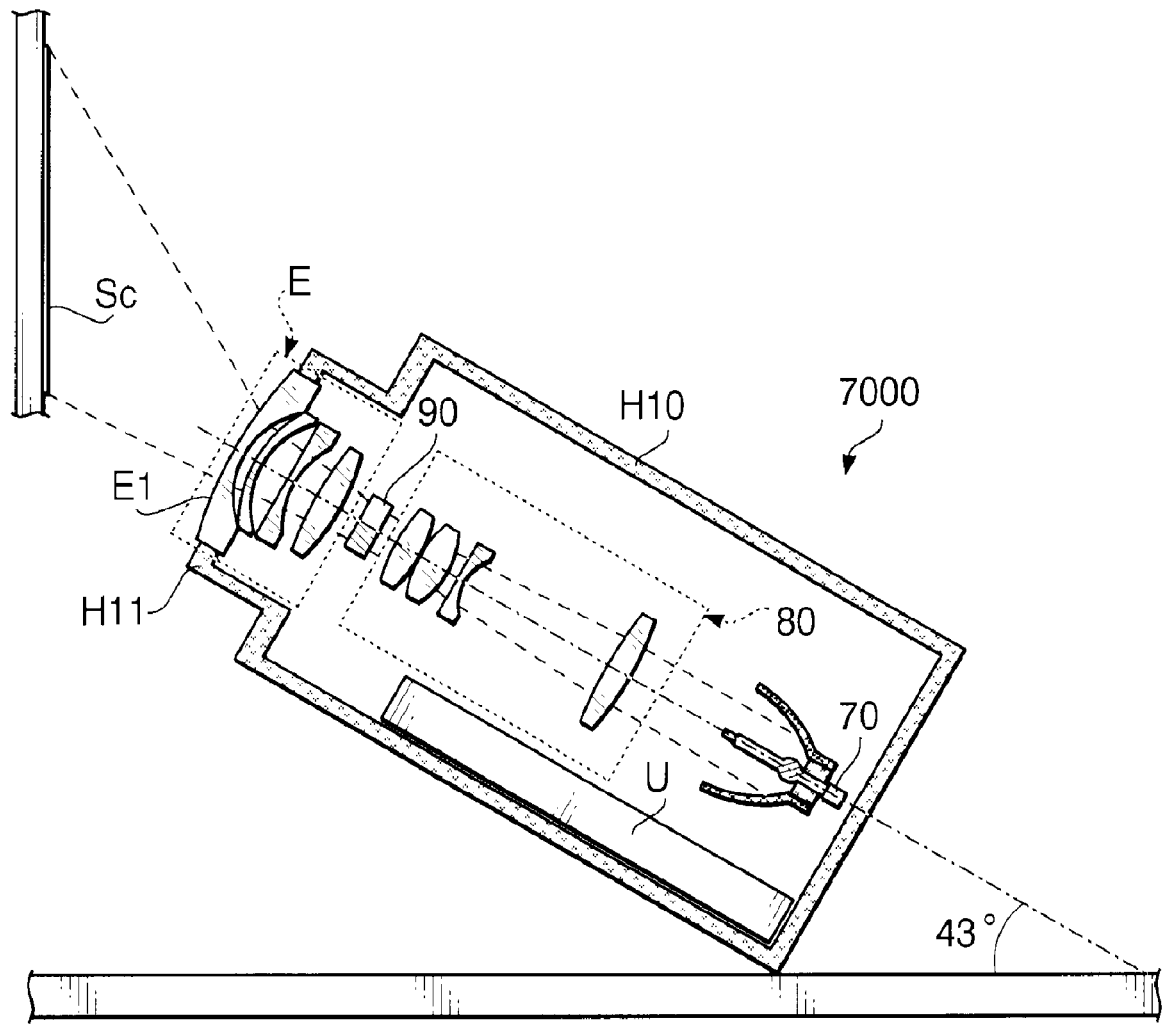
FIG. 35 is a schematic cross-sectional view showing the projector being in a tilted position at 43 degrees with respect to the tabletop according to the seventh embodiment of the present invention.

Meanwhile, in S520, when the optional angle select mode in the projected menu is selected by the operator M through the menu item selection key P14 (S520: YES), the process proceeds to S540. It is noted that, by this step in the present embodiment, the projector 7000 has been tilted at an angle of 43 degrees with respect to the tabletop (see FIG. 35) to suit the preferences of the viewers. FIG. 35 is a schematic cross-sectional view showing the projector 7000 being in a tilted position at 43 degrees with respect to the tabletop according to the seventh embodiment of the present invention.

With this orientation of the projector 7000, in S540, a current projection angle calculation process is executed. In this process, the current projection angle at this stage (i.e., 43 degrees) is calculated similarly to the calculation process of the step S430 (see FIG. 33).

Next, in S541, it is judged as to whether the optional angle selection switch P15 is operated. When the optional angle selection switch P15 is operated (S541: YES), in S542, an optional angle storing process is executed. In this process, the current projection angle (43 degrees) obtained in S540 is stored in the RAM of the microcomputer 20 as the optional angle.

Next, in S543, it is judged as to whether two optional angles have been stored in the RAM of the microcomputer 20. At this stage, only one optional angle (43 degrees) has been stored in the RAM of the microcomputer 20 (S543: NO), The process returns to S540.

When the inclination of the projector 7000 is again changed to be at an angle of 47 degrees according to preferences of the viewers, and the optional angle selection switch P15 is operated (S541: YES), in S542, the latest current projection angle (i.e., 47 degrees) obtained in S540 is stored in the RAM of the microcomputer 20 as a second optional angle.

Next, in S543, it is determined that two optional angles have been stored in the RAM of the microcomputer 20 (S543: YES). In S560, the intended projection angle setting process is executed. In this process, the two optional angles (43 degrees, 47 degrees) stored in the RAM in the step S542 are set to be the intended projection angles.

Meanwhile, in S530, when it is judged that the specific angle select mode is selected through the menu item selection key P14 (S530: YES), the process proceeds to S550. In S550, when one of the specific angles in the projected menu (for example, 45 degrees) is selected by the operator M through the menu item selection key P14 (S550: YES), in S551, a specific angle storing process is executed. In this process, the selected angle (45 degrees) selected in S550 is stored in the RAM of the microcomputer 20 to be the specific angle.

Subsequently, in S552, it is judged as to whether a specific angle has been stored. Since the specific angle (45 degrees) has already been stored in the RAM of the microcomputer 20 in S551, it is determined to be "YES" (S552: YES). Next, in S560, the intended projection angle setting process is executed. In this process, the specific angle (45 degrees) stored in the RAM in S551 is set to be the intended projection angle.

Thus, S560 is executed following one of S531, S543, and S552, and the interrupting control program is terminated.

It is noted that the interrupting control program being terminated following S531 and S560 corresponds to the point in time just after the lamp off process is S450 following the judgment (S440: NO) in S440.

Therefore, in S440, it is judged as to whether the current projection angle (0 degree) obtained in S430 coincides with the intended projection angle (i.e., 30 degrees as the initial projection angle obtained in S400) obtained in S560 following S531 (S440: NO). Accordingly, the lamp off process in S450 following S440 is maintained.

Meanwhile, if the interrupting control program is terminated following S543 and S560, the current projection angle at this stage is calculated based on the detection output of the gravity sensor 20*a* when the main control program is in S430 following S410.

Thereafter, in this case, in S440, it is judged as to whether the current projection angle obtained in S430 coincides with one of the intended projection angles (43 degrees, 47 degrees) which have been obtained in S560.

When the projector 7000 is tilted at one of 43 degrees and 47 degrees according to the preferences of the viewers (i.e., the current projection angle of the projector 7000 coincides with one of 43 degrees and 47 degrees) (S440: YES), in S460, it is judged as to whether the current projection angle (i.e., one of 43 degrees and 47 degrees) has been maintained for a predetermined period of time. In the seventh embodiment, the predetermined period of time is defined to a length of time for stabilization of the current projection angle of the projector 7000, which is for example a several seconds.

When the current projection angle of the projector 7000 is not maintained at one of the intended projection angles until the predetermined time period elapses (S460: NO), it is determined that the current projection angle is regarded to be unstable or transient, the process returns to S410, and the lamp on process in S470 is avoided. It is noted that even though the current projection angle of the projector 7000 is unstable, incidence of the light emitted from the lamp 70 upon eyes of the viewers is prevented since the lamp 70 is in the OFF state. Therefore, the eye health of the viewers is prevented from being damaged by light from the projector 7000.

In S460, on the other hand, when the current projection angle of the projector 7000 is maintained at one of the intended projection angles (43 degrees, 47 degrees) for the predetermined period of time (S460: YES), it is determined that the current projection angle is stable, and the lamp on process is executed in S470.

Accordingly, the lamp 70 is driven by the lamp driving circuit 40 and turned ON so as to output the light through the opening H11 of the housing H10 of the projector 7000.

In this flow, the projector 7000 is tilted at the preferable angle to the viewers who have securely moved to positions where they can avoid the light from the projector 7000. Therefore, the incidence of light from the projector upon the eyes of the viewers is prevented from occurring.

In the present embodiment, the two optional angles, which are relatively close to each other, are stored in S542 and set to be the intended projection angles in S560 to meet the preferences of the viewers. Thus, fine adjustment of the angle of the projector 7000 can be achieved.

Meanwhile, if the interrupting control program is terminated following S552 and S560, the current projection angle at this stage is calculated based on the detection output of the gravity sensor 20a when the main control program is in following S410.

Thereafter, in this case, in S440, it is judged as to whether the current projection angle obtained in S430 coincides with the intended projection angle (45 degrees) which has been obtained in S560.

When the current projection angle of the projector 7000 coincides with the intended projection angle (45 degrees) to suit the preferences of the viewers (S440: YES), in S460, it is judged as to whether the current projection angle has been maintained for the predetermined period of time.

When the current projection angle of the projector 7000 is not maintained at the intended projection angle until the predetermined time period elapses (S460: NO), it is determined that the current projection angle is regarded to be unstable or transient, and the lamp on process in S470 is avoided. It is noted that even though the current projection angle of the projector 7000 is unstable, incidence of the light emitted from the lamp 70 upon eyes of the viewers is prevented since the lamp 70 is in the OFF state. Therefore, the eye health of the viewers is prevented from being damaged by light from the projector 7000.

In S460, on the other hand, when the current projection angle of the projector 7000 is maintained at the intended projection angle (45 degrees) for the predetermined period of time (S460: YES), the current projection angle is stable, and the lamp on process is executed in S470.

Accordingly, the lamp 70 is driven by the lamp driving circuit 40 and turned ON so as to output the light through the opening H11 of the housing H10 of the projector 7000.

When the projector 7000 is moved, and its projection angle deviates from the intended projection angle (45 degrees), it is judged that the current projection angle does not coincides with the intended projection angle in S440 (S440: NO). In this case, the lamp off process is executed in S450, and the lamp OFF state is maintained until the current projection angle calculated in S430 coincides with the intended projection angle (45 degrees) again in S440.

After the projector 7000 is moved, when the current projection angle calculated in S430 coincides with the intended projection angle (45 degree) (S440: YES), the process proceeds to S460. When the current projection angle of the projector 7000 is maintained at the intended projection angle (45 degrees) for the predetermined period of time (S460: YES), the current projection angle is stable, and the lamp on process is executed in S470.

In the above configuration, as the above state of the projector 7000, in which the current projection angle coincides once again with the intended projection angle, for the predetermined period of time, the lamp 70 can be automatically turned ON once again without any additional operation of the operator M.

It is noted that the selection of the optional angle following S520 and the selection of the specific angle following S530 may also be made by a simpler operation instead of making the selection from a menu projected on the screen Sc. For example, the selection may be made by operating a mechanical instructing means such as a switch, slide lever, dial switch, button, etc.

In such cases, the projector 7000 may be equipped with an additional display (e.g. extra liquid crystal display). By operating such a mechanical instructing means while viewing information displayed on the additional display, the operator M can set the optional angle or the specific angle even when the lamp 70 is in the OFF state, which can be more convenience for the operator M. Especially in the process for setting the optional angle (S560 following S543), the operator M can set and maintain (store) the optional angle even more arbitrarily and easily if the projector is equipped with an "optional angle setting button". It is noted that the settings from the menu display described above can also be made in the state of normal projection, that is, the main control program is being executed.

Eighth Embodiment

Figure 36:
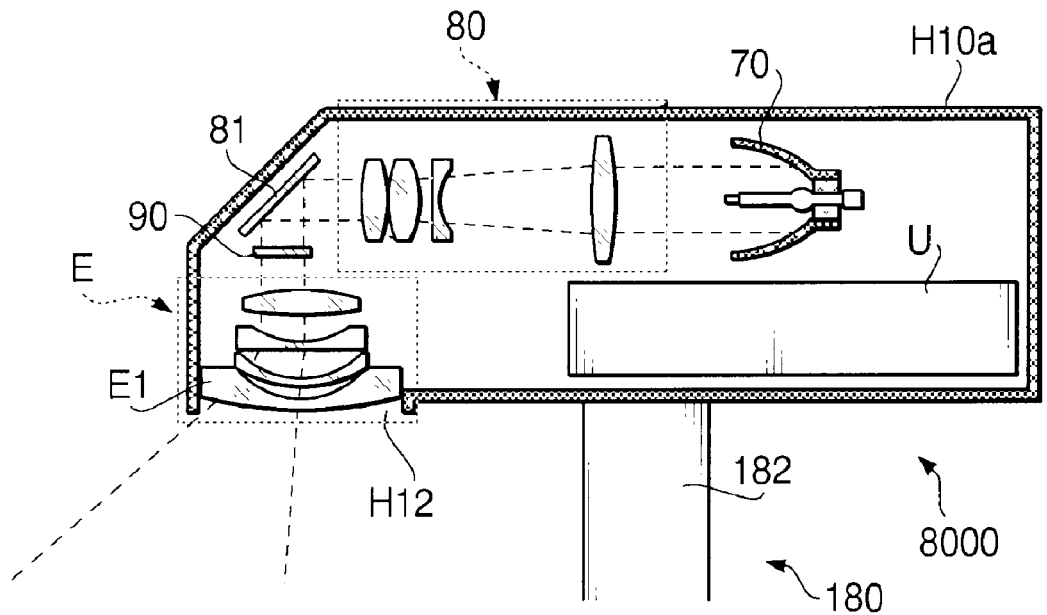
FIG. 36 is a schematic cross-sectional view showing a projector according to an eighth embodiment of the present invention.
Figure 37:
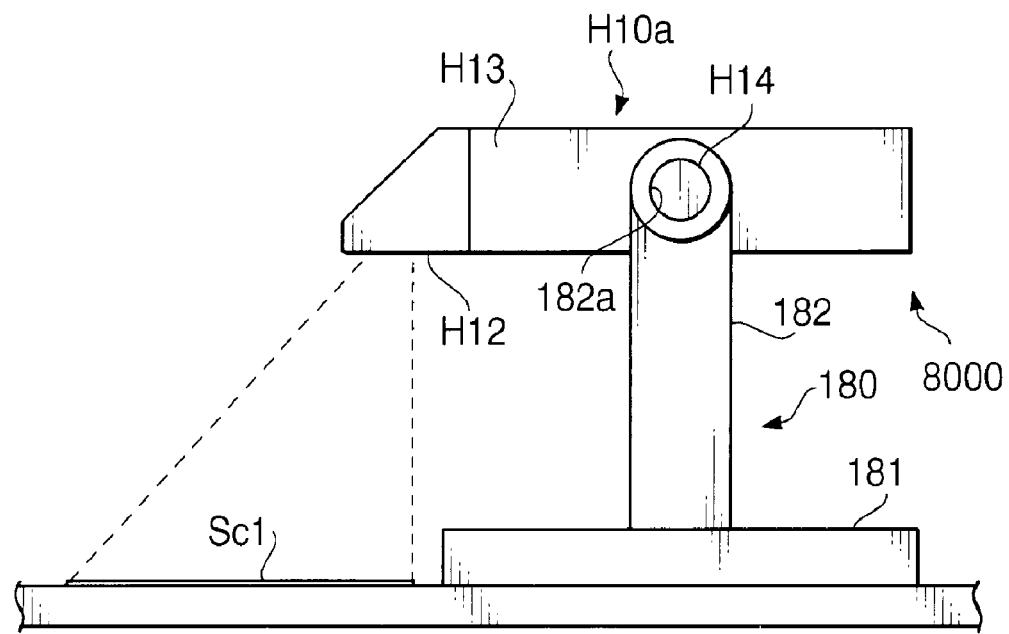
FIG. 37 is a schematic side view showing the projector projecting video on a screen on a tabletop according to the eighth embodiment of the present invention.
Figure 38:
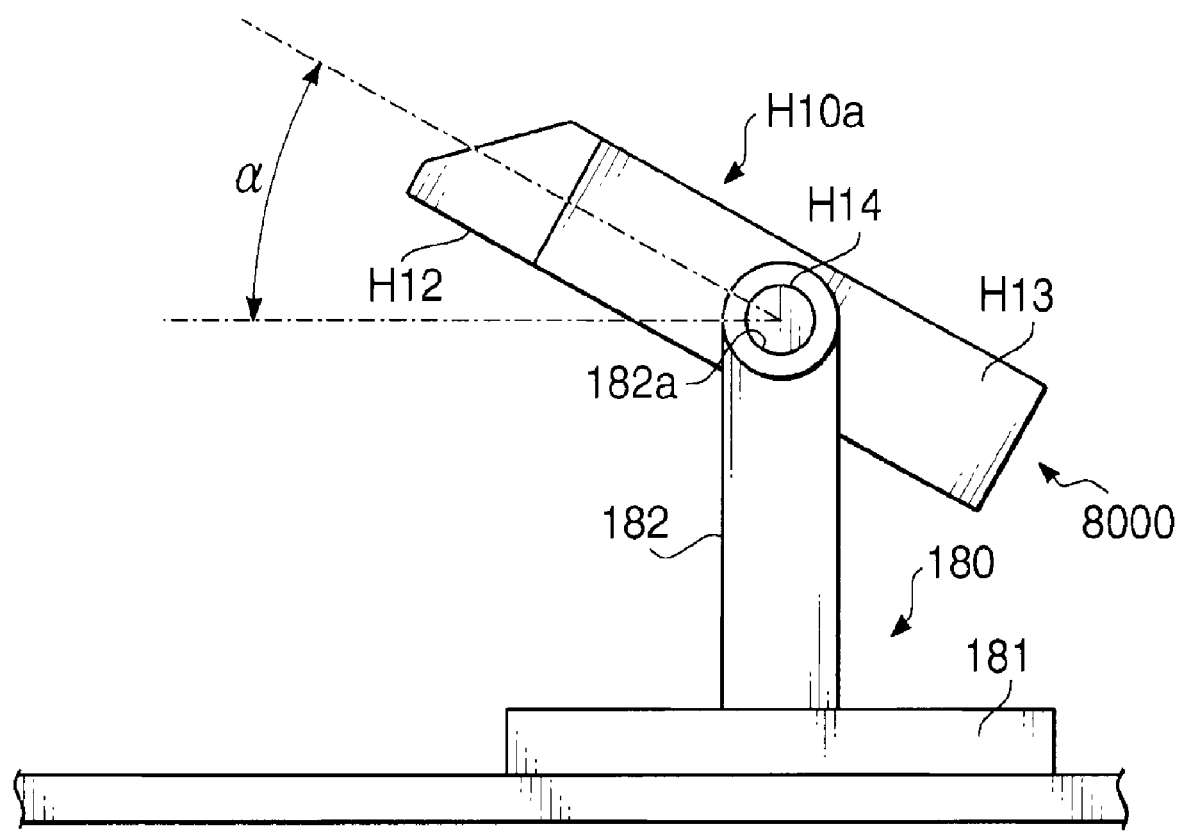
FIG. 38 is a schematic side view showing the projector when a housing thereof is rotated clockwise at an angle α according to the eight embodiment of the present invention.
Figure 39:
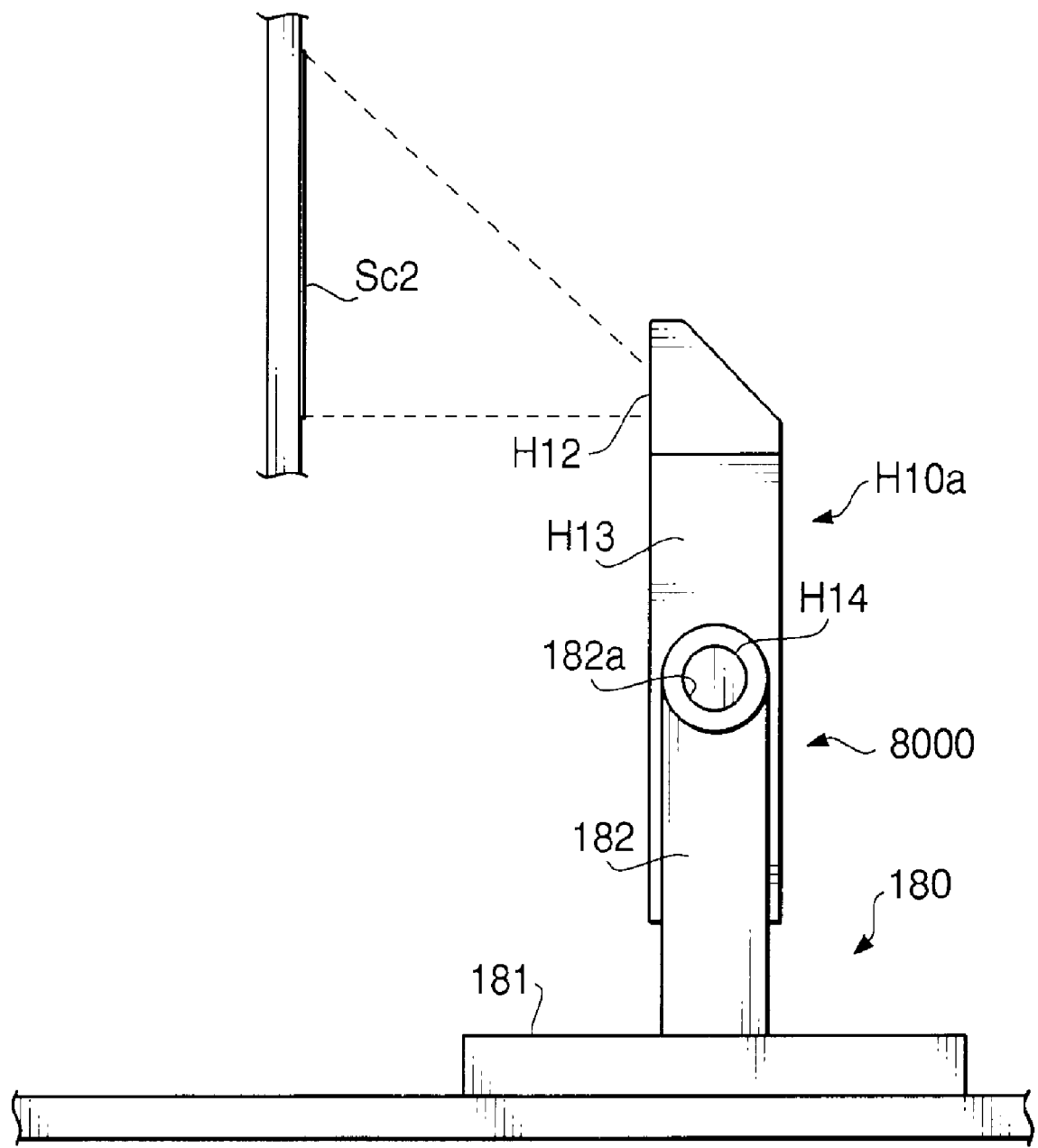
FIG. 39 is a schematic side view showing the projector projecting video on a screen arranged perpendicularly to the tabletop according to the eighth embodiment of the present invention.
Figure 40:
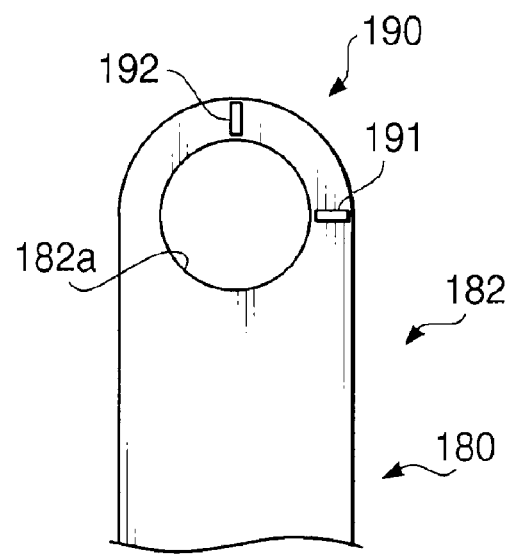
FIG. 40 shows a positional relation among two fixed contacts of a rotary switch and a supporting hole of a left support (viewing the left support from the back) according to the eighth embodiment of the present invention.
Figure 41:
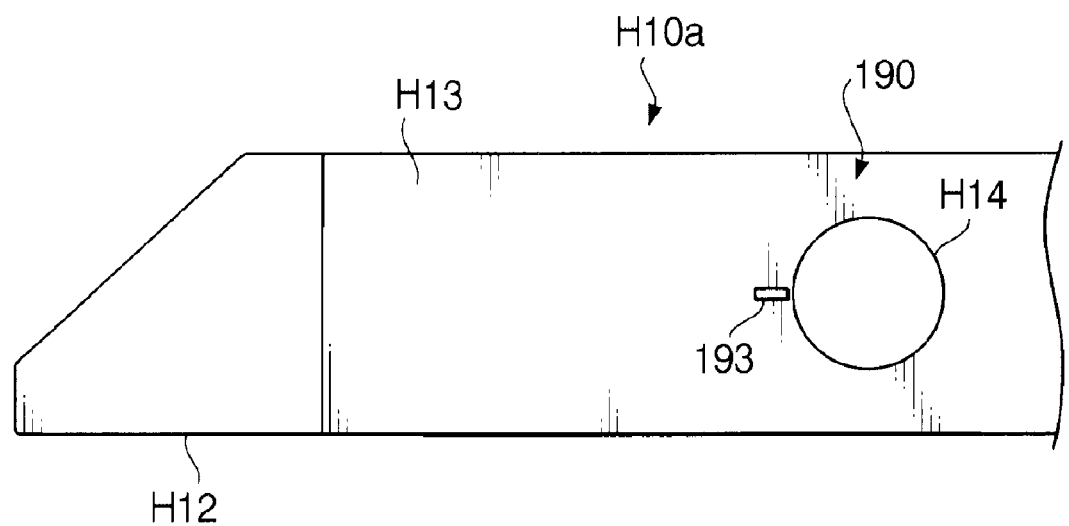
FIG. 41 shows a positional relation among a movable contact of the rotary switch, a boss of the housing and an opening of the housing (viewing the housing from the left) according to the eighth embodiment of the present invention.
Figure 42:
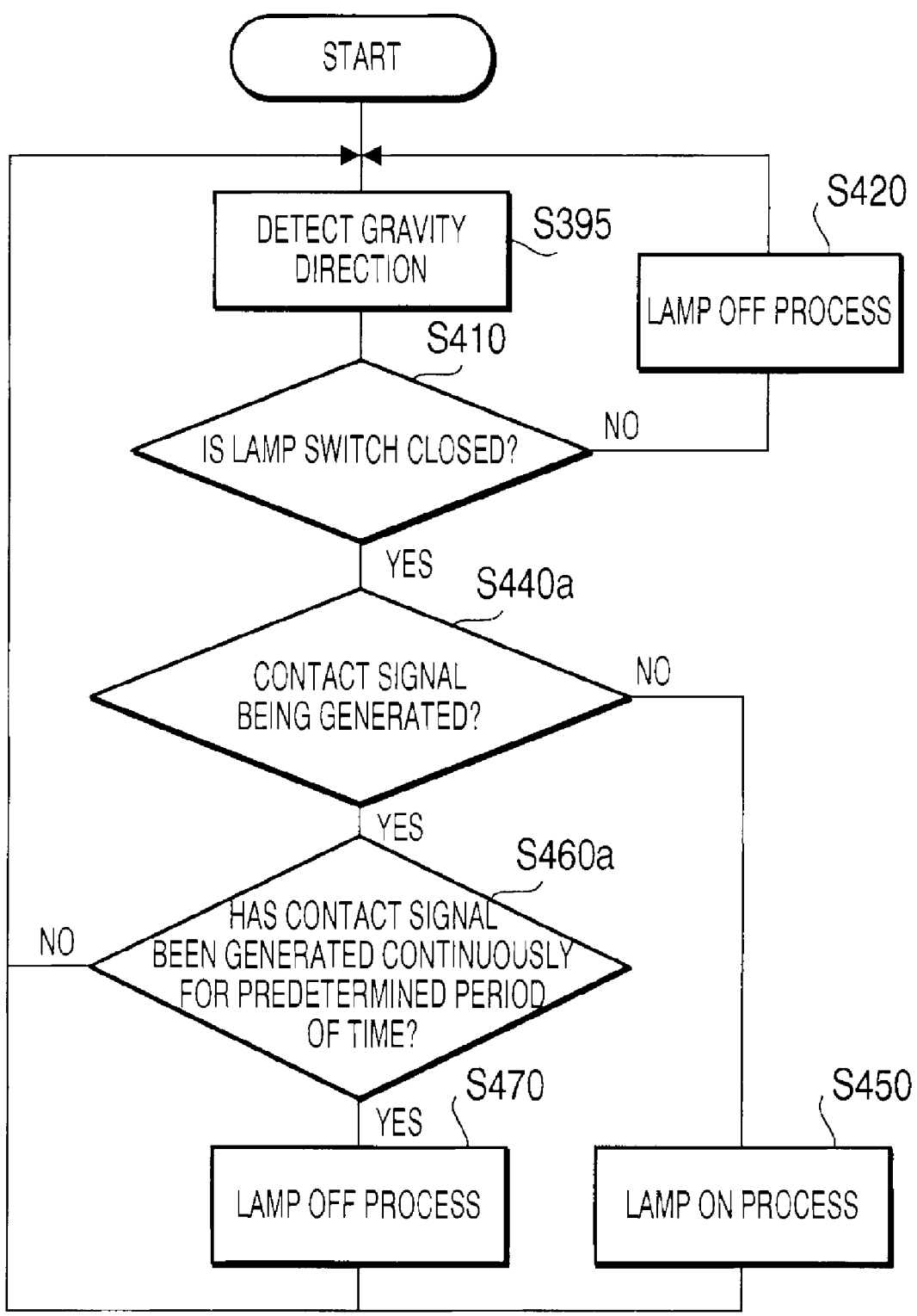
FIG. 42 is a flowchart showing a control program of the projector according to the eighth embodiment of the present invention.

FIG. 36 is a schematic cross-sectional view showing a projector 8000 according to an eighth embodiment of the present invention. FIG. 37 is a schematic side view showing the projector 8000 projecting an image on a screen Sc arranged on a tabletop according to the eighth embodiment of the present invention. FIG. 38 is a schematic side view showing the projector 8000 when a housing thereof is rotated clockwise at an angle α according to the eight embodiment of the present invention. FIG. 39 is a schematic side view showing the projector 8000 projecting an image on the screen Sc arranged perpendicularly to the tabletop according to the eighth embodiment of the present invention. FIG. 40 shows a positional relation among two fixed contacts of a rotary switch and a supporting hole of a left support (viewing the left support from the back) according to the eighth embodiment of the present invention. FIG. 41 shows a positional relation among a movable contact of the rotary switch, a boss of the housing and an opening of the housing (viewing the housing from the left) according to the eighth embodiment of the present invention. FIG. 42 is a flowchart showing a control program of the projector 8000 according to the eighth embodiment of the present invention.

The projector 8000 according to the eighth embodiment is in configuration to have a reflecting mirror 81 and a supporting member 180 additionally to the projector 7000 described in the seventh embodiment and have a housing H10a instead of the housing H10.

The housing H10a is made of an insulating material such as synthetic resin. The housing H10a has an opening H12 which is formed at a front end portion of the bottom of the housing H10a as shown in FIG. 36. In FIG. 36, the opening H12 faces downward.

The housing H10a includes the reflecting mirror 81, in addition to the control unit U, the lamp 70, the illuminating optical system 80, the LCD 90 and the imaging optical system E which are similar to those in the projector 7000 described in the seventh embodiment.

As shown in FIG. 36, the reflecting mirror 81 is placed on the output side of the illuminating optical system 80, in a tilted orientation between the illuminating optical system 80 and the opening H12. The reflecting mirror 81 reflects the light from the illuminating optical system 80 toward the opening H12.

The LCD 90 and the imaging optical system E are placed between the reflecting mirror 81 and the opening H12, on the optical path of the light reflected by the reflecting mirror 81. With this configuration, the reflected light from the reflecting mirror 81 is output through the opening H12, via the LCD 90 and the imaging optical system E.

The supporting member 180, as shown in FIGS. 37-39, includes a plate-shaped pedestal 181 and right and left supports 182 (only one is shown) on right and left sides (only one is shown) of the housing H10a. The pedestal 181 is laid on the tabletop. The supports 182 extend vertically from centers (in regard to the longitudinal direction of the pedestal 181) of right and left lateral parts (only one is shown) of the pedestal 181, respectively. Between distal ends of the right and left supports 182 extending from the pedestal 181, the housing H10a is rotatably supported at central parts of its right and left side faces (only one is shown) H13.

Specifically, the housing H10a is supported by the right and left supports 182 to be rotatable, with two bosses H14 (protruding from the central parts of the right and left side faces H13 of the housing H10a) inserted into supporting holes 182a formed at the distal ends of the right and left supports 182, respectively. The supporting member 180 can be made of the same material as that of the housing H10a.

The projector 8000 is equipped with a rotary switch 190 in place of the gravity sensor 20a provided to the projector 7000 in the seventh embodiment. The rotary switch 190 includes fixed contacts 191, 192 and a movable contact 193.

The fixed contacts 191, 192 are provided at a rim of the supporting hole 182a of the left support 182 from its back as shown in FIG. 40. The fixed contact 192 is placed in an upper end part of the rim of the supporting hole 182a of the left support 182. The fixed contact 191 is formed in the front end part of the rim of the supporting hole 182a of the left support 182, at a rotational position that is apart from that of the fixed contact 192 at 90 degrees. The left support 182 is viewed from the back in FIG. 40.

The movable contact 193 is formed on the left side face H12 of the housing H10a, at the left end of the boss H14 in FIG. 41. With this configuration, the movable contact 193 makes contact with the fixed contact 191 when the housing H10a is at a rotational position shown in FIG. 37. Thus, the rotary switch 190 detects the rotational position of the housing H10a shown in FIG. 37 and generates a contact signal due to the contact of the movable contact 193 with the fixed contact 191.

Meanwhile, when the housing H10a is at a rotational position shown in FIG. 39, the movable contact 193 makes contact with the fixed contact 192. Thus, the rotary switch 190 detects the rotational position of the housing H10a shown in FIG. 39 and generates a contact signal due to the contact of the movable contact 193 with the fixed contact 192.

In the eighth embodiment, operations shown in FIGS. 33, 34 in the seventh embodiment are replaced with the operation shown in FIG. 42. In the operation, the microcomputer 20 executes a control program according to the flow shown in FIG. 42 and carries out processes for the driving control of the video processing circuit 30 and the lamp driving circuit 40 based on the operation output of the operation panel P0 and the detection output of the rotary switch 190 during the control program. The remaining configuration of the projector 8000 is similar to the configuration of the projector 7000 of the seventh embodiment.

In the eighth embodiment, the housing H10a is supported by the supporting member 180 at the rotational position shown in FIG. 37, and the opening H12 of the housing H10a is facing a screen Sc1 of the tabletop. The rotary switch 190 is detecting the rotational position of the housing H10a and generating the contact signal caused by the contact of the movable contact 193 with the fixed contact 191.

As the process starts, in S410, it is judged as to whether the lamp switch P12 is closed. When the lamp switch P12 is operated to be closed (S410: YES), in S440a, it is judged as to whether the contact signal is being generated.

Since the rotary switch 190 is generating the contact signal as above (S440a: YES), in S460a, it is judged as to whether the contact signal has been generated continuously for a predetermined period of time. In the eighth embodiment, similarly to the seventh embodiment, the predetermined period of time is defined to a length of time for stabilization of the housing H10a of the projector 8000, which is for example a several seconds.

When the rotary switch 190 stops generating the contact signal before the predetermined period of time elapses (S460a: NO), it is determined that the rotational position of the housing H10a is regarded to be unstable or transient, and the lamp on process in S470 is avoided. It is noted that even though the rotational position of the housing H10a of the projector 8000 is unstable, incidence of the light emitted from the lamp 70 upon eyes of the viewers is prevented since the lamp 70 is in the OFF state. Therefore, the eye health of the viewers is prevented from being damaged by light from the projector 8000.

In S460a, on the other hand, when the rotational position of the housing H10a is maintained for the predetermined period of time (S460a: YES), the rotational position of the housing H10a is stable, and the lamp on process is executed in S470.

Accordingly, the lamp 70 is driven by the lamp driving circuit 40 and turned ON so as to output the light through the opening H12 of the housing H10a of the projector 8000. The light output as above is projected onto the screen Sc1 on the tabletop.

In S440a, when it is judged that the contact signal is not being generated (S440a: NO), the lamp off process is executed in S450. Since the OFF state of the lamp 70 is maintained, the eye health of the viewers is prevented from being damaged by light from the projector 8000

In the projecting state described above, when the housing H10a is rotated clockwise in FIG. 37 at an arbitrary angle α, which is less than 90 degrees (see FIG. 38), the movable contact 193 of the rotary switch 190 loses contact with the fixed contact 191. Accordingly, the rotary switch 190 stops generating the contact signal (S440a: NO).

Accordingly, in S450, the lamp off process is executed. Therefore, incidence of the light emitted from the lamp 70 upon eyes of the viewers is prevented since the lamp 70 is in the OFF state. Therefore, the eye health of the viewers is prevented from being damaged by light from the projector 8000 when the housing H10a is rotated by an arbitrary angle α.

In the lamp off state, when the housing H10a is rotated to the rotational position shown in FIG. 39, the opening H12 of the housing H10a faces a screen Sc2 which is placed perpendicularly to the tabletop. Meanwhile, the rotary switch 190 detects the rotational position of the housing H10a shown in FIG. 39 and generates the contact signal caused by the contact of the movable contact 193 with the fixed contact 192.

With the projector 8000 in such an orientation, in S440a, it is judged that the rotary switch 190 is generating the contact signal (S440a: YES). Next, in S460a, it is judged as to whether the contact signal has been generated continuously for a predetermined period of time.

When the rotary switch 190 stops generating the contact signal before the predetermined period of time elapses (S460a: NO), it is determined that the rotational position of the housing H10a is regarded to be unstable or transient, and the lamp on process in S470 is avoided. It is noted that even though the rotational position of the housing H10a of the projector 8000 is unstable, incidence of the light emitted from the lamp 70 upon eyes of the viewers is prevented since the lamp 70 is in the OFF state. Therefore, the eye health of the viewers is prevented from being damaged by light from the projector 8000.

In S460a, on the other hand, when the rotational position of the housing H10a is maintained for the predetermined period of time (S460a: YES), the rotational position of the housing H10a is stable, and the lamp on process is executed in S470.

Accordingly, the lamp 70 is driven by the lamp driving circuit 40 and turned ON so as to output the light through the opening H12 of the housing H10a of the projector 8000. The light output as above is projected onto the screen Sc2.

Thus, the light emission from the lamp 70 of the projector 8000 is avoided unless the rotational position of the housing H10a is maintained at a desired rotational position for the predetermined period of time, by which the eye health of the viewers is prevented from being damaged by light from the projector 8000.

In the projector 8000 of the eighth embodiment, it may be difficult to finely detect an intended inclination of the housing H10a when the projector 8000 is moved from one position to another. Therefore, a bottom of the pedestal 181 may be equipped with a stability/movement status sensor to detect the movement of the projector 8000 such as one being equipped to a basal of a heating appliance. The sensor can be configured to make contact with a flat surface and stay ON when the projector 8000 is stable. With this configuration, the projector 8000 can stop projecting when the projector 8000 is moved off the tabletop.

The present invention can be implemented in various ways without restricting it to the above embodiments, and various other modifications as described below, for example, are also available.

In S450 in the seventh and eighth embodiments (see FIGS. 33 and 42), a black display process wherein a plane black image is displayed on the LCD 90 may be employed to be replaced with the lamp off process.

Also in S450, the lamp 70 may be maintained ON but brightness of the LCD 90 may be substantially dimmed or darkened so that the projection of the image through the LCD 90 can be recognized by the viewers instead of the lamp off process. With this configuration, the viewers can still recognize the menu display even though the light projected by the projector is darkened. It is noted that although the amount of the light through the LCD 90 may be greater than that of the brightness of the light in the lamp off state, it should not be so intense as to harm the eye health of the viewers. Meanwhile, following S450 as above wherein the LCD 90 is dimmed, when the current projection angle of the projector 7000 is maintained at one of the intended projection angles for the predetermined period of time (S460: YES), S470 may be executed by restoring the brightness of the LCD 90 to the normal brightness instead of executing the lamp on process. With this configuration, image projection can be restored more quickly compared to the case wherein the lamp 70 is turned ON once again after the OFF state.

Further, in S450, the amount of light emitted from the lamp 70 may be reduced instead of executing the lamp off process.

With this configuration, the viewers can still recognize the menu display even though the light from the lamp 70 is dimmed. Meanwhile, similarly to the above modification, following S450 as above wherein the lamp 70 is dimmed, when the current projection angle of the projector 7000 is maintained at one of the intended projection angles for the predetermined period of time (S460: YES), S470 may be executed by restoring the brightness of the lamp 70 to the normal brightness instead of executing the lamp on process. With this configuration, image projection can be restored more quickly compared to the case wherein the lamp 70 is turned ON once again after the OFF state.

When the lamp 70 described in the seventh and eighth embodiments is used as the light source, a considerably long preliminary period of time for the lamp 70 to reach to its normal lighting state between issuance of the instruction for turning the lamp 70 ON and the actual lighting of the lamp 70 may be required in actual use. Therefore, the preliminary lighting may be performed previously regardless of the attitude of the projectors 7000, 8000 when the lamp switch P12 has already been closed before the lamp lighting control is executed based on the detection of the orientation of the projectors 700, 8000. In the aforementioned case wherein the LCD 90 is turned off (or the amount of light through the LCD 90 is reduced), the preliminary lighting of the lamp 70 is convenient in practical use since no ON/OFF control of the lamp 70 itself is executed based on the detection of the orientation of the projectors 7000, 8000 in this case.

The gravity sensor 20a and the rotary switch 190 described in the seventh and eighth embodiments may be replaced with any sensor which is capable of detecting the orientation of the projectors 7000, 8000 such as a gyro sensor and a magnetic position sensor.

In the optional angle storing process in S542 and the specific angle storing process in S551 in FIG. 34 described in the seventh and eighth embodiments, the optional angle and the specific angle may also be stored in the ROM of the microcomputer 20 which employs the ROM as a nonvolatile memory or in an extra nonvolatile memory, instead of storing the angles in the RAM of the microcomputer 20. In this case, the settings are thereafter available regardless of the ON/OFF of the power of the projectors 7000, 8000.

In S400 shown in FIG. 33, while the microcomputer 20 reads out the initial projection angle from the memory (e.g. ROM of the microcomputer 20), the microcomputer 20 may also judge as to whether a projection angle has been stored in a particular area of a nonvolatile RAM or a flash ROM and store a predetermined initial projection angle in the particular area when no projection angle has been stored in the particular area.

In S543 shown in FIG. 34 described in the seventh and eighth embodiments, the number of optional angles stored in the RAM to be judged as the criteria can be any number such as one, or three, for example.

The process shown in FIG. 34 described in the seventh and eighth embodiments may also be configured to allow the operator M to select the optional angle select mode or the specific angle select mode without executing the initial projection angle readout process of S531 by repeating the judgment steps S520 and S530 until the optional angle select mode is selected in S520 or the specific angle select mode is selected in S530.

While the process shown in FIG. 34 described in the seventh and eighth embodiments includes the judgment step S543 for judging as to whether two optional angles have been stored and the judgment step S552 for judging as to whether a specific angle has been stored, it is also equivalently possible to display an extra menu item "MODE END" in the menu and execute a judgment step for judging as to whether the menu item "MODE END" has been selected instead of executing the judgment steps S543 and S552. With this configuration, a plurality of optional angles and specific angles can be selected until the menu item "MODE END" is selected. Incidentally, the operator M is also capable of employing the initial projection angle which has been read out in the step S400 in FIG. 33, by selecting the menu item "MODE END" without selecting any optional angle or specific angle.

In S460 shown in FIG. 33 described in the seventh embodiment or in S460a described in the eighth embodiment, the "predetermined period of time" which is set previously may be replaced with "duration" which is set by a duration setting means (provided for setting proper "duration" depending on the status of use of the projector 7000 or 8000 by the user.

A notifying element, which makes a notification to the operator M that the current projection angle obtained in S430 coincides with the intended projection angle following S440 shown in FIG. 33 in the seventh embodiment, may be provided. Thus, the operator M can recognize when the current projection angle coincides with the intended projection angle based on the notification. The notifying element can be, for example, an LED which is lighted only when the current projection angle coincides with the intended projection angle. However, the notifying element is not restricted to an LED; the notification regarding the current projection angle coinciding with the intended projection angle may also be made by using an LCD, a warning beep, for example.

Further, a stability notifying element, which makes a notification to the operator M that the current projection angle obtained in S430 has been maintained for the predetermined period of time following S460 shown in FIG. 33 in the seventh embodiment and S460a shown in FIG. 42 in the present embodiment, may be provided. Thus, the operator M can recognize when the current projection angle has been maintained for the predetermined period of time based on the notification. The stability notifying element can be, for example, an LED which is lighted continuously when the current projection angle has been maintained for the predetermined period of time while it is lighted intermittently when the current projection angle coincides with the intended projection angle but has not been maintained for the predetermined period of time. The stability notifying element is not restricted to an LED; the notification regarding the current projection angle having been maintained for the predetermined period of time may also be made by using an LCD, a warning beep, for example.

The configurations of the notifying element and the stability notifying element are not limited as long as the operator M can be notified of at least one of two criteria. That is as to whether the current projection angle of the projector coincides with the intended projection angle and as to whether the current projection angle coincides with the intended projection angle and has been maintained for the predetermined period of time.

The projectors 7000, 8000 may also be provided with a means which controls or restricts the light emission from the lamp 70 regardless of the intended attitude or the stability of the projectors. For example, by configuring the projectors to be able to emit the light onto the screen surface even when it is not in the intended attitude, the operator M can easily set the position of the projected image on the screen surface. This configuration is also effective and usable when the operator M makes settings by use of a menu display (which requires the light emission from the projector).

The number of fixed contacts of the rotary switch 190 described in the eighth embodiment can be changed, by which the intended projection angle of the projector becomes variable.

Regarding the multiple contacts of the rotary switch 190 described in the eighth embodiment, the projector 8000 may also be provided with an intended attitude setting mechanism which allows the operator M to select and set one of the contacts as a valid contact for the intended attitude when it is in contact with the movable contact, in order to realize the selection of the intended attitude by the operator M.

In the projectors 7000, 8000 described above, through the lamp driving circuit 40 and the steps S400, S440a, S460, S460a, the amount of light from the projecting unit is reduced when the attitude of the projectors 7000, 8000 is judged to be an attitude other than the intended attitude so that the eye health of the viewers can be prevented from being damaged even when the light emitted from the projecting unit is erroneously incident upon eyes of the viewers.

The amount of light from the projecting unit is reduced when the attitude of the projectors 7000, 8000 is not maintained at the intended attitude for a predetermined period of time and does not meet the predetermined stability requirement so that the eye health of the viewers can be also prevented from being damaged even when the light emitted from the projecting unit is erroneously incident upon eyes of the viewers.

Further, through the microcomputer 20 and S560, at least one intended attitude can be set in the projectors 7000, 8000 so that the attitude of the projectors 7000, 8000 can be specifically set according to the preference of the viewers and a usage condition of the projectors 7000, 8000. Therefore, the eye health of the viewers can be also prevented from being damaged even when the light emitted from the projecting unit is erroneously incident upon eyes of the viewers.

Furthermore, it is configured such that the direction of the light emitted from the projectors 7000, 8000 corresponds to the attitude of the projectors 7000, 8000, and the direction of the light to be emitted is determined based on the attitude of the projectors 7000, 8000, which is obtained based on the direction of the gravity in the projectors 7000, 8000. Therefore, when the current direction of the light being emitted does not coincides with the intended attitude of the projectors 7000, 8000, the amount of the light from the projecting unit is reduced. The light is again emitted when the stability requirement is met and when the current direction of the light does not coincides with the intended direction of the light, which corresponds to the attitude of the projectors 7000, 8000. Therefore, the eye health of the viewers can be also prevented from being damaged even when the light emitted from the projecting unit is erroneously incident upon eyes of the viewers.

In the projectors 7000, 8000, the current direction of the light being emitted can be set to be an intended direction of projection so that the intended attitude of the projectors 7000, 8000 can be finely adjusted according to preferences of the viewers and a usage condition of the projectors 7000, 8000. Therefore, the eye health of the viewers can be also prevented from being damaged even when the light emitted from the projecting unit is erroneously incident upon eyes of the viewers.

Further, reduction of the light from the projecting unit is canceled forcibly when the predetermined stability condition is met. Therefore, the light emission from the projector can be carried out automatically without an additional operation while the eye health of the viewers can be also prevented from being damaged even when the light emitted from the projecting unit is erroneously incident upon eyes of the viewers.

The operator M is notified when the attitude of the projectors 7000, 8000 is in the intended attitude by the notifying element. Therefore, the operator M can easily recognize as to whether the attitude of the projectors 7000, 8000 is an intended attitude so that the eye health of the viewers can be also prevented from being damaged even when the light emitted from the projecting unit is erroneously incident upon eyes of the viewers.

Further, operator M is notified when projectors 7000, 8000 meet the stability requirement at the intended attitude by the stability notifying element. Therefore, the operator M can easily recognize as to whether the attitude of the projectors 7000, 8000 is maintained at the predetermined stability requirement. Therefore, the eye health of the viewers can be also prevented from being damaged even when the light emitted from the projecting unit is erroneously incident upon eyes of the viewers.

Furthermore, the above described projectors 1000 through 8000 can be configured to have the projecting unit, including the imaging optical system E, the LCD 90, and the illuminating optical system 80, for example, and the control unit U, including the microcomputer 20, for example, separately so that the projecting unit can be independently rotated about an axis to change and adjust the projecting direction while the control unit U is stable. In such a configuration, the gravity sensor 20*a* and/or a system (e.g., the rotary switch 190) to detect the projecting direction can be included in the projecting unit rather than in the control unit.

It is noted that each of the above described projectors 1000 through 8000 may be combined with a configuration of any one of other projectors to configure one projector.

It is also noted that in the above description the projectors 1000 through 8000 are configured to project video (motion) images on the screen Sc, and the video image includes a plurality of still images which are successively projected. However, a single still image can be projected by the projectors 1000 through 8000 similarly.

Although examples of carrying out the invention have been described, those skilled in the art will appreciate that there are numerous variations and permutations of the projector that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. A projector, which is configured to project video including at least one of a main image and a subsidiary menu image for an operation menu onto a projection surface, comprising:
   a projecting unit;
   a projecting system which projects the video onto the projection surface by use of the projecting unit;
   an attitude detecting system which judges an attitude of the projector being installed; and
   a menu image generating system which generates menu image data representing the menu image according to the detected attitude of the projector and outputs the generated menu image data to the projecting unit to have the menu image based on the generated menu image data to be projected from the projection unit.

2. The projector according to claim 1, further comprising an operation means,
   wherein the menu image generating system is configured to generate at least a menu image for assisting with operations on the operation means, as the video to be projected by the projecting system.

3. The projector according to claim 1,
   wherein the attitude detecting system includes a gravity direction detecting system for detecting a gravity direction, the attitude detecting system judging the projecting direction of the projecting system based on the gravity direction detected by the gravity direction detecting system.

4. The projector according to claim 1, further comprising a storage system which stores data representing the menu image,
   wherein the menu image includes a horizontal projection menu image for the projection surface being in a horizontal position and a vertical projection menu image for the projection surface being in a vertical position.

5. The projector according to claim 1, further comprising a storage system which stores data representing the operation menu, wherein:
   the menu image includes a horizontal projection menu image exclusively for the projection surface being in a horizontal position, a vertical projection menu image exclusively for the projection surface being in a vertical position, and a common menu image which is common for the projection surface being in the horizontal position and in the vertical position.

6. A projector comprising:
   a housing which is configured to have an opening facing toward a projection surface;
   a projecting system which is installed in the housing and optically projects video onto the projection surface via the opening;
   a projecting direction detecting system which detects a projecting direction of the projecting system; and
   a video control system which rotates the video to control an orientation of the video, optically projected by the projecting system, on the projection surface based on the projecting direction detected by the projecting direction detecting system.

7. The projector according to claim 6,
   wherein the projecting direction detecting system includes gravity direction detector for detecting a gravity direction, the projecting direction detecting system detecting the projecting direction of the projecting system based on the gravity direction detected by the gravity direction detector.

8. The projector according to claim 6,
   wherein the projection surface is defined by a plane which is substantially perpendicular to a horizontal plane, and the housing is placed on a plane substantially corresponds to the substantially perpendicular plane.

9. The projector according to claim 6,
   wherein the video control system controls the direction of the video being projected on the projection surface, based on a direction component of the detected projecting direction on the projection surface.

10. The projector according to claim 6,
    wherein the video control system adjusts the orientation of the video being projected on the projection surface into a predetermined direction based on a direction component of the detected projecting direction on the projection surface.

11. The projector according to claim 9,
    wherein the projecting system includes an optical modulation element which modulates a beam of light according to a video signal and thereby outputs the video to be optically projected onto the projection surface, and the video control system includes a rotated video signal generating system which generates a video signal of rotation-controlled video, which is generated according to a video signal and based on the direction component of the projecting direction on the projection surface, and the video control system supplies the video signal of the rotation-controlled video to the optical modulation element.

12. The projector according to claim 9, wherein the projecting system includes a video rotation system which rotates the optically projected video by one of executing rotation control of the optical modulation element and mechanical control of an optical path direction inside the housing, and the video control system controls the direction of the video projected on the projection surface by executing rotation control of the video rotation system so as to rotate the optically projected video based on the direction component of the detected projecting direction on the projection surface.

13. A projector which is configured to emit light from a projecting unit in a projecting direction, comprising:

an attitude detecting system which detects an attitude of the projecting unit; and a light amount control system which controls the emission of light from the projecting unit so as to reduce the light emission unless the attitude detected by the attitude detecting system is a preset targeted attitude.

14. The projector according to claim 13, wherein the light amount control system controls the light emission from the projecting unit so as to reduce the light emission unless the attitude detected by the attitude detecting system satisfies a predetermined stability condition at the preset targeted attitude.

15. The projector according to claim 14, wherein the light amount control system controls the light emission from the projecting unit so as to reduce the light emission when a stability condition, in which the attitude detected by the attitude detecting means is maintained at the preset targeted attitude for a prescribed time period, is dissatisfied.

16. The projector according to claim 13, further comprising a setting system which sets at least one preset targeted attitude.

17. The projector according to claim 13, wherein the direction of the light emission from the projecting unit corresponds to the preset targeted attitude, and the attitude detecting system includes a gravity direction detector for detecting a gravity direction, obtains the direction of the light emission based on the gravity direction detected by the gravity direction detector, and detects the attitude of the projecting unit to be the direction of the light emission.

18. The projector according to claim 16, wherein the setting system sets the preset targeted attitude by determining a current direction of the light emission from the projecting unit to be a target light emission direction.

19. The projector according to claim 13, further comprising a light amount control canceling system which forcibly cancels the reduction of the light emission from the projecting unit after the reduction of the light emission is made by the light amount control system.

20. The projector according to claim 13, further comprising a notification system which makes a notification indicating whether the attitude detected by the attitude detecting system is the preset targeted attitude.

* * * * *